(12) United States Patent
Kudo et al.

(10) Patent No.: US 8,480,780 B2
(45) Date of Patent: Jul. 9, 2013

(54) HONEYCOMB FILTER FOR PURIFYING EXHAUST GASES, ADHESIVE, COATING MATERIAL, AND MANUFACTURING METHOD OF HONEYCOMB FILTER FOR PURIFYING EXHAUST GASES

(75) Inventors: Atsushi Kudo, Ibi-gun (JP); Masafumi Kunieda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/360,060

(22) Filed: Jan. 27, 2012

(65) Prior Publication Data

US 2012/0186211 A1 Jul. 26, 2012

Related U.S. Application Data

(60) Continuation of application No. 12/116,503, filed on May 7, 2008, now Pat. No. 8,128,722, which is a division of application No. 10/502,045, filed as application No. PCT/JP03/01151 on Feb. 5, 2003, now Pat. No. 8,029,737.

(30) Foreign Application Priority Data

| | | |
|---|---|---|
| Feb. 5, 2002 | (JP) | 2002-028644 |
| Jan. 10, 2003 | (JP) | 2003-004119 |
| Jan. 21, 2003 | (JP) | 2003-012634 |

(51) Int. Cl.
*B01D 39/06* (2006.01)
*B01D 39/14* (2006.01)
*B01D 24/00* (2006.01)
*B01D 50/00* (2006.01)

(52) U.S. Cl.
USPC ............ 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182
See application file for complete search history.

(56) References Cited

U.S. PATENT DOCUMENTS

| | | |
|---|---|---|
| 3,929,494 A | 12/1975 | Veres |
| 4,304,585 A | 12/1981 | Oda et al. |

(Continued)

FOREIGN PATENT DOCUMENTS

| | | |
|---|---|---|
| CN | 1046684 | 11/1990 |
| EP | 0 361 883 A1 | 4/1990 |

(Continued)

OTHER PUBLICATIONS

"Strength and Thermal Shock Resistance of Segmented Wall-Flow Diesel Filters", SAE Technical Paper Series 860008, SAE The Engineering Resource for Advancing Mobility, pp. 1-10, Feb. 24-28, 1986.

(Continued)

*Primary Examiner* — Amber Orlando
(74) *Attorney, Agent, or Firm* — Oblon, Spivak, McClelland, Maier & Neustadt, L.L.P.

(57) ABSTRACT

A honeycomb filter includes a ceramic laminated body including columnar porous ceramic members and an adhesive layer combining the columnar porous ceramic members with one another. The columnar porous ceramic members each have a partition wall and through holes, the through holes extend in parallel with one another in a length direction of the columnar porous ceramic members, the partition wall separates the through holes and filters particulates in an exhaust gas, and the adhesive layer includes an inorganic binder, an inorganic fiber, inorganic particles and an inorganic balloon.

33 Claims, 8 Drawing Sheets

U.S. PATENT DOCUMENTS

| | | | |
|---|---|---|---|
| 4,357,987 A | 11/1982 | Oda et al. | |
| RE31,405 E | 10/1983 | Paisley | |
| 4,451,517 A | 5/1984 | Inoguchi et al. | |
| 4,595,662 A | 6/1986 | Mochida et al. | |
| 4,598,054 A | 7/1986 | Mochida et al. | |
| 4,953,627 A | 9/1990 | Ito et al. | |
| 5,108,685 A | 4/1992 | Kragle | |
| 5,445,786 A | 8/1995 | Harada et al. | |
| 5,567,663 A | 10/1996 | Kotani et al. | |
| 5,914,187 A | 6/1999 | Naruse et al. | |
| 6,276,595 B1 | 8/2001 | Bruck | |
| 6,669,751 B1 | 12/2003 | Ohno et al. | |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,491,057 B2 | 2/2009 | Saijo et al. | |
| 7,498,544 B2 | 3/2009 | Saijo et al. | |
| 2002/0197193 A1 | 12/2002 | Harada et al. | |
| 2004/0045267 A1 | 3/2004 | Ichikawa et al. | |
| 2004/0097370 A1 | 5/2004 | Ichikawa et al. | |
| 2004/0161596 A1 | 8/2004 | Taoka et al. | |
| 2005/0076626 A1 | 4/2005 | Kudo et al. | |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0169819 A1 | 8/2005 | Shibata | |
| 2005/0175514 A1 | 8/2005 | Ohno | |
| 2005/0180898 A1 | 8/2005 | Yamada | |
| 2005/0247038 A1 | 11/2005 | Takahashi | |
| 2005/0272602 A1 | 12/2005 | Ninomiya | |
| 2006/0021310 A1 | 2/2006 | Ohno et al. | |
| 2006/0029898 A1 | 2/2006 | Saijo et al. | |
| 2006/0043652 A1 | 3/2006 | Saijo et al. | |
| 2006/0051556 A1 | 3/2006 | Ohno et al. | |
| 2006/0073970 A1 | 4/2006 | Yamada | |
| 2006/0108347 A1 | 5/2006 | Koyama et al. | |
| 2006/0116908 A1 | 6/2006 | Dew et al. | |
| 2006/0118546 A1 | 6/2006 | Saijo | |
| 2006/0166820 A1 | 7/2006 | Ogyu et al. | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0269722 A1 | 11/2006 | Yamada | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0065348 A1 | 3/2007 | Ohno et al. | |
| 2007/0068128 A1 | 3/2007 | Oshimi et al. | |
| 2007/0085233 A1 | 4/2007 | Yamada | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0144561 A1 | 6/2007 | Saijo et al. | |
| 2007/0148403 A1 | 6/2007 | Yamamura et al. | |
| 2007/0152382 A1 | 7/2007 | Yamada et al. | |
| 2007/0169453 A1 | 7/2007 | Hayakawa | |
| 2007/0175060 A1 | 8/2007 | Idei et al. | |
| 2007/0178275 A1 | 8/2007 | Takahashi | |
| 2007/0187651 A1 | 8/2007 | Naruse et al. | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0199205 A1 | 8/2007 | Hoshino et al. | |
| 2007/0199643 A1 | 8/2007 | Kawai et al. | |
| 2007/0204580 A1 | 9/2007 | Kunieda | |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0083202 A1 | 4/2008 | Kunieda et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237428 A1 | 10/2008 | Kobayashi et al. |
| 2008/0237942 A1 | 10/2008 | Takamatsu |
| 2008/0241015 A1 | 10/2008 | Kudo et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 0 449 556 A2 | 10/1991 |
| EP | 0 816 065 A1 | 1/1998 |
| EP | 965735 | 12/1999 |
| EP | 1 142 619 A1 | 10/2001 |
| EP | 1 174 399 A1 | 1/2002 |
| EP | 1 247 556 A1 | 10/2002 |
| EP | 1 249 262 | 10/2002 |
| EP | 1 413 345 A1 | 4/2004 |
| EP | 1 447 535 A1 | 8/2004 |
| EP | 1 452 511 | 9/2004 |
| EP | 1 479 881 A1 | 11/2004 |
| FR | 2 833 857 | 6/2003 |
| JP | 55-46338 | 4/1980 |
| JP | 60-141667 | 7/1985 |
| JP | 2-93297 | 4/1990 |
| JP | 6-193429 | 7/1994 |
| JP | 08/028246 | 1/1996 |
| JP | 08295576 A | 1/1996 |
| JP | 10-306203 | 11/1998 |
| JP | 11021182 A | 1/1999 |
| JP | 11049583 | 2/1999 |
| JP | 2000-102709 | 4/2000 |
| JP | 2000-279729 | 10/2000 |
| JP | 2001-98936 | 4/2001 |
| JP | 2001-162121 | 6/2001 |
| JP | 2001-190916 | 7/2001 |
| JP | 2002-273137 | 9/2002 |
| JP | 2003-117322 | 4/2003 |
| WO | 98/56531 | 12/1998 |
| WO | 01/23069 | 4/2001 |
| WO | 01/51173 | 7/2001 |
| WO | 01//93984 | 12/2001 |
| WO | 03/067041 | 8/2003 |
| WO | 03/067042 | 8/2003 |

OTHER PUBLICATIONS

Norme NF-EN 993-19 concernant la determintion Experimentale d'un CTE, 35 pages Oct. 2004.

"Communication Chambre de recours 3.3.05—Numero de recours: T0354/04" (cited in the Notice of Opposition dated Jun. 8, 2009).

Lorna J. Gibson, "Cellular Solids", Cambridge University Press, 2001, pp. 4-7, 148-149, 159-160.

David K. S. Chen, "Mechanical Behavior and Strength of Honeycomb Ceramic Cellular Substrates—A Microscopic View", The American Society of Mechanical Engineers, Nov. 25-30, 1990, pp. 1-9.

W.D. Kingery, et al., "Introduction to Ceramics", Second Edition, John Wiley & Sons, 1976, 14 pages.

A-A Line cross-sectional view (a)

(b)

HONEYCOMB FILTER FOR PURIFYING EXHAUST GASES, ADHESIVE, COATING MATERIAL, AND MANUFACTURING METHOD OF HONEYCOMB FILTER FOR PURIFYING EXHAUST GASES

CROSS REFERENCE TO RELATED APPLICATION

The present application is a continuation of and claims the benefits of priority to U.S. Ser. No. 12/116,503, filed May 7, 2008, which is a divisional of and claims the benefit of priority to U.S. Ser. No. 10/502,045, now U.S. Pat. No. 8,029,737, filed Jan. 10, 2005, which is the national stage of PCT/JP03/01151, filed Feb. 5, 2003, and claims the benefit of priority to Japanese Patent Application No. 2002-28644, filed Feb. 5, 2002, Japanese Patent Application No. 2003-4119, filed Jan. 10, 2003, and Japanese Patent Application No. 2003-12634, filed Jan. 21, 2003. The contents of all of the above applications are incorporated by reference herein.

TECHNICAL FIELD

The present invention relates to a honeycomb filter for purifying exhaust gases that is used as a filter for removing particulates, etc. contained in exhaust gases discharged from an internal combustion engine such as a diesel engine, and also concerns an adhesive and a coating material that are desirably applied to manufacturing processes for the honeycomb filter for purifying exhaust gases and the like, as well as a manufacturing method for the honeycomb filter for purifying exhaust gases.

BACKGROUND ART

In recent years, particulates, contained in exhaust gases that are discharged from inner combustion engines of vehicles, such as buses and trucks, and construction machines, have raised serious problems since those particulates are harmful to the environment and the human body. For this reason, various ceramic filters, which allow exhaust gases to pass through porous ceramics and collect particulates in the exhaust gases to purify the exhaust gases, have been proposed.

Normally, the ceramic filter of this type has a structure in that a number of through holes are arranged side by side in one direction and partition wall that separate the through holes from each other are allowed to function as filters.

In other words, each of the through holes formed in the ceramic filter is sealed with a filler at either of ends of its exhaust gas inlet side or outlet side so that exhaust gases that have entered one through hole are discharged from another through hole after having always passed through the partition wall that separates the through holes; thus, when exhaust gases are made to pass through the partition wall, particulates are captured by the partition wall so that the exhaust gases are purified.

As such a purifying process for exhaust gases progresses, particulates are gradually accumulated on the partition wall that separates the through holes of the ceramic filter to cause clogging and the subsequent hindrance in gas permeability. For this reason, the above-mentioned ceramic filter needs to be subjected to a regenerating process regularly by burning and removing the particulates that cause the clogging by the use of a heating means such as a heater.

In such a regenerating process, however, it is difficult to evenly heat the ceramic filter, with the result that heat is locally generated due to the burning of the particulates to cause a large thermal stress. Moreover, even during normal operations, an uneven temperature distribution occurs inside the ceramic filter due to a thermal impact or the like derived from an abrupt temperature change in the exhaust gases, resulting in a thermal stress.

Consequently, in the case where the ceramic filter is constituted by a single ceramic member, cracks tend to occur to cause a serious problem in collecting the particulates.

Moreover, in an attempt to produce a large-size ceramic filter, since sintering shrinkage becomes greater upon sintering, it becomes difficult to control the shape.

For this reason, a honeycomb filter having the following structure has been proposed: a ceramic filter is divided into a plurality of porous ceramic members, with a number of through holes formed therein, and the porous ceramic members are combined with one another through adhesive layers (for example, see JP Kokai Hei 8-28246 and JP Kokai 2001-190916).

With the honeycomb filter of this type, it becomes possible to reduce a thermal stress that is exerted on the honeycomb filter during regenerating processes and operations, and also to freely adjust the size thereof by increasing or reducing the number of the porous ceramic members.

However, in the conventional honeycomb filter having this structure, it has been considered that it is desirable to set the thermal expansion coefficient of the porous ceramic member and the thermal expansion coefficient of the adhesive layer in the same level.

The reason for this is explained as follows. Actually, the above-mentioned honeycomb filter is used in a wide temperature range, for example, from 10 to 800° C., and when the thermal expansion coefficient of the porous ceramics member is different from the thermal expansion coefficient of the adhesive layer, cracks tend to occur in the porous ceramic member and the adhesive layer due to the difference in the coefficients of these members.

However, in the case where the thermal expansion coefficient of the porous ceramic member and the thermal expansion coefficient of the adhesive layer are made completely identical to each other, this case is the same as the case using a single ceramic member; therefore, when particulates are burned locally in the honeycomb filter, that is, when a local temperature change occurs therein, due to: uneven amounts of accumulated particulates; uneven amounts of catalyst upon allowing the honeycomb filter to bear the catalyst and unevenness of heat applied by a heater; exhaust gases and the like, a great thermal stress is generated between the portion having this local temperature change and the other portions, with the result that cracks tend to occur in the porous ceramic member and the adhesive layer.

Moreover, in recent years, in order to quickly raise the temperature inside the honeycomb filter by the heat of exhaust gases, methods for reducing the thermal capacity of the honeycomb filter has been examined. In the case where a catalyst that is capable of purifying CO, HC, NOx and the like in exhaust gases is supported on the honeycomb filter having such a low thermal capacity, since the temperature of the honeycomb filter is easily raised to a catalyst-active temperature by using high-temperature exhaust gases and the like, the above-mentioned honeycomb filter can also be used desirably as a catalyst supporting body.

Furthermore, in an attempt to prevent a pressure (back pressure) imposed at the portion from the engine to the honeycomb filter from becoming too high even when the engine is driven with a large amount of catalyst supported on the honeycomb filter, techniques for increasing the porosity of the honeycomb filter have been considered.

In the case of such honeycomb filters having a low thermal capacity and a high porosity; however, since the density is low and the strength is poor, the resulting problem is that the honeycomb filter tends to be damaged in the manufacturing processes to cause low yield. Moreover, even in the case of those filters obtained without damages in the manufacturing processes, when a local temperature change occurs therein, due to uneven amounts of accumulated particulates, uneven amounts of catalyst upon allowing the honeycomb filter to bear the catalyst and unevenness of heat applied by a heater, exhaust gases and the like, a great thermal stress is exerted between the portion having this local temperature change and the other portions, with the result that cracks tend to occur in the porous ceramic member and the adhesive layer.

Moreover, in an attempt to prevent exhaust gases from leaking from the peripheral portion when the honeycomb filter is placed in an exhaust gas passage of an inner combustion engine, upon manufacturing a honeycomb filter, a surface treatment is normally carried out in which, a coating material layer is formed on the circumferential portion thereof by using a coating material to fill the through holes exposed by the cutting processes or the like, after the shape of the circumference of the honeycomb filter has been formed into a cylinder shape or the like through cutting processes or the like.

Conventionally, with respect to the coating material to be used in the surface treatment, JP Kokai 2000-102709 has disclosed a material that contains at least inorganic fibers, an inorganic binder, an organic binder and inorganic particles.

Here, in order to manufacture a honeycomb filter having a low thermal capacity and a high porosity, there have been demands for a coating material layer that has a low thermal capacity and a superior heat-insulating property, and is capable of alleviating a thermal stress that has been generated, to reinforce the honeycomb filter; however, conventional coating materials have been failing to form a coating material layer that can sufficiently satisfy these characteristics.

Moreover, it has been found that, with respect to honeycomb filters having various external shapes in the cross-section, that is, not only a rectangular shape but also a round shape and an elliptical shape, the formation of the coating material layer after shape-machining process such as cutting causes considerable degradation in the outside dimensional precision.

SUMMARY OF THE INVENTION

The present invention has been devised so as to solve the above-mentioned problems, and its object is to provide a honeycomb filter for purifying exhaust gases that can alleviate a thermal stress generated due to a local temperature change occurring in the honeycomb filter, and is superior in strength, durability and temperature rising property, without causing any cracks, an adhesive that has a low thermal capacity and is capable of alleviating the generated thermal stress, a coating material that has a low thermal capacity with a superior heat insulating property, and is capable of alleviating the generated thermal stress, and a manufacturing method for the honeycomb filter that can improve the outside dimensional precision and reduce damages in the manufacturing processes.

In accordance with the first aspect of the present invention, a honeycomb filter for purifying exhaust gases has a structure in which: a plurality of a columnar porous ceramic member are combined with one another through adhesive layer, each of the above-mentioned columnar porous ceramic member comprising a number of through holes that are placed in parallel with one another in the length direction with partition wall interposed therebetween and; the above-mentioned partition wall which separates the above-mentioned through holes functions as a filter for collecting particulates wherein the relationship between a thermal expansion coefficient $\alpha_L$ of the above-mentioned adhesive layer and a thermal expansion coefficient $\alpha_F$ of the above-mentioned porous ceramic member is as follows:

$$0.01 < |\alpha_L - \alpha_F|/\alpha_F < 1.0.$$

In accordance with the second aspect of the present invention, a honeycomb filter for purifying exhaust gases has a structure in which: a coating material layer is formed on the circumferential face of a ceramic block which comprises at least one of a columnar porous ceramic member, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the relationship between the thermal expansion coefficient $\alpha_M$ of the coating material layer and the thermal expansion coefficient $\alpha_F$ of the porous ceramic member are as follows:

$$0.01 < |\alpha_M - \alpha_F|/\alpha_F < 1.0.$$

In accordance with the third aspect of the present invention, a honeycomb filter for purifying exhaust gases has a structure in which: a plurality of a columnar porous ceramic member are combined with one another through adhesive layer to constitute a ceramic block, a coating material layer is formed on the circumferential face of the above-mentioned ceramic block, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the relationship between the thermal expansion coefficient $\alpha_L$ of the adhesive layer and the thermal expansion coefficient $\alpha_F$ of the porous ceramic member are as follows:

$$0.01 < |\alpha_L - \alpha_F|/\alpha_F < 1.0,$$

and the relationship between the thermal expansion coefficient $\alpha_M$ of the coating material layer and the thermal expansion coefficient $\alpha_F$ of the porous ceramic member are as follows:

$$0.01 < |\alpha_M - \alpha_F|/\alpha_F < 1.0.$$

In accordance with the fourth aspect of the present invention, a honeycomb filter for purifying exhaust gases has a structure in which: a plurality of a columnar porous ceramic member are combined with one another through adhesive layer, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the adhesive layer has a thermal capacity per unit volume that is lower than the thermal capacity per unit volume of the porous ceramic member.

The adhesive of the present invention is characterized by comprising a material that is capable of forming independent pores.

In accordance with the fifth aspect of the present invention, a honeycomb filter for purifying exhaust gases which has a structure in which: a plurality of a columnar porous ceramic member are combined with one another through adhesive layer, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the adhesive layer is made of the adhesive of the present invention.

In accordance with the sixth aspect of the present invention, a honeycomb filter for purifying exhaust gases which has a structure in which: a coating material layer is formed on the circumferential face of a ceramic block which comprises at least one of a columnar porous ceramic member, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the coating material layer has a thermal capacity per unit volume that is lower than the thermal capacity per unit volume of the porous ceramic member.

The coating material of the present invention is characterized by comprising a material that is capable of forming independent pores.

In accordance with the seventh aspect of the present invention, a honeycomb filter for purifying exhaust gases which has a structure in which: a coating material layer is formed on the circumferential face of a ceramic block which comprises at least one of a columnar porous ceramic member, each of the above-mentioned columnar porous ceramic member comprising a number of through holes that are placed in parallel with one another in the length direction with partition wall interposed therebetween wherein the coating material layer is formed by using the coating material of the present invention.

In accordance with the eighth aspect of the present invention, a honeycomb filter for purifying exhaust gases has a structure in which: a plurality of a columnar porous ceramic member are combined with one another through adhesive layer to constitute a ceramic block, a coating material layer is formed on the circumferential face of the above-mentioned ceramic block each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the thermal capacity per unit volume of the adhesive layer and the thermal capacity per unit volume of the coating material layer are lower than the thermal capacity per unit volume of the porous ceramic member.

In accordance with the ninth aspect of the present invention, a honeycomb filter for purifying exhaust gases has a structure in which: a plurality of a columnar porous ceramic member are combined with one another through adhesive layer to constitute a ceramic block, a coating material layer is formed on the circumferential face of the above-mentioned ceramic block each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the adhesive layer is formed by using the adhesive of the present invention, and the coating material layer is formed by using the coating material of the present invention.

A manufacturing method of a honeycomb filter for purifying exhaust gases is used for a honeycomb filter for purifying exhaust gases having structure in which: a plurality of a columnar porous ceramic member are combined with one another through adhesive layer to form a ceramic laminated body, and the above-mentioned ceramic laminated body is subjected to a machining process to constitute a ceramic block, the above-mentioned ceramic block having a filled layer formed on the circumference part thereof each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates which comprises steps of: the coating material filling step, in which, assuming that a border line formed by an end face of a ceramic block to be manufactured is superposed on an end face of the above-mentioned ceramic laminated body formed by combining a plurality of the porous ceramic members with one another through the adhesive layer, a coating material is filled into the through holes of the porous ceramic member that crosses the border line; and the ceramic block manufacturing process, in which the ceramic laminated body filled with the above-mentioned coating material is subjected to a machining process so that a ceramic block is manufactured.

Figure 1:
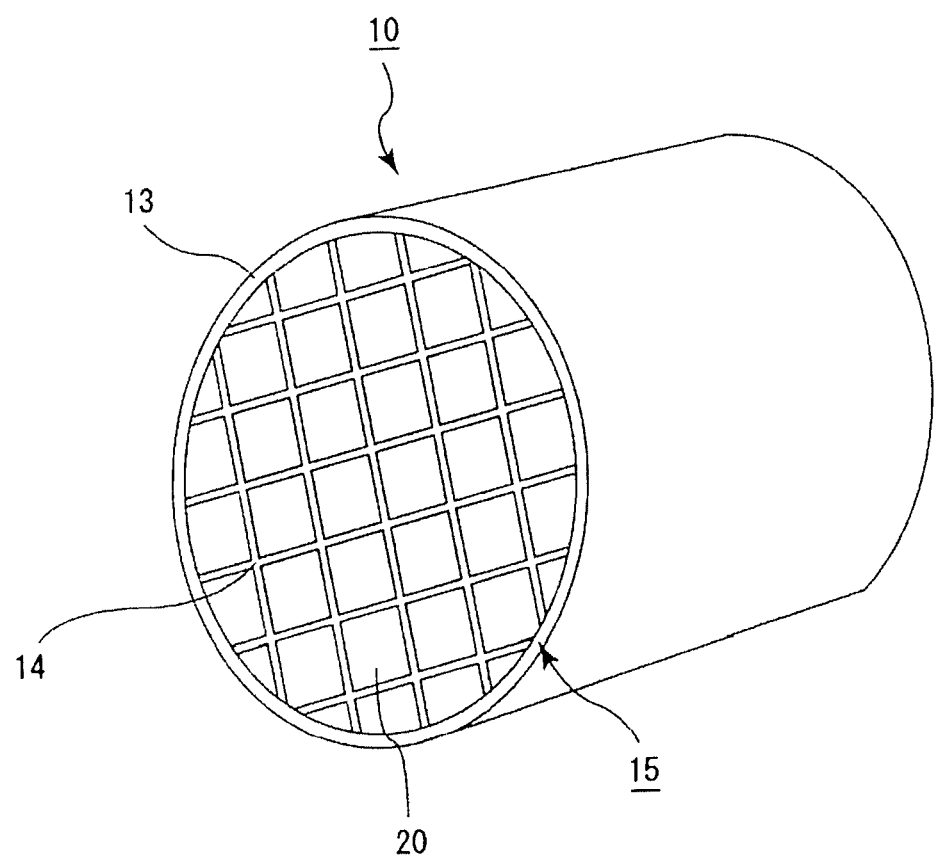
FIG. 1 is a perspective view that schematically shows one example of a honeycomb filter for purifying exhaust gases according to a first aspect of the present invention.

| EXPLANATION OF SYMBOLS | |
|---|---|
| 10 | honeycomb filter for purifying exhaust gases |
| 13 | coating material layer |
| 14 | adhesive layer |
| 15 | ceramic block |
| 20 | porous ceramic member |
| 21 | through hole |
| 22 | plug |
| 23 | partition wall |
| 24 | filled layer |
| 25 | porous ceramic member filled with coating material |
| 26 | circumferential portion of porous ceramic member after machining processes |
| 30 | ceramic laminated body |
| 100, 200 | coating material filling device |
| 110, 210 | coating material discharging tank |
| 111, 211, 221 | mask |
| 111a | opening |
| 111b | crosslinked portion |
| 120 | coating material |
| 220 | pressure reducing device |

DETAILED DISCLOSURE OF THE INVENTION

The first aspect of the present invention relates to a honeycomb filter for purifying exhaust gases which has a structure in which:

a plurality of a columnar porous ceramic member are combined with one another through adhesive layer, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the relationship between a thermal expansion coefficient $\alpha_L$ of the above-mentioned adhesive layer and a thermal expansion coefficient $\alpha_F$ of the above-mentioned porous ceramic member is as follows:

$$0.01 < |\alpha_L - \alpha_F|/\alpha_F < 1.0.$$

The above-mentioned relational expression between the thermal expansion coefficient $\alpha_L$ of the adhesive layer and the thermal expansion coefficient $\alpha_F$ of the porous ceramic member, $|\alpha_L - \alpha_F|/\alpha_F$, has a lower limit value exceeding 0.01 and an upper limit value of less than 1.0. Here, when measured at several points in a temperature range from 300 to 900° C., the value of the relational expression is desirably satisfied by the respective measured values; however, the average value of these may satisfy the above-mentioned relational expression.

In the case where the above-mentioned relational expression, $|\alpha_L - \alpha_F|/\alpha_F$, is 0.01 or less, the thermal expansion coefficient of the adhesive layer becomes substantially the same as the thermal expansion coefficient of the porous ceramic member, with the result that it is unable to alleviate a local thermal stress that is caused when local burning occurs in the honeycomb filter due to unevenness in the accumulated amount of particulates, unevenness in the amount of catalyst upon placing the catalyst, uneven heating caused by a heater and exhaust gases and the like; consequently, cracks occur in the porous ceramic member and the adhesive layer, with the result that the strength of the honeycomb filter is lowered to cause leak of exhaust gases. In contrast, when the above-mentioned relational expression, $|\alpha_L - \alpha_F|/\alpha_F$, is 1.0 or more, the difference between the thermal expansion of the adhesive layer and the thermal expansion of the porous ceramic member due to a temperature difference among exhaust gases becomes too large upon normal operations of the honeycomb filter, with the result that cracks occur in the porous ceramic member and the adhesive layer to cause a reduction in the strength of the honeycomb filter and leak of exhaust gases.

Here, the lower limit of the above-mentioned relational expression, $|\alpha_L - \alpha_F|/\alpha_F$, is desirably set to a value exceeding 0.02, and the upper limit thereof is desirably set to a value of less than 0.5. Thus, it becomes possible to more positively prevent generation of cracks in the porous ceramic member and the adhesive layer.

Not particularly limited, the coefficient $\alpha_F$ of the porous ceramic member, which is appropriately determined depending on the ceramic material and the like to be used, is desirably set in a range from $0.1 \times 10^{-6}$ to $10.0 \times 10^{-6}$ (1/K). In the case where the thermal expansion coefficient $\alpha_F$ of the porous ceramic member is less than $0.1 \times 10^{-6}$ (1/K), the thermal expansion coefficient becomes so small that it sometimes causes a difficulty in selecting the ceramic material; in contrast, in the case of the thermal expansion coefficient $\alpha_F$ of the porous ceramic member exceeding $10.0 \times 10^{-6}$ (1/K), since, during normal processes of the honeycomb filter of the first aspect of the present invention, the porous ceramic member expands or shrinks greatly, cracks tend to occur easily in the porous ceramic member and the adhesive layer.

Not particularly limited, the coefficient $\alpha_L$ of the adhesive layer, which is appropriately determined such that it satisfies the above-mentioned inequalities, $0.01 < |\alpha_L - \alpha_F|/\alpha_F < 1.0$, in association with the thermal expansion coefficient $\alpha_F$ of the porous ceramic member, is desirably set in a range from $0.1 \times 10^{-6}$ to $10.0 \times 10^{-6}$ (1/K). In the case where the thermal expansion coefficient $\alpha_L$ of the adhesive layer is less than $0.1 \times 10^{-6}$ (1/K), it sometimes becomes difficult to select the material In contrast, in the case of the thermal expansion coefficient $\alpha_L$ of the adhesive layer exceeding $10.0 \times 10^{-6}$ (1/K), since, during normal processes of the honeycomb filter of the present invention, the adhesive layer expands or shrinks greatly, cracks tend to occur in the porous ceramic member and the adhesive layer.

Here, in the above-mentioned relational expression, the numerator portion indicating the difference, $\alpha_L - \alpha_F$, between the thermal expansion coefficient $\alpha_L$ of the adhesive layer and the thermal expansion coefficient $\alpha_F$ of the porous ceramic member is represented by the absolute value because the thermal expansion coefficient $\alpha_F$ of the porous ceramic member occasionally becomes greater than the thermal expansion coefficient $\alpha_L$ of the adhesive layer, depending on materials of the adhesive layer and the porous ceramic member to be used and temperatures.

Next, referring to Figures, the following description will explain respective members constituting the honeycomb filter of the first aspect of the present invention in detail.

FIG. 1 is a perspective view that schematically shows one example of a honeycomb filter of the present invention, and FIG. 2(a) is a perspective view that schematically shows one example of a porous ceramic member that forms the honeycomb filter of the present invention, and FIG. 2(b) is a cross-sectional view taken along line A-A of FIG. 2(a).

Figure 2:
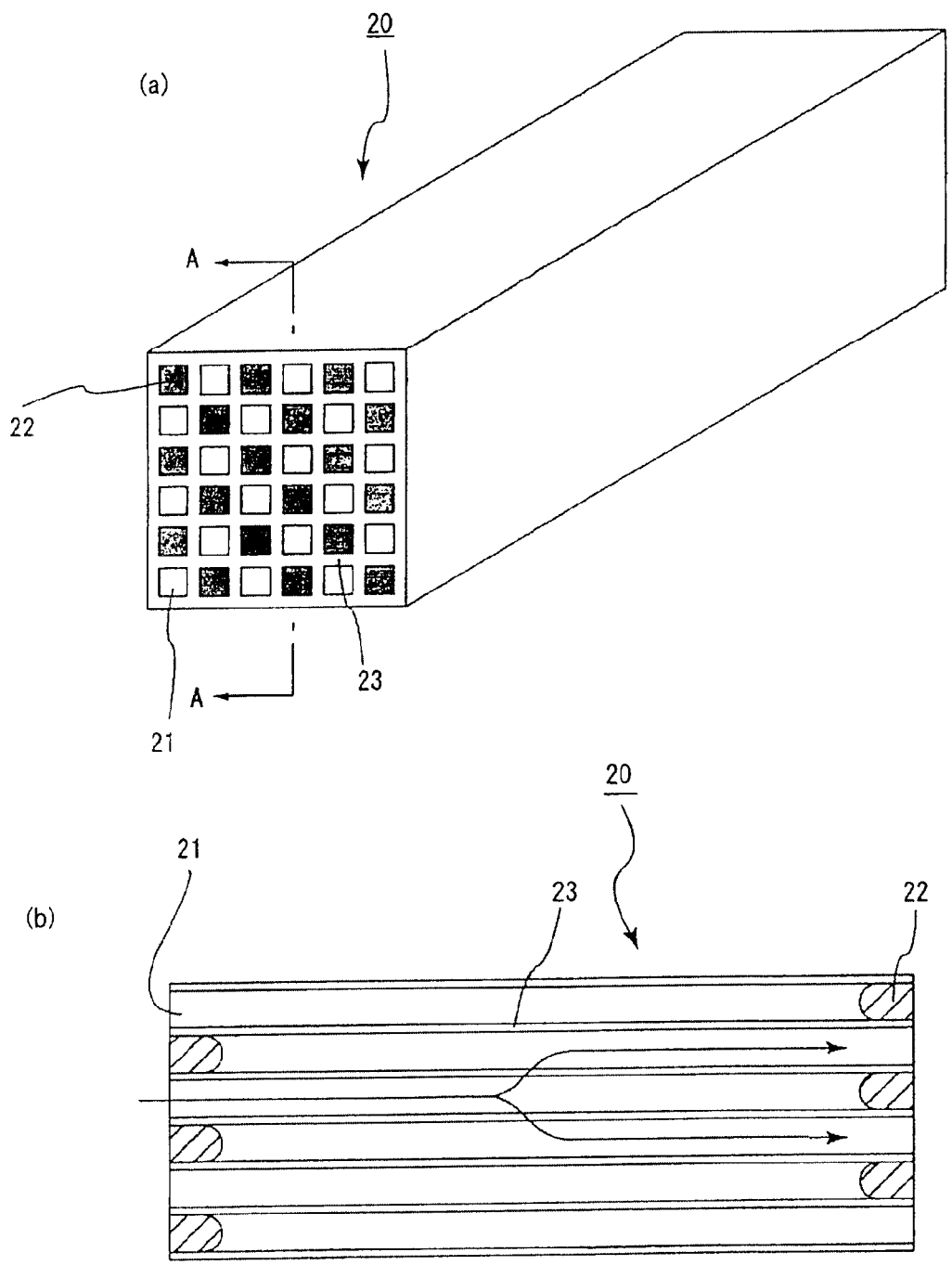
FIG. 2(a) is a perspective view that schematically shows a porous ceramic member used in the honeycomb filter according to the first aspect of the present invention shown in FIG. 1.
FIG. 2(b) is a cross-sectional view taken along line A-A of FIG. 2(a).

As shown in FIG. 1, in the honeycomb filter 10 of the first aspect of the present invention, a plurality of porous ceramic members 20 are combined with one another through adhesive layers 14 to form a ceramic block 15, and a coating material layer 13 is formed on the circumference of the ceramic block 15. Here, as shown in FIG. 2, the porous ceramic member 20 has a structure in that a number of through holes 21 are placed side by side in the length direction so that the partition wall 23 that separates the through holes 21 from each other is allowed to function as a filter.

In other words, as shown in FIG. 2(b), each of the through holes 21 formed in the porous ceramic member 20 has either of its ends on the inlet-side or outlet-side of exhaust gases sealed with a plug 22; thus, exhaust gases that have entered one of the through holes 21 are allowed to flow out of another through hole 21 after always passing through the partition wall 23 that separates the corresponding through holes 21.

Moreover, the coating material layer 13 is placed so as to prevent exhaust gases from leaking through the circumferential portion of each ceramic block 15 when the honeycomb filter 10 is placed in an exhaust passage of an internal combustion engine.

The honeycomb filter 10 having the above-mentioned structure is placed in the exhaust passage in an inner combustion engine so that particulates in the exhaust gases discharged from the internal combustion engine are captured by the partition wall 23 when passing through the honeycomb filter 10; thus, the exhaust gases are purified.

Since the honeycomb filter 10 of this type has superior heat resistance and provides easy regenerating processes and the like, it has been applied to various large-size vehicles and vehicles with diesel engines.

With respect to the material for the porous ceramic member 20, not particularly limited, examples thereof include: nitride ceramics such as aluminum nitride, silicon nitride, boron nitride, titanium nitride, and the like carbide ceramics such as silicon carbide, zirconium carbide, titanium carbide, tantalum carbide, tungsten carbide and the like, and oxide ceramics such as alumina, zirconia, cordierite, mullite and the like. In particular, silicon carbide, which has great heat resistance, superior mechanical properties and great thermal conductivity, is desirably used. Here, silicon-containing ceramics in which metallic silicon is blended in the above-mentioned ceramics and ceramics that are combined by silicon and a silicate compound may be used.

Although not particularly limited, the porosity of the porous ceramic member 20 is desirably set to about 40 to 80%. When the porosity is less than 40%, the honeycomb filter 10 of the present invention is more susceptible to clogging, while the porosity exceeding 80% causes degradation in the strength of the porous ceramic members, with the result that it might be easily broken.

Here, the above-mentioned porosity can be measured through known methods, such as a mercury press-in method, Archimedes method, a measuring method using a scanning electronic microscope (SEM) and the like.

The average pore diameter of the porous ceramic members 20 is desirably set in a range from 5 to 100 µm. The average pore diameter of less than 5 µm tends to cause clogging of particulates easily. In contrast, the average pore diameter exceeding 100 µm tends to cause particulates to pass through the pores, with the result that the particulates cannot be collected, making the members unable to function as a filter.

With respect to the particle size of ceramic particles to be used upon manufacturing the porous ceramic members 20, although not particularly limited, those which are less likely to shrink in the succeeding sintering process are desirably used, and for example, those particles, prepared by combining 100 parts by weight of particles having an average particle size from 0.3 to 50 µm with 5 to 65 parts by weight of particles having an average particle size from 0.1 to 1.0 µm, are desirably used. By mixing ceramic powders having the above-mentioned respective particle sizes at the above-mentioned blending ratio, it is possible to provide a porous ceramic member 20.

With respect to the material forming the adhesive layer 14, not particularly limited, for example, a material comprising an inorganic binder, an organic binder, inorganic fibers and inorganic particles may be used.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers, such as silica-alumina, mullite, alumina and silica. Each of these may be used alone or two or more kinds of these may be used in combination. Among the inorganic fibers, silica-alumina fibers are more desirably used.

With respect to the inorganic particles, examples thereof include carbides, nitrides and the like, and specific examples include inorganic powder or whiskers of silicon carbide, silicon nitride and boron nitride. Each of these may be used alone, or two or more kinds of these may be used in combination. Among the inorganic fine particles, silicon carbide having superior thermal conductivity is desirably used.

Moreover, the adhesive layer 14 may contain a foaming agent. Since the foaming agent is capable of changing the porosity of the adhesive layer 14, it becomes possible to adjust the thermal expansion coefficient $\alpha_L$ in the adhesive layer 14.

With respect to the foaming agent, not particularly limited as long as it is decomposed upon heating at the time of use, examples thereof include known foaming agents, such as ammonium hydrogencarbonate, ammonium carbonate, amyl acetate, butyl acetate, diazo amino benzene and the like.

Moreover, the adhesive layer 14 may contain a resin such as a thermoplastic resin and a thermosetting resin, balloons made from an inorganic substance, an organic substance, and the like. These materials make it possible to control the porosity of the adhesive layer 14, and consequently to adjust the thermal expansion coefficient $\alpha_L$ of the adhesive layer 14.

With respect to the thermoplastic resin, not particularly limited, examples thereof include: acrylic resin, phenoxy resin, polyether sulfone, polysulfone and the like, and with respect to the above-mentioned thermosetting resin, not particularly limited, examples thereof include: epoxy resin, phenolic resin, polyimide resin, polyester resin, bismaleimide resin, polyolefin-based resin, polyphenylene ether resin and the like.

With respect to the shape of these resins, not particularly limited, examples thereof include desired shapes, such as a spherical shape, an oval (elliptical) shape, a cube shape, an unfixed lump shape, a column shape, plate shape and the like.

In the case of the spherical shape of the resin, the average particle size is desirably set in a range from 30 to 300 μm.

Here, the balloon is a concept including the bubble and the hollow sphere shape, and with respect to the above-mentioned organic balloon, not particularly limited, examples thereof include acrylic balloons, polyester balloons and the like; and with respect to the above-mentioned inorganic balloon, not particularly limited, examples thereof include alumina balloons, glass micro-balloons, shirasu balloons, fly ash balloons (FA balloons), mullite balloons and the like.

The shape and the average particle size of these balloons are desirably set in the same manner as the above-mentioned resins.

Here, the addition of the foaming agent, the resin, such as a thermoplastic resin and a thermosetting resin, and the organic balloons to the adhesive layer 14 makes it possible to adjust the thermal expansion coefficient $\alpha_L$ of the adhesive layer 14 because of the following reasons. At the time of manufacturing of the honeycomb filter of the first aspect of the present invention, the above-mentioned materials are dispersed in the adhesive layer in a substantially uniform state; however, when the honeycomb filter is actually used, and they are heated to a high temperature, the organic components such as the foaming agent are decomposed to be burned thus pores are formed in the adhesive layer. It is assumed that at this time, by adjusting the porosity, the pore diameter and the like of the pores formed in the adhesive layer, the thermal expansion coefficient $\alpha_L$ of the adhesive layer can be adjusted to an appropriate value. As a result, the relational expression, $|\alpha_L - \alpha_F|/\alpha_F$, between the thermal expansion coefficient $\alpha_L$ of the adhesive layer and the thermal expansion coefficient $\alpha_F$ of the porous ceramic member is set within the above-mentioned range. Here, in the case where the inorganic balloons are contained therein, they adjust the porosity and the like while remaining in the adhesive layer.

Here, the above-mentioned adhesive layer 14 is defined on the assumption of the state prior to the actual application of the honeycomb filter of the first aspect of the present invention, that is, the state where the adhesive layer has never been heated by exhaust gases and the like; therefore, when the honeycomb filter of the first aspect of the present invention is used and the adhesive layer 14 is heated to a high temperature by exhaust gases and the like, the above-mentioned organic components such as the organic binder, the foaming agent, the resin and the organic balloons are decomposed and burned to be eliminated.

In the honeycomb filter 10 shown in FIG. 1, the shape of the ceramic block 15 is a column shape; however, in the honeycomb filter of the first aspect of the present invention, the shape of the ceramic block is not limited to the column shape, and may be formed into a desired-shape such as an elliptical column shape or a rectangular column shape.

Moreover, with respect to the coating material layer 13 formed on the circumference of the ceramic block 15, not particularly limited, for example, the same material as that of the adhesive layer 14 may be used.

Furthermore, the honeycomb filter of the first aspect of the present invention may have a catalyst capable of purifying CO, HC, NOx and the like in the exhaust gases.

When such a catalyst is supported thereon, the honeycomb filter of the first aspect of the present invention is allowed to function as a catalyst supporting member for purifying CO, HC, NOx and the like contained in exhaust gases as well as functioning as a filter capable of collecting particulates in exhaust gases.

With respect to the catalyst to be supported on the honeycomb filter of the present invention, not particularly limited as long as it can purify CO, HC, NOx and the like in exhaust gases, examples thereof include noble metals such as platinum, palladium rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the first aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the first aspect of the present invention also serves as a catalyst supporting member is omitted.

As described above, in the honeycomb filter of the first aspect of the present invention, the thermal expansion coefficient $\alpha_L$ of the adhesive layer and the thermal expansion coefficient $\alpha_F$ of the porous ceramic member are designed to have the following relationship:

$$0.01 < |\alpha_L - \alpha_F|/\alpha_F < 1.0.$$

In other words, in the constituent components of the honeycomb filter of the first aspect of the present invention, the thermal expansion coefficient of the adhesive layer and the thermal expansion coefficient of the porous ceramic member are not the same, but slightly different from each other. For this reason, even in the case where local burning, that is, a local temperature change, occurs due to: unevenness in the accumulated amount of particulates; unevenness in the amount of catalyst upon placing the catalyst; uneven heating caused by a heater and exhaust gases and the like, the honeycomb filter of the present invention makes it possible to properly alleviate a local thermal stress that is exerted between the portion having the local temperature change and portions other than this portion, thereby preventing generation of cracks in the porous ceramic member and the adhesive layer.

Therefore, the honeycomb filter of the first aspect of the present invention is superior in strength and durability.

Next, referring to FIGS. 1 and 2, the following description will explain one example of a manufacturing method for the honeycomb filter of the first aspect of the present invention.

In order to manufacture the honeycomb filter of the first aspect of the present invention, first, a ceramics laminated body that forms a ceramic block 15 is produced.

This ceramic laminated body has a rectangular column-shaped structure in that a plurality of rectangular column-shaped porous ceramic members 20, each having a structure in that a number of through holes 21 are arranged side by side in the length direction with partition wall 23 interposed therebetween, are combined with one another through adhesive layers 14.

Upon manufacturing the porous ceramic member 20, first, a binder and a dispersant solution are added to the above-mentioned ceramics powder to prepare a mixed composition.

With respect to the above-mentioned binder, not particularly limited, examples thereof include: methylcellulose, carboxy methylcellulose, hydroxy ethylcellulose, polyethylene glycol, phenolic resin, epoxy resin and the like.

The blended amount of the above-mentioned binder is desirably set to 1 to 10 parts by weight with respect to 100 parts by weight of ceramic powder.

With respect to the dispersant solution, not particularly limited, examples thereof include: an organic solvent such as benzene; alcohol such as methanol; water and the like.

An appropriate amount of the above-mentioned dispersant solution is mixed therein so that the viscosity of the mixed composition is set within a fixed range.

These ceramic powder, binder and dispersant solution are mixed by an attritor or the like, and sufficiently kneaded by a kneader or the like, and then extrusion-formed so that a column-shaped raw formed body having substantially the same shape as the porous ceramic member shown in FIG. 2 is produced.

After the above-mentioned raw formed body has been dried by using a microwave drier or the like, a mouth-sealing process which fills a sealant material (plug) into predetermined through holes, and this is again subjected to a drying process using a microwave drier or the like.

With respect to the above-mentioned sealant material (plug), not particularly limited, for example, the same material as the above-mentioned mixed composition may be used.

Next, the raw formed body that has been subjected to the mouth-sealing process is heated at 400 to 650° C. in an oxygen-containing atmosphere so as to be degreased so that the binder and the like are decomposed and eliminated to allow only the ceramic powder to remain therein.

Next, the raw formed body that has been degreased is fired by heating it at 1400 to 2200° C. in an inert gas atmosphere such as nitrogen and argon so that the ceramics powder is sintered to produce a porous ceramic member 20.

Here, the thermal expansion coefficient $\alpha_F$ of the porous ceramic member 20 thus formed is determined by a ceramics material to be used.

Figure 3:
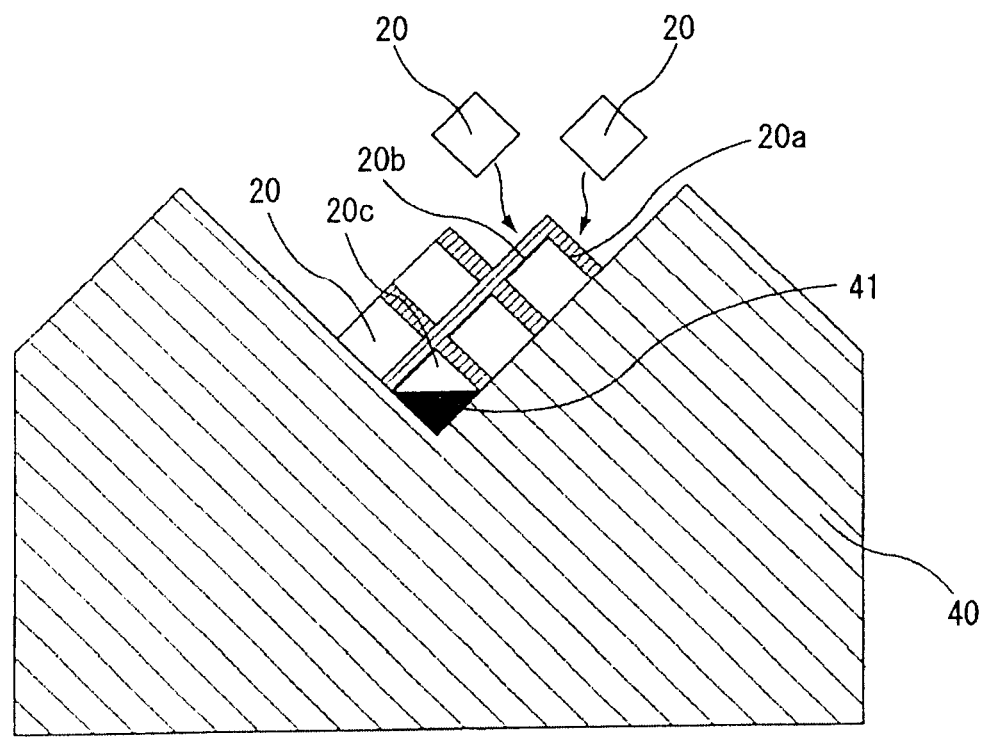
FIG. 3 is a side view that schematically shows manufacturing processes of the honeycomb filter of the present invention.

Next, as shown in FIG. 3, a ceramic laminated body is formed.

In other words, first, porous ceramic members 20 are placed on a base 40 the upper portion of which is designed to have a V shape in its cross-section so as to allow the porous ceramic members 20 to be stacked thereon in a tilted manner, and adhesive paste to form an adhesive layer 14 is then applied onto two side faces 20a and 20b facing upward with an even thickness to form an adhesive paste layer; thereafter, a laminating process for forming another porous ceramic member 20 on this adhesive paste layer is successively repeated so that a rectangular column-shaped ceramic laminated body having a predetermined size is manufactured. At this time, with respect to the porous ceramic members 20 corresponding to four corners of the ceramic laminated body, a triangular column-shaped porous ceramic member 20c, which is formed by cutting a quadrangular column-shaped porous ceramic member into two, is bonded to a resin member 41 having the same shape as the triangular column-shaped porous ceramic member 20c by using a both-sides tape with easy peelability to prepare a corner member, and these corner members are used for the four corners of the ceramic laminated body, and after the lamination processes of the porous ceramic members 20, all the resin members 41 forming the four corners of the ceramic laminated body are removed; thus, a ceramic laminated body having a polygonal column-shape in its cross section may be formed. With this arrangement, it is possible to reduce the quantity of a waste corresponding to porous ceramic members to be disposed of, after cutting the peripheral portion of the ceramic laminated body.

With respect to a method for manufacturing the ceramic laminated body having a polygonal column-shape in its cross section except for the method shown in FIG. 3, for example, a method in which the porous ceramic members to be located on four corners are omitted and a method in which porous ceramic members having a triangular shape are combined with one another may be used in accordance with the shape of a honeycomb filter to be manufactured. Here, a quadrangular column-shaped ceramic member may of course be manufactured.

Further, this ceramic laminated body is heated in a temperature range from 50 to 100° C. for about an hour so that the adhesive paste layer is dried and solidified to form an adhesive layer 14; thereafter, by cutting the peripheral portion thereof by using a diamond cutter or the like into a shape as shown in FIG. 1, thus a ceramic block 15 is formed.

With respect to the material for forming the adhesive layer 14, not particularly limited, for example, the above-mentioned adhesive paste containing materials such as an inorganic binder, an organic binder, inorganic fibers and inorganic particles may be used.

Moreover, the above-mentioned adhesive paste may contain small amounts of moisture, solvents and the like; and most of such moisture and solvents are normally scattered by heating and the like after application of the adhesive paste.

Here, it is necessary to adjust the thermal expansion coefficient $\alpha_L$ of the adhesive layer 14 so as to allow the thermal expansion coefficient $\alpha_L$ of the adhesive layer 14 and the thermal expansion coefficient $\alpha_F$ of the porous ceramic member 20 to satisfy the following relationship:

$$0.01 < |\alpha_L - \alpha_F|/\alpha_F < 1.0.$$

In order to adjust the thermal expansion coefficient $\alpha_L$ of the adhesive layer 14, it is necessary to change the material blend, the porosity and the materials; and with respect to the method, not particularly limited, examples thereof includes: a method in which the above-mentioned foaming agent and resins, such as a thermoplastic resin and a thermosetting resin, as well as organic balloons, are added to the above-mentioned adhesive paste; and a method in which the stirring time of the adhesive paste to be prepared is changed; and the like.

Moreover, the lower limit of the content of the inorganic binder is desirably set to 1% by weight, more desirably, to 5% by weight, on the solid component basis. The upper limit of the content of the inorganic binder is desirably set to 30% by weight, more desirably to 15% by weight, most desirably to 9% by weight, on the solid component basis. The content of the inorganic binder of less than 1% by weight tends to cause degradation in the bonding strength, in contrast, the content exceeding 30% by weight tends to cause degradation in the thermal conductivity.

The lower limit of the content of the above-mentioned organic binder is desirably set to 0.1% by weight, more desirably to 0.2% by weight, most desirably to 0.4% by weight, on the solid component basis. The upper limit of the content of the organic binder is desirably set to 5.0% by weight, more desirably to 1.0% by weight, most desirably to 0.6% by weight, on the solid component basis. The content of the organic binder of less than 0.1% by weight tends to cause a difficulty in preventing migration of the adhesive layer 14, while the content exceeding 5.0% by weight tends to cause the problem that the organic binder is burned to be lost to cause degradation in the bonding strength, when the adhesive layer 14 is exposed to high temperature.

The lower limit of the content of the above-mentioned inorganic fibers is desirably set to 10% by weight, more desirably to 20% by weight, on the solid component basis. The upper limit of the content of the inorganic fibers is desirably set to 70% by weight, more desirably to 40% by weight, most desirably to 30% by weight, on the solid component basis. The content of the inorganic fibers of less than 10% by weight tends to cause degradation in the elasticity and strength, while the content exceeding 70% by weight tends to cause degradation in the thermal conductivity and a reduction in its effects as an elastic member.

The lower limit of the content of the above-mentioned inorganic particles is desirably set to 3% by weight, more desirably to 10% by weight, most desirably to 20% by weight, on the solid component basis. The upper limit of the content of the inorganic particles is desirably set to 80% by weight, more desirably to 60% by weight, most desirably to 40% by weight, on the solid component basis. The content of the inorganic particles of less than 3% by weight tends to cause a reduction in the thermal conductivity, while the content exceeding 80% by weight tends to cause degradation in the bonding strength, when the adhesive layer 14 is exposed to high temperature.

The lower limit of the shot content of the above-mentioned inorganic fibers is desirably set to 1% by weight, while the upper limit thereof is desirably set to 10% by weight, more desirably to 5% by weight, most desirably to 3% by weight. Moreover, the lower limit of the fiber length is desirably set to 1 μm, while the upper limit thereof is desirably set to 100 mm, more desirably to 1000 μm, most desirably to 500 μm.

It is difficult to set the shot content to less than 1% by weight in the manufacturing, and the shot content exceeding 10% by weight tends to damage the wall faces of the porous ceramic members 20. Moreover, the fiber length of less than 1 μm makes it difficult to form a honeycomb filter 10 with proper elasticity, while the fiber length exceeding 100 mm tends to form a shape like a pill to cause insufficient dispersion of the inorganic particles, failing to make the thickness of the adhesive layer 14 thinner.

The lower limit of the particle size of the inorganic powder is desirably set to 0.01 μm, more desirably to 0.1 μm. The upper limit of the particle size of the inorganic particles is desirably set to 100 μm, more desirably to 15 μm, most desirably to 10 μm. The particle size of the inorganic particles of less than 0.01 μm tends to cause high costs, while the particle size of the inorganic particles exceeding 100 μm tends to cause a reduction in the filling rate and the subsequent degradation in the bonding strength and thermal conductivity.

In addition to the above-mentioned inorganic fibers, inorganic binder, organic binder and inorganic particles, the adhesive paste may also contain moisture and other solvents such as acetone and alcohol at a total weight of 35 to 65% by weight in order to make the adhesive paste softer to impart the fluidity thereto so as to be easily applied, and the viscosity of the adhesive paste is desirably set in a range from 15 to 25 P·s (10000 to 20000 cps (cP)).

Next, a coating material forming process is carried out so as to form a coating material layer 13 on the circumference of the ceramic block 15 thus formed.

In this coating material forming process, first, the ceramic block 15 is rotated around an axis on which it is supported in the length direction.

Although not particularly limited, the rotation speed of the ceramic block 15 is desirably set in a range from 2 to 10 min$^{-1}$.

Successively, coating material paste is allowed to adhere to the circumferential portion of the rotating ceramic block 15. With respect to the coating material paste, not particularly limited, the same paste as the adhesive paste as described above may be used.

Next, the coating material paste layer thus formed is dried at a temperature of about 120° C. to evaporate moisture to form a coating material layer 13 so that the manufacturing process of the honeycomb filter 10 of the first aspect of the present invention in which the coating material layer 13 is formed on the peripheral portion of the ceramic block 15 as shown in FIG. 1 is completed.

The following description will explain a honeycomb filter for purifying exhaust gases according to the second aspect of the present invention.

The honeycomb filter for purifying exhaust gases of the second aspect of the present invention has a structure in which:

a coating material layer is formed on the circumferential face of a ceramic block which comprises at least one of a columnar porous ceramic member, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the relationship between the thermal expansion coefficient $\alpha_M$ of the coating material layer and the thermal expansion coefficient $\alpha_F$ of the porous ceramic member are as follows:

$$0.01 < |\alpha_M - \alpha_F|/\alpha_F < 1.0.$$

In the honeycomb filter for purifying exhaust gases of the second aspect of the present invention (hereinafter, referred to simply as the honeycomb filter of the second aspect of the present invention), the relational expression between the thermal expansion coefficient $\alpha_M$ of the coating material layer and the thermal expansion coefficient $\alpha_F$ of the porous ceramic member, $|\alpha_M - \alpha_F|/\alpha_F$, has a lower limit value exceeding 0.01 and an upper limit value of less than 1.0. Here, when measured at several points in a temperature range from 300 to 900° C., the value of the relational expression is desirably satisfied by the respective measured values; however, the average value of these may satisfy the above-mentioned relational expression.

In the case where the above-mentioned relational expression, $|\alpha_M - \alpha_F|/\alpha_F$, is 0.01 or less, the thermal expansion coefficient of the coating material layer becomes substantially the same as the thermal expansion coefficient of the porous ceramic member, thus it becomes unable to alleviate a local thermal stress that is caused when local burning occurs in the honeycomb filter due to unevenness in the accumulated amount of particulates, unevenness in the amount of catalyst upon placing the catalyst, uneven heating caused by a heater and exhaust gases and the like; consequently, cracks occur in the porous ceramic member and the coating material layer, thus the strength of the honeycomb filter is lowered to cause leak of exhaust gases. In contrast, when the above-mentioned relational expression, $|\alpha_M - \alpha_F|/\alpha_F$, is 1.0 or more, the difference between the thermal expansion of the coating material layer and the thermal expansion of the porous ceramic member due to a temperature difference among exhaust gases becomes too large upon normal operations of the honeycomb filter, with the result that cracks occur in the porous ceramic member and the coating material layer to cause a reduction in the strength of the honeycomb filter and leak of exhaust gases.

Here, the lower limit of the above-mentioned relational expression, $|\alpha_M - \alpha_F|/\alpha_F$, is desirably set to a value exceeding 0.02, and the upper limit thereof is desirably set to a value of less than 0.5. This is because, it becomes possible to more positively prevent generation of cracks in the porous ceramic member and the coating material layer.

Not particularly limited, the coefficient $\alpha_F$ of the porous ceramic member, which is appropriately determined depending on the ceramic material and the like to be used, is desirably set in a range from $0.1\times10^{-6}$ to $10.0\times10^{-6}$ (1/K). In the case where the thermal expansion coefficient $\alpha_F$ of the porous ceramic member is less than $0.1\times10^{-6}$ (1/K), the thermal expansion coefficient becomes so small that it sometimes causes a difficulty in selecting the ceramic material; in contrast, in the case of the thermal expansion coefficient $\alpha_F$ of the porous ceramic member exceeding $10.0\times10^{-6}$ (1/K), since, during normal processes of the honeycomb filter of the second aspect of the present invention, the porous ceramic member expands or shrinks greatly, cracks tend to occur easily in the porous ceramic member and the coating material layer.

Not particularly limited, the coefficient $\alpha_M$ of the coating material layer, which is appropriately determined such that it satisfies the above-mentioned inequalities, $0.01<|\alpha_M-\alpha_F|/\alpha_F<1.0$, in association with the thermal expansion coefficient $\alpha_F$ of the porous ceramic member, is desirably set in a range from $0.1\times10^{-6}$ to $10.0\times10^{-6}$ (1/K). In the case where the thermal expansion coefficient $\alpha_M$ of the coating material layer is less than $0.1\times10^{-6}$ (1/K), the thermal expansion coefficient $\alpha_M$ sometimes becomes difficult to select the material. In contrast, in the case of the thermal expansion coefficient $\alpha_M$ of the coating material layer exceeding $10.0\times10^{-6}$ (1/K), since, during normal processes of the honeycomb filter of the second aspect of the present invention, the coating material layer expands or shrinks greatly, cracks tend to occur in the porous ceramic member and the coating material layer.

Here, in the above-mentioned relational expression, the numerator portion indicating the difference, $\alpha_M-\alpha_F$, between the thermal expansion coefficient $\alpha_M$ of the coating material layer and the thermal expansion coefficient $\alpha_F$ of the porous ceramic member is represented by the absolute value because the thermal expansion coefficient $\alpha_F$ of the porous ceramic member occasionally becomes greater than the thermal expansion coefficient $\alpha_M$ of the coating material layer, depending on materials of the coating material layer and the porous ceramic material to be used and temperatures.

In the honeycomb filter according to the second aspect of the present invention, with respect to the method for adjusting the thermal expansion coefficient $\alpha_M$ of the coating material layer and the thermal expansion coefficient $\alpha_F$ of the porous ceramic member so as to satisfy the relationship, $0.01<|\alpha_M-\alpha_F|/\alpha_F<1.0$, not particularly limited, for example, a method for selecting the materials for the porous ceramic member and the coating material and a method for adjusting the porosity of the coating material layer are proposed, and of these, the method for adjusting the porosity of the coating material layer is more desirably used. With this method, it becomes possible to reduce the thermal capacity of the honeycomb filter of the second aspect of the present invention as a whole, and also to quickly increase the temperature of the honeycomb filter of the second aspect of the present invention by the use of high-temperature exhaust gases.

With respect to the method for adjusting the porosity of the coating material layer, not particularly limited, examples thereof include: methods in which a foaming agent, a resin such as a thermoplastic resin and a thermosetting resin and balloons such as an inorganic material and an organic material, which are explained in the honeycomb filter of the first aspect of the present invention, are added to the coating material layer; and the like.

In the honeycomb filter of the second aspect of the present invention, by allowing the coating material to contain the above-mentioned foaming agent, resin such as a thermoplastic resin and a thermosetting resin and balloons such as an inorganic material and an organic material, the thermal expansion coefficient $\alpha_M$ of the coating material layer can be adjusted.

The adjusting processes can be carried out because of the following reasons. At the time of manufacturing of the honeycomb filter of the second aspect of the present invention, the above-mentioned materials are dispersed in the coating material layer in a substantially uniform state; however, when the honeycomb filter is actually used and thus they are heated to a high temperature, the organic components such as the foaming agent are decomposed to be burned so that pores are formed in the adhesive layer.

Aside from the method for increasing the porosity of the coating material layer, by selecting those materials having a high thermal expansion coefficient or a low coefficient thereof, upon selecting the inorganic binder, organic binder, inorganic fibers and inorganic particles that constitute the coating material, the thermal expansion coefficient $\alpha_M$ of the coating material layer can be adjusted.

With respect to the constituent elements of the honeycomb filter of the second aspect of the present invention except for the above-mentioned ones, the same as those of the honeycomb filter of the first aspect of the present invention may be used; therefore, the description thereof is omitted.

Furthermore, the honeycomb filter of the second aspect of the present invention may have a catalyst capable of purifying CO, HC, NOx and the like in the exhaust gases.

When such a catalyst is supported thereon, the honeycomb filter of the second aspect of the present invention is allowed to function as a filter capable of collecting particulates in exhaust gases, and also to function as a catalyst supporting member for purifying CO, HC, NOx and the like contained in exhaust gases.

With respect to the catalyst, not particularly limited as long as it can purify CO, HC, NOx and the like in exhaust gases, examples thereof include noble metals such as platinum, palladium rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the second aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the second aspect of the present invention also serves as a catalyst supporting member is omitted.

As described above, in the honeycomb filter of the second aspect of the present invention, the thermal expansion coefficient $\alpha_M$ of the coating material layer and the thermal expansion coefficient $\alpha_F$ of the porous ceramic member are designed to have the following relationship:

$$0.01<|\alpha_M-\alpha_F|/\alpha_F<1.0.$$

In other words, in the constituent components of the honeycomb filter of the second aspect of the present invention, the thermal expansion coefficient of the coating material layer and the thermal expansion coefficient of the porous ceramic member are not the same, but slightly different from each other. For this reason, even in the case where local burning, that is, a local temperature change, occurs due to unevenness in the accumulated amount of particulates, unevenness in the amount of catalyst upon placing the catalyst, uneven heating caused by a heater and exhaust gases and the like, the honeycomb filter of the second aspect of the present invention makes it possible to properly alleviate a local thermal stress that is exerted between the portion having the local temperature change and portions other than this portion, thereby preventing generation of cracks in the porous ceramic member and the coating material layer.

Therefore, the honeycomb structural filter of the second aspect of the present invention has superior strength and durability.

Next, the following description will explain one example of a manufacturing method for the honeycomb filter of the second aspect of the present invention.

The honeycomb filter of the second aspect of the present invention can be manufactured by using the same method as the honeycomb filter of the first aspect of the present invention except that, in place of the adjusting process of the composition of the adhesive paste in the manufacturing method for the honeycomb filter of the first aspect of the present invention for allowing the thermal expansion coefficient $\alpha_L$ of the adhesive layer and the thermal expansion coefficient $\alpha_F$ of the porous ceramic member 20 to satisfy the following relationship: $0.01<|\alpha_L-\alpha_F|/\alpha_F<1.0$ in the adjusting process of the adhesive paste, the composition of the coating material paste is adjusted so as to allow the thermal expansion coefficient $\alpha_M$ of the coating material layer and the thermal expansion coefficient $\alpha_F$ of the porous ceramic member 20 to satisfy the following relationship: $0.01<|\alpha_M-\alpha_F|/\alpha_F<1.0$ in the adjusting process of the coating material paste.

In order to adjust the thermal expansion coefficient $\alpha_M$ of the coating material layer, it is necessary to change the material blend, the porosity and the materials; and with respect to the method, not particularly limited, examples thereof includes: a method in which the above-mentioned foaming agent and resins, such as a thermoplastic resin and a thermosetting resin, as well as organic balloons, are added to the above-mentioned coating material paste; a method in which the stirring time of the coating material paste to be prepared is changed and the like.

The following description will explain a honeycomb filter for purifying exhaust gases according to the third aspect of the present invention.

The honeycomb filter for purifying exhaust gases of the third aspect of the present invention has a structure in which:

a plurality of a columnar porous ceramic member are combined with one another through adhesive layer to constitute a ceramic block, a coating material layer is formed on the circumferential face of the above-mentioned ceramic block each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the relationship between the thermal expansion coefficient $\alpha_L$ of the adhesive layer and the thermal expansion coefficient $\alpha_F$ of the porous ceramic member are as follows:

$0.01<|\alpha_L-\alpha_F|/\alpha_F<1.0$, and the relationship between the thermal expansion coefficient $\alpha_M$ of the coating material layer and the thermal expansion coefficient $\alpha_F$ of the porous ceramic member are as follows:

$0.01<|\alpha_M-\alpha_F|/\alpha_F<1.0$.

In the honeycomb filter for purifying exhaust gases of the third aspect of the present invention (hereinafter, referred to simply as the honeycomb filter of the third aspect of the present invention), the relational expression between the thermal expansion coefficient $\alpha_L$ of the adhesive layer and the thermal expansion coefficient $\alpha_F$ of the porous ceramic member, $|\alpha_L-\alpha_F|/\alpha_F$, as well as the relational expression between the thermal expansion coefficient $\alpha_M$ of the coating material layer and the thermal expansion coefficient $\alpha_F$ of the porous ceramic member, $|\alpha_M-\alpha_F|/\alpha_F$, has a lower limit value exceeding 0.01 and an upper limit value of less than 1.0. Here, when measured at several points in a temperature range from 300 to 900° C., the value of the relational expression is desirably satisfied by the respective measured values; however, it may be the case that the average value of these may satisfy the above-mentioned relational expression.

In the case where the above-mentioned relational expression, $|\alpha_L-\alpha_F|/\alpha_F$, and/or relational expression, $|\alpha_M-\alpha_F|/\alpha_F$, are 0.01 or less, the thermal expansion coefficient of the adhesive layer and/or the thermal expansion coefficient of the coating material layer become substantially the same as the thermal expansion coefficient of the porous ceramic member, thus, it becomes unable to alleviate a local thermal stress that is caused when local burning occurs in the honeycomb filter due to unevenness in the accumulated amount of particulates, unevenness in the amount of catalyst upon placing the catalyst, uneven heating caused by a heater and exhaust gases and the like; consequently, cracks occur in the porous ceramic member and the adhesive layer and/or the coating material layer, with the result that the strength of the honeycomb filter is lowered to cause leak of exhaust gases. In contrast, when the above-mentioned relational expression, $\alpha_L-\alpha_F|/\alpha_F$, and/or relational expression, $|\alpha_M-\alpha_F|/\alpha_F$, are 1.0 or more, the difference between the thermal expansion of the adhesive layer and/or coating material layer and the thermal expansion of the porous ceramic member due to a temperature difference among exhaust gases becomes too large upon normal operations of the honeycomb filter, thus, cracks occur in the porous ceramic member and the adhesive layer and/or the coating material layer to cause a reduction in the strength of the honeycomb filter and leak of exhaust gases.

Here, the lower limit of the above-mentioned relational expression, $|\alpha_L-\alpha_F|/\alpha_F$, as well as the lower limit of the relational expression, $|\alpha_M-\alpha_F|/\alpha_F$, is desirably set to a value exceeding 0.02, and the upper limit thereof is desirably set to a value of less than 0.5. Thus, it becomes possible to more positively prevent generation of cracks in the porous ceramic member and the adhesive layer and/or the coating material layer.

Not particularly limited, the coefficient $\alpha_F$ of the porous ceramic member, which is appropriately determined depending on the ceramic material and the like to be used, is desirably set in a range from $0.1\times10^{-6}$ to $10.0\times10^{-6}$ (1/K). In the case where the thermal expansion coefficient $\alpha_F$ of the porous ceramic member is less than $0.1\times10^{-6}$ (1/K), the thermal expansion coefficient becomes so small that it sometimes causes a difficulty in selecting the ceramic material; in contrast, in the case of the thermal expansion coefficient $\alpha_F$ of the porous ceramic member exceeding $10.0\times10^{-6}$ (1/K), since, during normal processes of the honeycomb filter of the third aspect of the present invention, the porous ceramic member expands or shrinks greatly, cracks tend to occur easily in the porous ceramic member and the adhesive layer and/or the coating material layer.

Not particularly limited, the coefficient $\alpha_L$ of the porous ceramic member, which is appropriately determined such that it satisfies the above-mentioned inequalities, $0.01<|\alpha_L-\alpha_F|/\alpha_F<1.0$, in association with the thermal expansion coefficient $\alpha_F$ of the porous ceramic member, is desirably set in a range from $0.1\times10^{-6}$ to $10.0\times10^{-6}$ (1/K). In the case where the thermal expansion coefficient $\alpha_L$ of the adhesive layer is less than $0.1 \times 10^{-6}$ (1/K), it sometimes becomes difficult to select the material In contrast, in the case of the thermal expansion coefficient $\alpha_L$ of the adhesive layer exceeding $10.0 \times 10^{-6}$ (1/K), since, during normal processes of the honeycomb filter of the third aspect of the present invention, the adhesive layer expands or shrinks greatly, cracks tend to occur in the porous ceramic member and the adhesive layer.

With respect to the method for adjusting the porosity of the adhesive layer, not particularly limited, examples thereof include: a method in which a foaming agent, a resin such as a thermoplastic resin and a thermosetting resin and balloons such as an inorganic material and an organic material, which are explained in the honeycomb filter of the first aspect of the present invention, are added to the coating material layer; and the like.

In the honeycomb filter of the third aspect of the present invention, by allowing the adhesive to contain the above-mentioned foaming agent, resin such as a thermoplastic resin and a thermosetting resin and balloons such as an inorganic material and an organic material, the thermal expansion coefficient $\alpha_L$ of the adhesive layer can be adjusted.

The adjusting processes can be carried out because of the following reasons. At the time of manufacturing of the honeycomb filter of the third aspect of the present invention, the above-mentioned materials are dispersed in the adhesive layer in a uniform state; however, when the honeycomb filter is actually used so that they are heated to a high temperature, the organic components such as the foaming agent are decomposed to be burned so that pores are formed in the adhesive layer, thereby causing a reduction in the density of the adhesive layer.

Aside from the method for increasing the porosity of the coating material layer, by selecting those materials having a high thermal expansion coefficient or a low coefficient thereof, upon selecting the inorganic binder, organic binder, inorganic fibers and inorganic particles that constitute the adhesive, the thermal expansion coefficient $\alpha_L$ of the adhesive layer can be adjusted.

Not particularly limited, the coefficient $\alpha_M$ of the coating material layer, which is appropriately determined such that it satisfies the above-mentioned inequalities, $0.01 < |\alpha_M - \alpha_F|/\alpha_F < 1.0$, in association with the thermal expansion coefficient $\alpha_F$ of the porous ceramic member, is desirably set in a range from $0.1 \times 10^{-6}$ to $10.0 \times 10^{-6}$ (1/K). In the case where the thermal expansion coefficient $\alpha_M$ of the coating material layer is less than $0.1 \times 10^{-6}$ (1/K), it sometimes becomes difficult to select the material. In contrast, in the case of the thermal expansion coefficient $\alpha_M$ of the coating material layer exceeding $10.0 \times 10^{-6}$ (1/K), since, during normal processes of the honeycomb filter of the third aspect of the present invention, the coating material layer expands or shrinks greatly, cracks tend to occur in the porous ceramic member and the coating material layer.

In the honeycomb filter according to the third aspect of the present invention, with respect to the method for adjusting the thermal expansion coefficient $\alpha_M$ of the coating material layer and the thermal expansion coefficient $\alpha_F$ of the porous ceramic member so as to satisfy the relationship, $0.01 < |\alpha_M - \alpha_F|/\alpha_F < 1.0$, not particularly limited, examples thereof include: a method for selecting the materials for the porous ceramic member and the coating material; and a method for adjusting the porosity of the coating material layer, and of these, the method for adjusting the porosity of the coating material layer is more desirably used. With this method, it becomes possible to reduce the thermal capacity of the honeycomb filter of the third aspect of the present invention as a whole, and also to quickly increase the temperature of the honeycomb filter of the third aspect of the present invention by the use of high-temperature exhaust gases.

With respect to the method for adjusting the porosity of the coating material layer, not particularly limited, examples thereof includes: a method in which a foaming agent, a resin such as a thermoplastic resin and a thermosetting resin and balloons such as an inorganic material and an organic material, which are explained in the honeycomb filter of the first aspect of the present invention, are added to the coating material layer; and the like.

In the honeycomb filter of the third aspect of the present invention, by allowing the coating material to contain the above-mentioned foaming agent, resin such as a thermoplastic resin and a thermosetting resin and balloons such as an inorganic material and an organic material, the thermal expansion coefficient $\alpha_M$ of the coating material layer can be adjusted.

The adjusting processes can be carried out because of the following reasons. At the time of manufacturing of the honeycomb filter of the third aspect of the present invention, the above-mentioned materials are dispersed in the coating material layer in a substantially uniform state; however, when the honeycomb filter is actually used so that they are heated to a high temperature, the organic components such as the foaming agent are decomposed to be burned so that pores are formed in the coating material layer, thereby causing a reduction in the density of the adhesive layer.

Aside from the method for increasing the porosity of the coating material layer, by selecting those materials having a high thermal expansion coefficient or a low coefficient thereof, upon selecting the inorganic binder, organic binder, inorganic fibers and inorganic particles that constitute the coating material, the thermal expansion coefficient $\alpha_M$ of the coating material layer can be adjusted.

With respect to the constituent elements of the honeycomb filter of the third aspect of the present invention except for the above-mentioned ones, the same as those of the honeycomb filter of the first aspect of the present invention may be used; therefore, the description thereof is omitted.

Furthermore, the honeycomb filter of the third aspect of the present invention may have a catalyst capable of purifying CO, HC, NOx and the like in the exhaust gases.

When such a catalyst is supported thereon, the honeycomb filter of the third aspect of the present invention is allowed to function as a filter capable of collecting particulates in exhaust gases, and also to function as a catalyst supporting member for purifying CO, HC, NOx and the like contained in exhaust gases.

With respect to the catalyst to be supported on the honeycomb filter of the present invention, not particularly limited as long as it can purify CO, HC, NOx and the like in exhaust gases, examples thereof include noble metals such as platinum, palladium rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the third aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the third aspect of the present invention also serves as a catalyst supporting member is omitted.

As described above, in the honeycomb filter of the third aspect of the present invention, the thermal expansion coefficient $\alpha_L$ of the adhesive layer and the thermal expansion coefficient $\alpha_F$ of the porous ceramic member are designed to have the following relationship: $0.01 < |\alpha_L - \alpha_F|/\alpha_F < 1.0$, and the thermal expansion coefficient $\alpha_M$ of the coating material layer and the thermal expansion coefficient $\alpha_F$ of the porous ceramic member are designed to have the following relationship: $0.01 < |\alpha_M - \alpha_F|/\alpha_F < 1.0$. In other words, in the constituent components of the honeycomb filter of the third aspect of the present invention, each of the thermal expansion coefficient of the adhesive layer and the thermal expansion coefficient of the coating material layer is not the same as the thermal expansion coefficient of the porous ceramic member, but slightly different from the thermal expansion coefficient thereof. For this reason, even in the case where local burning, that is, a local temperature change, occurs due to unevenness in the accumulated amount of particulates, unevenness in the amount of catalyst upon placing the catalyst, uneven heating caused by a heater and exhaust gases and the like, the honeycomb filter of the third aspect of the present invention makes it possible to properly alleviate a local thermal stress that is exerted between the portion having the local temperature change and portions other than this portion, thereby preventing generation of cracks in the porous ceramic member, as well as in the adhesive layer and the coating material layer.

Therefore, the honeycomb structural filter of the third aspect of the present invention has superior strength and durability.

Next, the following description will explain one example of a manufacturing method for the honeycomb filter of the third aspect of the present invention.

The honeycomb filter of the third aspect of the present invention can be manufactured by using the same method as the honeycomb filter of the first aspect of the present invention except that, in the adjusting process of the composition of the coating material paste in the manufacturing method for the honeycomb filter of the first aspect of the present invention, the composition of the coating material paste is adjusted so as to allow the thermal expansion coefficient $\alpha_M$ of the coating material layer and the thermal expansion coefficient $\alpha_F$ of the porous ceramic member 20 to satisfy the following relationship:

$$0.01 < |\alpha_M - \alpha_F|/\alpha_F < 1.0.$$

In order to adjust the thermal expansion coefficient $\alpha_M$ of the coating material layer, it is necessary to change the material blend, the porosity and the materials; and with respect to the method, not particularly limited, examples thereof include: a method in which the above-mentioned foaming agent and resins, such as a thermoplastic resin and a thermosetting resin, as well as organic balloons, are added to the above-mentioned coating material paste; and a method in which the stirring time of the coating material paste to be prepared is changed; and the like.

The following description will explain a honeycomb filter for purifying exhaust gases according to the fourth aspect of the present invention.

The honeycomb filter for purifying exhaust gases of the fourth aspect of the present invention has a structure in which:
a plurality of a columnar porous ceramic member are combined with one another through adhesive layer, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the adhesive layer has a thermal capacity per unit volume that is lower than the thermal capacity per unit volume of the porous ceramic member.

In the honeycomb filter for purifying exhaust gases of the fourth aspect of the present invention (hereinafter, referred to simply as the honeycomb filter of the fourth aspect of the present invention), the thermal capacity per unit volume of the adhesive layer is made lower than the thermal capacity per unit volume of the porous ceramic member. In other words, the rate of the thermal capacity per unit volume of the adhesive layer to the thermal capacity per unit volume of the porous ceramic member is set to less than 100%. With respect to the two factors, when measured at several points in a temperature range from 300 to 900° C., each of the values of the thermal capacity per unit volume of the adhesive layer is desirably lower than the thermal capacity per unit volume of the porous ceramic member; however, the average value of the thermal capacities per unit volume of the adhesive layers may be made lower than the average value of the thermal capacities per unit volume of the porous ceramic members.

The reason for the above-mentioned setting is because the honeycomb filter of the fourth aspect of the present invention attempts to reduce the thermal capacity of the honeycomb filter as a whole by reducing the thermal capacity of the adhesive layer. In an attempt to reduce the thermal capacity of the honeycomb filter as a whole, it is necessary to reduce the thermal capacity of the porous ceramic member or the thermal capacity of the adhesive layer. Here, in order to reduce the thermal capacity of the porous ceramic member, it is necessary to use a ceramic material in which the specific heat is low or a porous member in which the density is low. However, in general, the specific heat, which is a numeric value inherent to the material, is not changed unless the material is changed, and in order to allow the porous member to have low density, it is necessary to increase the porosity of the porous ceramic material or to increase the aperture ratio of the honeycomb (the area ratio of the aperture portion (space without wall) per unit cross-section of the filter); consequently, the attempt to reduce the thermal capacity of the porous ceramic member tends to cause a reduction in the mechanical strength in the porous ceramic member.

Moreover, in the honeycomb filter, in the case where the thermal capacity per unit volume of the adhesive layer is higher than the thermal capacity per unit volume of the porous ceramic member, even in an attempt to heat the porous Ceramic member and the collected particulates for regeneration and to increase the active temperature of the catalyst, a large quantity of heat is required to raise the temperature of the adhesive layer. Thus, it becomes difficult to heat the porous ceramic member, causing degradation in the temperature rising property in the honeycomb filter as a whole. Consequently, for example, even when a catalyst is supported on the honeycomb filter so as to serve as a catalyst supporting member, it is difficult to quickly heat the honeycomb filter to a temperature at which the catalyst is allowed to purify CO, HC and NOx in exhaust gases, resulting in degradation in the purifying ability for CO, HC, NOx and the like in the exhaust gases.

Here, in the honeycomb filter of the fourth aspect of the present invention, the rate of the thermal capacity per unit volume of the adhesive layer to the thermal capacity per unit volume of the porous ceramic member is desirably set to 90% or less. This arrangement makes it possible to improve the temperature rising property of the honeycomb filter of the fourth aspect of the present invention.

In the honeycomb filter of the fourth aspect of the present invention, the rate of the thermal capacity per unit volume of the adhesive layer to the thermal capacity per unit volume of the porous ceramic member is desirably set to 20% or more. The rate of less than 20% tends to make the thermal capacity per unit volume of the adhesive layer too lower than the thermal capacity per unit volume of the porous ceramic member, resulting in an abrupt increase in the temperature of the adhesive layer due to high-temperature exhaust gases to be discharged and the subsequent great thermal stress exerted in a gap with the porous ceramic member constituting the honeycomb filter of the fourth aspect of the present invention; consequently, cracks tend to occur between the adhesive layer and the porous ceramic member.

Moreover, the rate of the thermal capacity per unit volume of the adhesive layer to the thermal capacity per unit volume of the porous ceramic member is desirably set to 25% or more.

With respect to the thermal capacity per unit volume (1 $m^3$) of the porous ceramic member to be used for the honeycomb filter of the fourth aspect of the present invention, not particularly limited, it is appropriately determined depending on ceramic materials and the like to be used, and desirably set in a range from 600 to 3000 (kJ/K·$m^3$). In order to set the thermal capacity to less than 600 (kJ/(K·$m^3$)), it is necessary to make the porosity of the porous ceramic member very high; however, since such a porous ceramic member comes to have a very low density, the strength is lowered and it tends to be easily broken. Moreover, when such a ceramic member is used as a filter, it is easy to increase the temperature because of the improved response to heat, while, in contrast, it is easily cooled, making it difficult to maintain the filter at a high temperature, as well as making it difficult to heat the filter. In the case of the thermal capacity exceeding 3000 (kJ/(K·$m^3$)), the porosity of the honeycomb filter of the fourth aspect of the present invention needs to be set lower so as to make the thermal capacity higher, thus, the back pressure becomes higher to give adverse effects to the performances of the engine and the like. Moreover, since, when used as a filter, the thermal capacity becomes higher, more thermal energy is required to raise the temperature, resulting in degradation in the temperature rising property.

With respect to the thermal capacity per unit volume (1 $m^3$) of the adhesive layer, not particularly limited, it is appropriately adjusted so as to become smaller than the thermal capacity per unit volume of the porous ceramic member, and is desirably set in a range from 400 to 2300 (kJ/(K·$m^3$)). When it is less than 400 (kJ/(K·$m^3$)), the gap from the thermal capacity per unit volume of the porous ceramic member becomes greater, thus the temperature of the adhesive layer abruptly rises due to discharged high-temperature exhaust gases to cause a great thermal stress against the porous ceramic members that constitute the honeycomb filter of the fourth aspect of the present invention; consequently, cracks tend to occur between the adhesive layer and the porous ceramic member. In contrast, when it exceeds 2300 (kJ/(K·$m^3$)), the thermal capacity of the honeycomb filter of the fourth aspect of the present invention becomes greater, with the result that, when used as a filter, more thermal energy is required to raise the temperature of the adhesive layer, resulting in degradation in the temperature rising property of the honeycomb filter of the fourth aspect of the present invention as a whole. Moreover, this sometimes makes it difficult to select materials.

With respect to the method for making the thermal capacity per unit volume of the adhesive layer lower than the thermal capacity per unit volume of the porous ceramic member, not particularly limited, examples thereof include: a method in which materials of the porous ceramic member and the adhesive are properly selected; and a method in which the porosity of the adhesive layer is increased; and the like, and among these methods, the method in which the porosity of the adhesive layer is increased is desirably used. With this method, it becomes possible to reduce the thermal capacity of the honeycomb filter of the fourth aspect of the present invention and consequently to quickly raise the temperature of the honeycomb filter of the fourth aspect of the present invention by the use of discharged high-temperature exhaust gases.

With respect to the method for increasing the porosity of the adhesive layer, not particularly limited, for example, as explained in the adhesive layer of the honeycomb filter of the first aspect of the present invention, examples thereof include: a method in which the adhesive layer is allowed to contain a foaming agent, resins, such as a thermoplastic resin and a thermosetting resin, and balloons such as an inorganic material and an organic material and the like.

In the honeycomb filter of the fourth aspect of the present invention, it becomes possible to adjust the thermal capacity per unit volume of the adhesive layer by allowing the adhesive to contain the foaming agent, resins, such as a thermoplastic resin and a thermosetting resin, and balloons such as an inorganic material and an organic material.

The adjusting processes can be carried out because of the following reasons: At the time of manufacturing of the honeycomb filter of the fourth aspect of the present invention, the above-mentioned materials are dispersed in the adhesive layer in a uniform state; however, when the honeycomb filter is actually used so that they are heated to a high temperature, the organic components such as the foaming agent are decomposed to be burned so that pores are formed in the adhesive layer, thereby causing a reduction in the density of the adhesive layer.

Aside from the method for increasing the porosity of the coating material layer, by selecting those materials having a low thermal capacity upon selecting the inorganic binder, organic binder, inorganic fibers and inorganic particles that constitute the adhesive, as described earlier, the thermal capacity of the adhesive layer is further lowered.

With respect to the constituent components of the honeycomb filter of the fourth aspect of the present invention except for the above-mentioned ones, the same constituent components as the honeycomb structural body of the first aspect of the present invention may be used; therefore, the specific description thereof is omitted.

Furthermore, the honeycomb filter of the fourth aspect of the present invention may have a catalyst capable of purifying CO, HC, NOx and the like in the exhaust gases.

When such a catalyst is supported thereon, the honeycomb filter of the fourth aspect of the present invention is allowed to function as a filter capable of collecting particulates in exhaust gases, and also to function as a catalyst supporting member for purifying CO, HC, NOx and the like contained in exhaust gases.

With respect to the above-mentioned catalyst, not particularly limited as long as it can purify CO, HC, NOx and the like in exhaust gases, examples thereof include noble metals such as platinum, palladium, rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the fourth aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the fourth aspect of the present invention also serves as a catalyst supporting member is omitted.

As described above, the honeycomb filter of the fourth aspect of the present invention has a structure in that the thermal capacity per unit volume of the adhesive layer is lower than the thermal capacity per unit volume of the porous ceramic member. Therefore, the honeycomb filter of the fourth aspect of the present invention is superior in the temperature rising property, and when a catalyst is supported on the honeycomb filter, the honeycomb filter of the fourth aspect of the present invention is quickly heated to a temperature that allows the catalyst to purify CO, HC, NOx and the like in exhaust gases. Consequently, the honeycomb filter of the fourth aspect of the present invention is desirably used as a catalyst supporting member.

The following description will explain one example of a manufacturing method for the honeycomb filter of the fourth aspect of the present invention.

The honeycomb filter of the fourth aspect of the present invention can be manufactured by using the same method as the honeycomb filter of the first aspect of the present invention except that, in the preparing process of the adhesive paste for forming the adhesive layer 14 in the manufacturing method for the honeycomb filter of the first aspect of the present invention, the composition of the adhesive paste is adjusted so as to make the thermal capacity per unit volume of the adhesive layer to be formed lower than the thermal capacity per unit volume of the porous ceramic member.

Next, the following description discusses the adhesive of the present invention.

The adhesive of the present invention is characterized by comprising materials that is capable of forming independent pores.

With respect to the material that is capable of forming independent pores, not particularly limited, for example, a foaming agent, resin such as a thermoplastic resin and a thermosetting resin, and balloons such as inorganic balloons and organic balloons, are listed, and in particular, at least one material selected from the group consisting of the foaming agent, the inorganic balloons and the organic balloons is desirably used.

The upper limit of the content of the above-mentioned foaming agent, resin such as a thermoplastic resin and a thermosetting resin, and balloons such as inorganic balloons and organic balloons (hereinafter, referred to as foaming agent and the like) is desirably set to 80% by weight, more desirably to 60% by weight. Further, the lower limit of the content of the above-mentioned foaming agent and the like is desirably set to 0.01% by weight, more desirably, to 1.0% by weight. When the content of the foaming agent and the like is less than 0.01% by weight, it is not possible to make the porosity of the adhesive layer made from the adhesive of the present invention so high, and the elasticity tends to become lower as the thermal capacity of the adhesive layer increases; in contrast, in the case of the content exceeding 80% by weight, the porosity of the adhesive layer made from the adhesive of the present invention becomes too high, resulting in degradation in the strength and subsequent generation of cracks.

Here, with respect to the kinds, shapes and the like of the above-mentioned foaming agent, resin such as a thermoplastic resin and a thermosetting resin, and balloons such as inorganic balloons and organic balloons, those of the materials explained in the adhesive layer of the honeycomb filter of the first aspect of the present invention can be used; therefore, the detailed explanation thereof is omitted.

The adhesive of the present invention is capable of forming independent pores, and this structure makes it possible to provide various effects described below. Therefore, the applications of the adhesive of the present invention are not particularly limited, as long as such effects (characteristics) are advantageously exerted; and, for example, the adhesive is used as adhesives and the like for use in construction materials and civil engineering materials and adhesives for use in metal products and ceramic products.

In particular, the adhesive is desirably used as a material for the above-mentioned adhesive layer in a honeycomb filter in which a plurality of porous ceramic members are combined with one another through adhesive layers. With this application, it becomes possible to control the thermal expansion coefficient of the adhesive layer, and consequently to alleviate a thermal stress occurring in the honeycomb filter. Moreover, since it becomes possible to increase the porosity of the above-mentioned honeycomb filter as a whole, the thermal capacity thereof is lowered so that it becomes possible to prevent an increase in back pressure even when a large amount of catalyst is supported on the honeycomb filter so as to serve as a catalyst supporting member.

As described above, the adhesive of the present invention contains a material that is capable of forming independent pores. For this reason, since the porosity and the like of pores to be formed in the adhesive layer formed by using the adhesive of the present invention can be controlled, it is possible to control the thermal expansion coefficient of the adhesive layer, and also to lower the thermal capacity per unit volume; therefore, it becomes possible to maintain superior elasticity.

Therefore, when a honeycomb filter for purifying exhaust gases is manufactured by combining a plurality of porous ceramic members with each other, each of which has a structure in that a number of through holes are arranged side by side in the length direction with partition wall interposed therebetween, through adhesive layers formed by using the adhesive of the present invention, it becomes possible to alleviate a thermal stress exerted between the porous ceramic member and the adhesive layer and an external force imposed on the adhesive layer; therefore, the honeycomb filter becomes less susceptible to generation of cracks between the porous ceramic member and the adhesive layer, and is allowed to have superior strength and durability. Moreover, the pores formed in the adhesive layer make it possible to lower the density of the adhesive layer, and consequently to reduce the thermal capacity per unit volume, so that it becomes possible to provide a superior temperature rising property in the honeycomb filter for purifying exhaust gases.

The present invention also relates to a honeycomb filter for purifying exhaust gases that is manufactured by using the adhesive of the present invention, and this honeycomb filter for purifying exhaust gases of the fifth aspect of the present invention have specific superior effects as described above.

Furthermore, the honeycomb filter of the fifth aspect of the present invention may have a catalyst capable of purifying CO, HC, NOx and the like in the exhaust gases.

When such a catalyst is supported thereon, the honeycomb filter of the fifth aspect of the present invention is allowed to function as a filter capable of collecting particulates in exhaust gases, and also to function as a catalyst supporting member for purifying CO, HC, NOx and the like contained in exhaust gases.

With respect to the catalyst to be supported on the honeycomb filter of the present invention, not particularly limited as long as it can purify CO, HC, NOx and the like in exhaust gases, examples thereof include noble metals such as platinum, palladium, rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the fifth aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the first aspect of the present invention also serves as a catalyst supporting member is omitted.

The following description will explain a honeycomb filter for purifying exhaust gases according to the sixth aspect of the present invention.

The honeycomb filter for purifying exhaust gases of the sixth aspect of the present invention has a structure in which:

a plurality of a columnar porous ceramic member are combined with one another through adhesive layer, each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the adhesive layer has a thermal capacity per unit volume that is lower than the thermal capacity per unit volume of the porous ceramic member.

In the honeycomb filter for purifying exhaust gases of the sixth aspect of the present invention (hereinafter, referred to simply as the honeycomb filter of the sixth aspect of the present invention), the thermal capacity per unit volume of the coating material layer is made lower than the thermal capacity per unit volume of the porous ceramic member. In other words, the rate of the thermal capacity per unit volume of the coating material layer to the thermal capacity per unit volume of the porous ceramic member is set to less than 100%. With respect to the two factors, when measured at several points in a temperature range from 300 to 900° C., each of the values of the thermal capacity per unit volume of the coating material layer is desirably lower than the thermal capacity per unit volume of the porous ceramic member; however, the average value of the thermal capacities per unit volume of the coating material layers may be made lower than the average value of the thermal capacities per unit volume of the porous ceramic members.

The reason for the above-mentioned setting is because the honeycomb filter of the sixth aspect of the present invention attempts to reduce the thermal capacity of the honeycomb filter as a whole by reducing the thermal capacity of the coating material layer. In an attempt to reduce the thermal capacity of the honeycomb filter as a whole, it is necessary to reduce the thermal capacity of the porous ceramic member or the thermal capacity of the coating material layer. Here, in order to reduce the thermal capacity of the porous ceramic member, it is necessary to use a ceramic material in which the specific heat is low or a porous member in which the density is low. However, in general, the specific heat, which is a numeric value inherent to the material, is not changed unless the material is changed, and in order to allow the porous member to have low density, it is necessary to increase the porosity of the porous ceramic material or to increase the aperture ratio of the honeycomb (the area ratio of the aperture portion (space without wall) per unit cross-section of the filter); consequently, the attempt to reduce the thermal capacity of the porous ceramic member tends to cause a reduction in the mechanical strength in the porous ceramic member.

Moreover, in the honeycomb filter, in the case where the thermal capacity per unit volume of the coating material layer is higher than the thermal capacity per unit volume of the porous ceramic member, even in an attempt to heat the porous ceramic member and the collected particulates for regeneration and to increase the active temperature of the catalyst, a large quantity of heat is required to raise the temperature of the coating material layer. Thus, it becomes difficult to heat the porous ceramic member, causing degradation in the temperature rising property in the honeycomb filter as a whole. Consequently, for example, even when a catalyst is supported on the honeycomb filter so as to serve as a catalyst supporting member, it is difficult to quickly heat the honeycomb filter to a temperature at which the catalyst is allowed to purify CO, HC and NOx in exhaust gases, resulting in degradation in the purifying ability for CO, HC, NOx and the like in the exhaust gases.

Here, in the honeycomb filter of the sixth aspect of the present invention, the rate of the thermal capacity per unit volume of the coating material layer to the thermal capacity per unit volume of the porous ceramic member is desirably set to 90% or less. This arrangement makes it possible to improve the temperature rising property of the honeycomb filter of the sixth aspect of the present invention.

In the honeycomb filter of the sixth aspect of the present invention, the rate of the thermal capacity per unit volume of the coating material layer to the thermal capacity per unit volume of the porous ceramic member is desirably set to 20% or more. The rate of less than 20% tends to make the thermal capacity per unit volume of the coating material layer too lower than the thermal capacity per unit volume of the porous ceramic member, resulting in an abrupt increase in the temperature of the coating material layer due to high-temperature exhaust gases to be discharged and the subsequent great thermal stress exerted in a gap with the porous ceramic member constituting the honeycomb filter of the sixth aspect of the present invention; consequently, cracks tend to occur between the coating material layer and the porous ceramic member.

Moreover, the rate of the thermal capacity per unit volume of the coating material layer to the thermal capacity per unit volume of the porous ceramic member is desirably set to 25% or more.

With respect to the thermal capacity per unit volume ($1\ m^3$) of the porous ceramic member to be used for the honeycomb filter of the sixth aspect of the present invention, not particularly limited, it is appropriately determined depending on ceramic materials and the like to be used, and desirably set in a range from 600 to 3000 ($kJ/(K \cdot m^3)$). In order to set the thermal capacity to less than 600 ($kJ/(K \cdot m^3)$), it is necessary to make the porosity of the porous ceramic member very high; however, since such a porous ceramic member comes to have a very low density, the strength is lowered and it tends to be easily broken. Moreover, when such a ceramic member is used as a filter, it is easily heated because of the improved response to heat, while, in contrast, it is easily cooled, making it difficult to maintain the filter at a high temperature, as well as making it difficult to heat the filter. In the case of the thermal capacity exceeding 3000 (kJ/(K·m$^3$)), the porosity of the honeycomb filter of the sixth aspect of the present invention needs to be set lower so as to make the thermal capacity higher, with the result that the back pressure becomes higher to give adverse effects to the performances of the engine and the like. Moreover, since, when used as a filter, the thermal capacity becomes higher, more thermal energy is required to raise the temperature, resulting in degradation in the temperature rising property.

With respect to the thermal capacity per unit volume (1 m$^3$) of the coating material layer, not particularly limited, it is appropriately adjusted so as to become smaller than the thermal capacity per unit volume of the porous ceramic member, and is desirably set in a range from 400 to 2300 (kJ/(K·m$^3$)). When it is less than 400 (kJ/(K·m$^3$)), the gap from the thermal capacity per unit volume of the porous ceramic member becomes greater, with the result that the temperature of the coating material layer abruptly rises due to discharged high-temperature exhaust gases to cause a great thermal stress against the porous ceramic members that constitute the honeycomb filter of the sixth aspect of the present invention; consequently, cracks tend to occur between the coating material layer and the porous ceramic member. In contrast, when it exceeds 2300 (kJ/(K·m$^3$)), the thermal capacity of the honeycomb filter of the sixth aspect of the present invention becomes greater, thus, when used as a filter, more thermal energy is required to raise the temperature of the coating material layer since the thermal capacity of the coating material layer is large, resulting in degradation in the temperature rising property of the honeycomb filter of the sixth aspect of the present invention as a whole. Moreover, this sometimes makes it difficult to select materials.

In the honeycomb filter of the sixth aspect of the present invention, with respect to the method for making the thermal capacity per unit volume of the coating material layer lower than the thermal capacity per unit volume of the porous ceramic member, not particularly limited, examples thereof include: a method in which materials of the porous ceramic member and the adhesive are properly selected; and a method in which the porosity of the coating material layer is increased, and among these methods, the method in which the porosity of the coating material layer is increased is desirably used. With this method, it becomes possible to reduce the thermal capacity of the honeycomb filter of the sixth aspect of the present invention and consequently to quickly raise the temperature of the honeycomb filter of the sixth aspect of the present invention by the use of discharged high-temperature exhaust gases.

With respect to the method for increasing the porosity of the coating material layer, not particularly limited, examples thereof include: as explained in the coating material layer of the honeycomb filter of the first aspect of the present invention, a method in which the coating material layer is allowed to contain a foaming agent, resins, such as a thermoplastic resin and a thermosetting resin, and balloons such as an inorganic material and an organic material.

In the honeycomb filter of the sixth aspect of the present invention, it becomes possible to adjust the thermal capacity per unit volume of the coating material layer by allowing the adhesive to contain the foaming agent, resins, such as a thermoplastic resin and a thermosetting resin, and balloons such as an inorganic material and an organic material.

The adjusting processes can be carried out because of the following reasons. At the time of manufacturing of the honeycomb filter of the sixth aspect of the present invention, the above-mentioned materials are dispersed in the coating material layer in a substantially uniform state; however, when the honeycomb filter is actually used so that they are heated to a high temperature, the organic components such as the foaming agent are decomposed to be burned so that pores are formed in the coating material layer, thereby causing a reduction in the density of the coating material layer.

Aside from the method for increasing the porosity of the coating material layer, by selecting those materials having a low thermal capacity upon selecting the inorganic binder, organic binder, inorganic fibers and inorganic particles that constitute the coating material, the thermal capacity of the coating material layer is further lowered.

With respect to the constituent components of the honeycomb filter of the sixth aspect of the present invention except for the above-mentioned ones, the same components as the honeycomb structural body of the first aspect of the present invention may be used; therefore, the specific description thereof is omitted.

Furthermore, the honeycomb filter of the sixth aspect of the present invention may have a catalyst capable of purifying CO, HC, NOx and the like in the exhaust gases.

When such a catalyst is supported thereon, the honeycomb filter of the sixth aspect of the present invention is allowed to function as a filter capable of collecting particulates in exhaust gases, and also to function as a catalyst supporting member for purifying CO, HC, NOx and the like contained in exhaust gases.

With respect to the above-mentioned catalyst, not particularly limited as long as it can purify CO, HC, NOx and the like in exhaust gases, examples thereof include noble metals such as platinum, palladium, rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the sixth aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the sixth aspect of the present invention also serves as a catalyst supporting member is omitted.

As described above, the honeycomb filter of the sixth aspect of the present invention has a structure in that the thermal capacity per unit volume of the coating material layer is lower than the thermal capacity per unit volume of the porous ceramic member. Therefore, the honeycomb filter of the sixth aspect of the present invention is superior in the temperature rising property, and when a catalyst is supported on the honeycomb filter, the honeycomb filter of the sixth aspect of the present invention is quickly heated to a temperature that allows the catalyst to purify CO, HC, NOx and the like in exhaust gases. Consequently, the honeycomb filter of the sixth aspect of the present invention is desirably used as a catalyst supporting member.

The following description will explain one example of a manufacturing method for the honeycomb filter of the sixth aspect of the present invention.

The honeycomb filter of the sixth aspect of the present invention can be manufactured by using the same method as the honeycomb filter of the first aspect of the present invention except that, in the preparing process of the coating material paste for forming the coating material layer 13 in the manufacturing method for the honeycomb filter of the first aspect of the present invention, the composition of the coating material paste is adjusted so as to make the thermal capacity per unit volume of the coating material layer to be formed lower than the thermal capacity per unit volume of the porous ceramic member.

Next, the following description discusses the coating material of the present invention.

The coating material of the present invention is characterized by comprising materials capable of forming independent pores.

With respect to the material that is capable of forming independent pores, not particularly limited, for example, a foaming agent, resin such as a thermoplastic resin and a thermosetting resin, and balloons such as inorganic balloons and organic balloons, are listed, and in particular, at least one material selected from the group consisting of the foaming agent, the inorganic balloons and the organic balloons is desirably used.

Here, with respect to the kinds, shapes and the like of the above-mentioned foaming agent, resin such as a thermoplastic resin and a thermosetting resin, and balloons such as inorganic balloons and organic balloons, those of the materials explained in the adhesive layer of the honeycomb filter of the first aspect of the present invention can be used; therefore, the detailed explanation thereof is omitted.

The upper limit of the content of the materials capable of forming the independent pores is desirably set to 80% by weight, more desirably, to 60% by weight. Further, the lower limit of the content of the materials capable of forming the independent pores is desirably set to 0.01% by weight, more desirably to 1.0% by weight. When the content of the materials capable of forming the independent pores is less than 0.01% by weight, it is not possible to make the porosity of the coating material layer formed by using the coating material of the present invention so high, with the result that the thermal capacity per unit volume of the coating material layer becomes higher, the heat insulating property is lowered and the elasticity is also lowered, failing to sufficiently alleviate a stress. In contrast, in the case of the content exceeding 80% by weight, the porosity of the coating material layer formed by using the coating material of the present invention becomes too high, resulting in degradation in the strength and subsequent generation of cracks.

The applications of the coating material of the present invention are not particularly limited, as long as the formation of independent pores is advantageously utilized; and, for example, the coating material is used as a material for a coating material layer in a honeycomb filter for purifying exhaust gases in which the coating material layer is formed on the circumference of a ceramic block that contains one or more porous ceramic members, as a material for an adhesive layer in a honeycomb filter for purifying exhaust gases in which a plurality of porous ceramic members are combined with one another through the adhesive layers, and as a coating material and the like for use in construction materials and civil engineering materials. In particular, the coating material is desirably used as a material for the above-mentioned coating material layer in a honeycomb filter for purifying exhaust gases in which the coating material layer is formed on the circumference of a ceramic block that contains one or more porous ceramic members.

Since the coating material of the present invention contains materials capable of forming independent pores, a coating material layer formed by using the coating material of the present invention is enabled to have independent pores formed therein. Since the independent pores are contained therein, the coating material layer formed by using the coating material of the present invention makes it possible to reduce the thermal capacity per unit volume, to improve the heat-insulating property and also to provide superior elasticity; thus, it becomes possible to alleviate a stress.

The following description will explain a honeycomb filter for purifying exhaust gases according to the seventh aspect of the present invention.

The honeycomb filter for purifying exhaust gases of the seventh aspect of the present invention has a structure in which:

a coating material layer is formed on the circumferential face of a ceramic block which comprises at least one of a columnar porous ceramic member, each of the above-mentioned columnar porous ceramic member comprising a number of through holes that are placed in parallel with one another in the length direction with partition wall interposed therebetween wherein the coating material layer is the coating material of the present invention.

In the same manner as the honeycomb filter for purifying exhaust gases of the first aspect of the present invention; as shown in FIG. 1, the honeycomb filter for purifying exhaust gases of the seventh aspect of the present invention may be prepared as a honeycomb filter 10 having a structure in that a plurality of porous ceramic members 20 are combined with one another through adhesive layers 14 to constitute a ceramic block 15, with a coating material layer 13 being formed on the circumferential portion of the ceramic block 15, or as a honeycomb filter having a structure in that a coating material layer is formed on the circumference of a ceramic block made of a single porous ceramic member.

Here, with respect to the shape of the ceramic block, not particularly limited, for example, desired shapes, such as a cylinder shape, an elliptical column shape and a rectangular column shape, may be used.

With respect to the constituent members, such as a porous ceramic member and an adhesive layer, of the honeycomb filter for purifying exhaust gases of the seventh aspect of the present invention, the same members as the honeycomb filter for purifying exhaust gases of the first aspect of the present invention may be used except that the coating material layer is formed by using the coating material of the present invention; therefore, the specific description thereof is omitted.

Furthermore, the honeycomb filter of the seventh aspect of the present invention may have a catalyst capable of purifying CO, HC, NOx and the like in the exhaust gases.

When such a catalyst is supported thereon, the honeycomb filter of the sixth aspect of the present invention is allowed to function as a filter capable of collecting particulates in exhaust gases, and also to function as a catalyst supporting member for purifying CO, HC, NOx and the like contained in exhaust gases.

With respect to the above-mentioned catalyst, not particularly limited as long as it can purify CO, HC, NOx and the like in exhaust gases, examples thereof include noble metals such as platinum, palladium rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the seventh aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the seventh aspect of the present invention also serves as a catalyst supporting member is omitted.

The following description will explain a manufacturing method for the honeycomb filter of the seventh aspect of the present invention.

The honeycomb filter of the seventh aspect of the present invention can be manufactured by using the same method as the honeycomb filter of the first aspect of the present invention except that, in the coating material forming process in the manufacturing method for the honeycomb filter of the first aspect of the present invention, the coating material of the present invention is used as the coating material paste.

Since its coating material layer is formed by using the coating material of the present invention, the honeycomb filter for purifying exhaust gases of the seventh aspect of the present invention has a superior temperature rising property. This is because the independent pores, formed inside the coating material layer, lower the density of the coating material layer to lower the thermal capacity per unit volume and consequently to improve the heat-insulating property of the coating material layer.

Moreover, since its coating material layer is formed by using the coating material of the present invention, the honeycomb filter for purifying exhaust gases of the seventh aspect of the present invention has superior strength and durability. This is because the independent pores, formed inside the coating material layer, make it possible to improve the elasticity of the coating material layer to prevent generation of cracks in the coating material layer, to alleviate a thermal stress imposed on the ceramic block, to prevent generation of cracks in the ceramic block, and also to effectively alleviate an external force imposed on the honeycomb filter for purifying exhaust gases of the seventh aspect of the present invention.

Here, since the honeycomb filter for purifying exhaust gases of the seventh aspect of the present invention is superior in strength and durability, it is possible to increase the porosity, and also to lower the thermal capacity per unit volume with the increased porosity; thus, it becomes possible to further improve the temperature rising property, and also to allow the filter to support a large amount of catalyst without an increase in the back pressure so as to function as a catalyst supporting member.

The following description will explain a honeycomb filter for purifying exhaust gases according to the eighth aspect of the present invention.

The honeycomb filter for purifying exhaust gases of the eighth aspect of the present invention has a honeycomb filter for purifying exhaust gases which has a structure in which:

a plurality of a columnar porous ceramic member are combined with one another through adhesive layer to constitute a ceramic block, a coating material layer is formed on the circumferential face of the above-mentioned ceramic block each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the thermal capacity per unit volume of the adhesive layer and the thermal capacity per unit volume of the coating material layer are lower than the thermal capacity per unit volume of the porous ceramic member.

In the honeycomb filter for purifying exhaust gases of the eighth aspect of the present invention (hereinafter, referred to simply as the honeycomb filter of the eighth aspect of the present invention), the thermal capacity per unit volume of the adhesive layer and the thermal capacity per unit volume of the coating material layer are made lower than the thermal capacity per unit volume of the porous ceramic member. In other words, both of the rate of the thermal capacity per unit volume of the adhesive layer to the thermal capacity per unit volume of the porous ceramic member and the rate of the thermal capacity per unit volume of the coating material layer to the thermal capacity per unit volume of the porous ceramic member are set to less than 100%. With respect to this relationship, when measured at several points in a temperature range from 300 to 900° C., each of the values of the thermal capacity per unit volume of the adhesive layer and the thermal capacity per unit volume of the coating material layer are desirably lower than the thermal capacity per unit volume of the porous ceramic member; however, the average value of the thermal capacities per unit volume of the adhesive layers and the average value of the thermal capacities per unit volume of the coating material layers may be made lower than the average value of the thermal capacities per unit volume of the porous ceramic members.

The reason for the above-mentioned setting is because the honeycomb filter of the eighth aspect of the present invention attempts to reduce the thermal capacity of the honeycomb filter as a whole by reducing the thermal capacities of the adhesive layer and the coating material layer without reducing the thermal capacity of the porous ceramic member; thus, this arrangement makes it possible to improve the temperature rising property of the honeycomb filter as a whole, without reducing the mechanical strength of the porous ceramic member.

Consequently, for example, when a catalyst is supported on the honeycomb filter so as to serve as a catalyst supporting member, it is possible to quickly heat the honeycomb filter to a temperature at which the catalyst is allowed to purify CO, HC and NOx in exhaust gases, and also to provide superior purifying performances for CO, HC, NOx and the like in the exhaust gases.

Here, in the honeycomb filter of the eighth aspect of the present invention, the rate of the thermal capacity per unit volume of the adhesive layer and the rate of the thermal capacity per unit volume of the coating material layer to the thermal capacity per unit volume of the porous ceramic member are desirably set to 90% or less respectively. This arrangement makes it possible to improve the temperature rising property of the honeycomb filter of the eighth aspect of the present invention.

In the honeycomb filter of the eighth aspect of the present invention, the rate of the thermal capacity per unit volume of the adhesive layer and/or the rate of the thermal capacity per unit volume of the coating material layer to the thermal capacity per unit volume of the porous ceramic member are desirably set to 20% or more, respectively. The rate of less than 20% tends to make the thermal capacity per unit volume of the adhesive layer and/or the thermal capacity per unit value of the coating material layer too lower than the thermal capacity per unit volume of the porous ceramic member, resulting in an abrupt increase in the temperature of the adhesive layer and/or the coating material layer due to high-temperature exhaust gases to be discharged and the subsequent great thermal stress exerted in a gap with the porous ceramic member constituting the honeycomb filter of the eighth aspect of the present invention; consequently, cracks tend to occur between the adhesive layer and/or the coating material layer and the porous ceramic member.

Moreover, the rate of the thermal capacity per unit volume of the adhesive layer and the rate of the thermal capacity per unit volume of the coating material layer to the thermal capacity per unit volume of the porous ceramic member in the honeycomb filter of the eighth aspect of the present invention are desirably set to 25% or more, respectively.

With respect to the thermal capacity per unit volume (1 m$^3$) of the porous ceramic member to be used for the honeycomb filter of the eighth aspect of the present invention, not particularly limited, it is appropriately determined depending on ceramic materials and the like to be used, and desirably set in a range from 600 to 3000 (kJ/(K·m$^3$)). In order to set the thermal capacity to less than 600 (kJ/(K·m$^3$)), it is necessary to make the porosity of the porous ceramic member very high; however, since such a porous ceramic member comes to have a very low density, the strength is lowered and it tends to be easily broken. Moreover, when such a ceramic member is used as a filter, it is easily heated because of the improved response to heat, while, in contrast, it is easily cooled, making it difficult to maintain the filter at a high temperature, as well as making it difficult to heat the filter. In the case of the thermal capacity exceeding 3000 (kJ/(K·m$^3$)), the porosity of the honeycomb filter of the eighth aspect of the present invention needs to be set lower so as to make the thermal capacity higher, with the result that the back pressure becomes higher to give adverse effects to the performances of the engine and the like. Moreover, since, when used as a filter, the thermal capacity becomes higher, more thermal energy is required to raise the temperature, resulting in degradation in the temperature rising property.

With respect to the thermal capacity per unit volume of the adhesive layer and the thermal capacity per unit volume of the coating material layer, not particularly limited, it is appropriately adjusted so as to become smaller than the thermal capacity per unit volume of the porous ceramic member, and is desirably set in a range from 400 to 2300 (kJ/(K·m$^3$)). When it is less than 400 (kJ/(K·m$^3$)), the gap from the thermal capacity per unit volume of the porous ceramic member becomes greater, with the result that the temperatures of the adhesive layer and/or the coating material layer abruptly rise due to discharged high-temperature exhaust gases to cause a great thermal stress against the porous ceramic members that constitute the honeycomb filter of the eighth aspect of the present invention; consequently, cracks tend to occur between the adhesive layer and/or the coating material layer and the porous ceramic member. In contrast, when it exceeds 2300 (kJ/(K·m$^3$)), the thermal capacity of the honeycomb filter of the eighth aspect of the present invention becomes greater, with the result that, when used as a filter, more thermal energy is required to raise the temperatures of the adhesive layer and/or the coating material layer since the thermal capacities of the adhesive layer and/or the coating material layer are large, resulting in degradation in the temperature rising property of the honeycomb filter of the eighth aspect of the present invention as a whole. Moreover, this sometimes makes it difficult to select materials.

In the honeycomb filter of the eighth aspect of the present invention, with respect to the method for making the thermal capacity per unit volume of the adhesive layer and the thermal capacity per unit volume of the coating material layer lower than the thermal capacity per unit volume of the porous ceramic member, not particularly limited, examples thereof include: a method in which materials of the porous ceramic member, the adhesive and the coating material are properly selected; and a method in which the porosity of each of the adhesive layer and the coating material layer is increased; and the like, and among these methods, the method in which the porosity of each of the adhesive layer and the coating material layer is increased is desirably used. With this method, it becomes possible to reduce the thermal capacity of the entire honeycomb filter of the eighth aspect of the present invention and consequently to quickly raise the temperature of the honeycomb filter of the eighth aspect of the present invention by the use of discharged high-temperature exhaust gases, carried thereon.

With respect to the method for increasing the porosity of each of the adhesive layer and the coating material layer, not particularly limited, examples thereof include: as explained in the coating material layer of the honeycomb filter of the first aspect of the present invention, a method in which the adhesive layer and coating material layer are allowed to contain a foaming agent, resins, such as a thermoplastic resin and a thermosetting resin, and balloons such as an inorganic material and an organic material, and the like.

In the honeycomb filter of the eighth aspect of the present invention, it becomes possible to adjust the thermal capacity per unit volume of the adhesive layer and the thermal capacity per unit volume of the coating material layer by allowing the adhesive and the coating material to contain the foaming agent, resins, such as a thermoplastic resin and a thermosetting resin, and balloons such as an inorganic material and an organic material.

The adjusting processes can be carried out because of the following reasons. At the time of manufacturing of the honeycomb filter of the eighth aspect of the present invention, the above-mentioned materials are dispersed in the adhesive layer and coating material layer in a uniform state; however, when the honeycomb filter is actually used so that they are heated to a high temperature, the organic components such as the foaming agent are decomposed to be burned so that pores are formed in the adhesive layer and coating material layer, thereby causing a reduction in the density of each of the adhesive layer and the coating material layer.

Aside from the method for increasing the porosity of each of the adhesive layer and the coating material layer, by selecting those materials having a low thermal capacity upon selecting the inorganic binder, organic binder, inorganic fibers and inorganic particles that constitute the adhesive and coating material, the thermal capacities of the adhesive layer and the coating material layer are further lowered.

With respect to the constituent components of the honeycomb filter of the eighth aspect of the present invention except for the above-mentioned components, the same components as the honeycomb structural body of the first aspect of the present invention may be used; therefore, the specific description thereof is omitted.

Furthermore, the honeycomb filter of the eighth aspect of the present invention may have a catalyst capable of purifying CO, HC, NOx and the like in the exhaust gases carried thereon.

When such a catalyst is supported thereon, the honeycomb filter of the eighth aspect of the present invention is allowed to function as a filter capable of collecting particulates in exhaust gases, and also to function as a catalyst supporting member for purifying CO, HC, NOx and the like contained in exhaust gases.

With respect to the above-mentioned catalyst, not particularly limited as long as it can purify CO, HC, NOx and the like in exhaust gases, examples thereof include noble metals such as platinum, palladium, rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the eighth aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the eighth aspect of the present invention also serves as a catalyst supporting member is omitted.

As described above, the honeycomb filter of the eighth aspect of the present invention has a structure in that the thermal capacity per unit volume of the adhesive layer and the thermal capacity per unit volume of the coating material layer are lower than the thermal capacity per unit volume of the porous ceramic member. Therefore, the honeycomb filter of the eighth aspect of the present invention is superior in the temperature rising property, and when a catalyst is supported on the honeycomb filter, the honeycomb filter of the eighth aspect of the present invention is quickly heated to a temperature that allows the catalyst to purify CO, HC, NOx and the like in exhaust gases. Consequently, the honeycomb filter of the eighth aspect of the present invention is desirably used as a catalyst supporting member.

The following description will explain one example of a manufacturing method for the honeycomb filter of the eighth aspect of the present invention.

The honeycomb filter of the eighth aspect of the present invention can be manufactured by using the same method as the honeycomb filter of the first aspect of the present invention except that, in the preparing process of the adhesive paste for forming the adhesive layer 14 in the manufacturing method for the honeycomb filter of the first aspect of the present invention, the composition of the adhesive paste is adjusted so as to make the thermal capacity per unit volume of the adhesive layer to be formed lower than the thermal capacity per unit volume of the porous ceramic member, and that, in the preparing process of the coating material paste for forming the coating material layer 13, the composition of the coating material paste is adjusted so as to make the thermal capacity per unit volume of the coating material layer to be formed lower than the thermal capacity per unit volume of the porous ceramic member.

The following description will explain a honeycomb filter for purifying exhaust gases according to the ninth aspect of the present invention.

The honeycomb filter for purifying exhaust gases of the ninth aspect of the present invention has a structure in which:

a plurality of a columnar porous ceramic member are combined with one another through adhesive layer to constitute a ceramic block, a coating material layer is formed on the circumferential face of the above-mentioned ceramic block each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates wherein the adhesive layer is formed by using the adhesive of the present invention, and the coating material layer is formed by using the coating material of the present invention.

In the same manner as the honeycomb filter for purifying exhaust gases of the first aspect of the present invention, as shown in FIG. 1, the honeycomb filter for purifying exhaust gases of the ninth aspect of the present invention may be prepared as a honeycomb filter 10 having a structure in that a plurality of porous ceramic members 20 are combined with one another through adhesive layers 14 to constitute a ceramic block 15, with a coating material layer 13 being formed on the circumferential face of the ceramic block 15.

Here, with respect to the shape of the ceramic block, not particularly limited, for example, desired shapes, such as a cylinder shape, an elliptical column shape and a rectangular column shape, may be used.

With respect to the constituent members, such as a porous ceramic member and an adhesive layer, of the honeycomb filter for purifying exhaust gases of the ninth aspect of the present invention, the same members as the honeycomb filter for purifying exhaust gases of the first aspect of the present invention may be used except that the adhesive layer is formed by using the adhesive of the present invention and that the coating material layer is formed by using the coating material of the present invention; therefore, the specific description thereof is omitted.

Furthermore, the honeycomb filter of the ninth aspect of the present invention may have a catalyst capable of purifying CO, HC, NOx and the like in the exhaust gases.

When such a catalyst is supported thereon; the honeycomb filter of the ninth aspect of the present invention is allowed to function as a filter capable of collecting particulates in exhaust gases, and also to function as a catalyst supporting member for purifying CO, HC, NOx and the like contained in exhaust gases.

With respect to the above-mentioned catalyst, not particularly limited as long as it can purify CO, HC, NOx and the like in exhaust gases, examples thereof include noble metals such as platinum, palladium rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be added thereto.

The honeycomb filter of the ninth aspect of the present invention in which the above-mentioned catalyst is supported is allowed to function as a gas purifying device in the same manner as the conventionally known DPFs with catalyst (Diesel Particulate Filter). Therefore, in the following description, the detailed explanation of the case in which the honeycomb filter of the ninth aspect of the present invention also serves as a catalyst supporting member is omitted.

The following description will explain a manufacturing method for the honeycomb filter of the ninth aspect of the present invention.

The honeycomb filter of the ninth aspect of the present invention can be manufactured by using the same method as the honeycomb filter of the first aspect of the present invention except that, in the ceramic laminated body forming process in the manufacturing method for the honeycomb filter of the first aspect of the present invention, the adhesive of the present invention is used as the adhesive paste, and that, in the coating material forming process, the coating material of the present invention is used as the coating material paste.

Since its adhesive layer is formed by using the adhesive of the present invention with its coating material layer being formed by using the coating material of the present invention, the honeycomb filter for purifying exhaust gases of the ninth aspect of the present invention has a superior temperature rising property. This is because the independent pores, formed inside the adhesive layer and coating material layer, lower the density of each of the adhesive layer and the coating material layer to lower the thermal capacity per unit volume and consequently to improve the heat-insulating property of the coating material layer.

Moreover, since its adhesive layer is formed by using the adhesive of the present invention, and also its coating material layer is formed by using the coating material of the present invention, the honeycomb filter for purifying exhaust gases of the ninth aspect of the present invention has superior strength and durability. This is because the independent pores, formed inside the adhesive layer and coating material layer, make it possible to improve the elasticity of each of the adhesive layer and the coating material layer; to prevent generation of cracks in the adhesive layer and coating material layer; to alleviate a thermal stress imposed on the ceramic block to prevent generation of cracks in the ceramic block; and also to effectively alleviate an external force imposed on the honeycomb filter for purifying exhaust gases of the ninth aspect of the present invention.

Here, since the honeycomb filter for purifying exhaust gases of the ninth aspect of the present invention is superior in strength and durability, it is possible to increase the porosity, and also to lower the thermal capacity per unit volume with the increased porosity; thus, it becomes possible to further improve the temperature rising property, and also to allow the filter to support a large amount of catalyst without an increase in the back pressure so as to function as a catalyst supporting member.

The following description will explain a manufacturing method of the present invention for a honeycomb filter for purifying exhaust gases.

The manufacturing method for a honeycomb filter for purifying exhaust gases of the present invention is the manufacturing method of a honeycomb filter for purifying exhaust gases which has a structure in which:

a plurality of a columnar porous ceramic member are combined with one another through adhesive layer to form a ceramic laminated body, and the above-mentioned ceramic laminated body is subjected to a machining process to constitute a ceramic block, the above-mentioned ceramic block having a filled layer formed on the circumference part thereof each of the above-mentioned columnar porous ceramic member comprising a number of through holes that are placed in parallel with one another in the length direction with partition wall interposed therebetween; and the above-mentioned partition wall which separates the above-mentioned through holes functions as a filter for collecting particulates which comprises steps of:

the coating material filling step, in which assuming that a border line formed by an end face of a ceramic block to be manufactured is superposed on an end face of the above-mentioned ceramic laminated body formed by combining a plurality of the porous ceramic members with one another through the adhesive layer, the through holes of the porous ceramic member that crosses the border line is filled with a coating material; and the ceramic block manufacturing process, in which the ceramic laminated body filled with the above-mentioned coating material is subjected to a machining process so that a ceramic block is manufactured.

In the manufacturing method for a honeycomb filter for purifying exhaust gases of the present invention, the same processes as a conventional honeycomb filter for purifying exhaust gases are carried out except that, prior to the manufacturing of the ceramic block 15 through machining processes of the ceramic laminated body 30, through holes 21 to be exposed after the machining processes are preliminarily filled with the coating material, and with respect to processes other than the above-mentioned coating-material filling process and ceramic-block forming process, the same method as the manufacturing method for the honeycomb filter of the first aspect of the present invention can be carried out.

Referring to FIGS. 1 and 2, the following description will explain the manufacturing method for the honeycomb filter for purifying exhaust gases of the present invention.

In the manufacturing method for the honeycomb filter for purifying exhaust gases of the present invention, first, a ceramic laminated body to be the ceramic block 15 is manufactured.

This ceramic laminated body has a rectangular column shape in which a plurality of rectangular-column-shaped porous ceramic members 20, each having a structure in that a number of through holes 21 are arranged in the length direction side by side with partition wall 23 being interposed therebetween, are combined with one another through adhesive layer 14.

Upon manufacturing the porous ceramic members 20, first, a binder and a dispersant solution are added to the aforementioned ceramic powder to prepare a mixed composition.

These ceramic powder, binder and dispersant solution are mixed by an attritor or the like, and sufficiently kneaded by a kneader or the like, and then extrusion-formed so that a column-shaped raw formed body having substantially the same shape as the porous ceramic member shown in FIG. 2 is produced.

After the above-mentioned raw formed body has been dried by using a microwave drier or the like, a mouth-sealing process which fills a sealant material (plug) into predetermined through holes, and this is again subjected to a drying process using a microwave drier or the like.

Next, the raw formed body that has been subjected to the mouth-sealing process is heated at 400 to 650° C. in an oxygen-containing atmosphere so as to be degreased so that the binder and the like are decomposed and eliminated to allow only the ceramic powder to remain therein.

Next, the raw formed body that has been degreased is fired by heating it at 1400 to 2200° C. in an inert gas atmosphere such as nitrogen and argon so that the ceramics powder is sintered to produce a porous ceramic member 20.

Next, as shown in FIG. 3, a ceramic laminated body is formed.

In other words, first, porous ceramic members 20 are placed in a tilted state on a base 40 the upper portion of which is designed to have a V shape in its cross-section so as to allow the porous ceramic members 20 to be stacked thereon in a tilted manner, and adhesive paste to form an adhesive layer 14 is then applied onto two side faces 20a and 20b facing upward with an even thickness to form an adhesive paste layer; thereafter, a laminating process for forming another porous ceramic member 20 on this adhesive paste layer is successively repeated so that a rectangular column-shaped ceramic laminated body having a predetermined size is manufactured. At this time, with respect to the porous ceramic members 20 corresponding to four corners of the ceramic laminated body, a triangular column-shaped porous ceramic member 20c, which is formed by cutting a quadrangular column-shaped porous ceramic member into two, is bonded to a resin member 41 having the same shape as the triangular column-shaped porous ceramic member 20c by using a both-sides tape with easy peelability to prepare a corner member, and these corner members are used for the four corners of the ceramic laminated body, and after the lamination processes of the porous ceramic members 20, all the resin members 41 forming the four corners of the ceramic laminated body are removed; thus, a ceramic laminated body having a polygonal column shape in its cross section may be formed. With this arrangement, it is possible to reduce the quantity of a waste corresponding to porous ceramic members to be disposed of, after the formation of the ceramic block by cutting the peripheral portion of the ceramic laminated body.

With respect to a method for manufacturing the ceramic laminated body having a polygonal column shape in its cross section except for the method shown in FIG. 3, for example, a method in which the porous ceramic members to be located on four corners are omitted and a method in which porous ceramic members having a triangular shape are combined with one another may be used in accordance with the shape of a honeycomb filter to be manufactured. Here, a quadrangular column-shaped ceramic member may of course be manufactured.

Further, this ceramic laminated body is heated in a temperature range from 50 to 100° C. for about an hour so that the adhesive paste layer is dried and solidified to form an adhesive layer 14.

Successively, in the manufacturing method for the honeycomb filter for purifying exhaust gases of the present invention, assuming that a border line formed by an end face of a ceramic block to be manufactured is superposed on an end face of the ceramic laminated body 3 formed by combining the porous ceramic members 20 with one another through the adhesive layers 14, a coating material is filled in through holes 21 of the porous ceramic member 20 that are located so as to cross the border line; thus, a coating material filling process is carried out.

Figure 5:
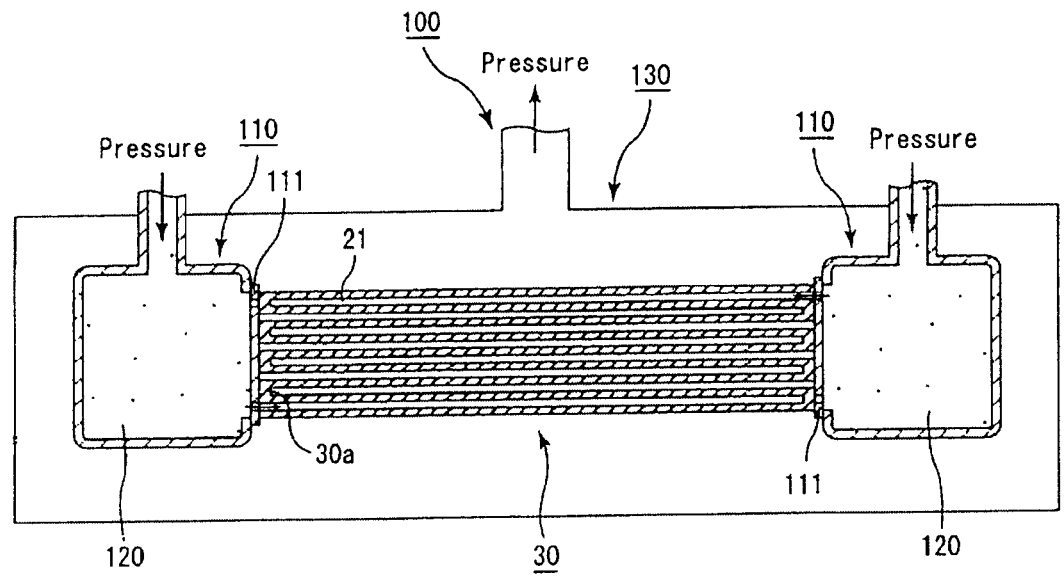
FIG. 5(a) is a cross-sectional view that schematically shows one example of a coating material filling device to be used in the coating material filling process.
FIG. 5(b) is a front view that shows one example of a mask placed in the coating material filling device.
Figure 5:
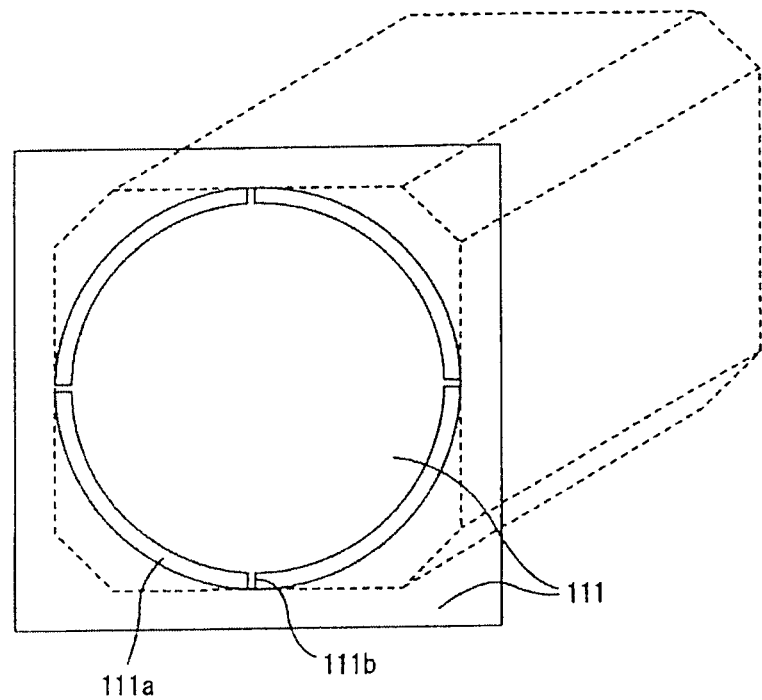
Figure 6:
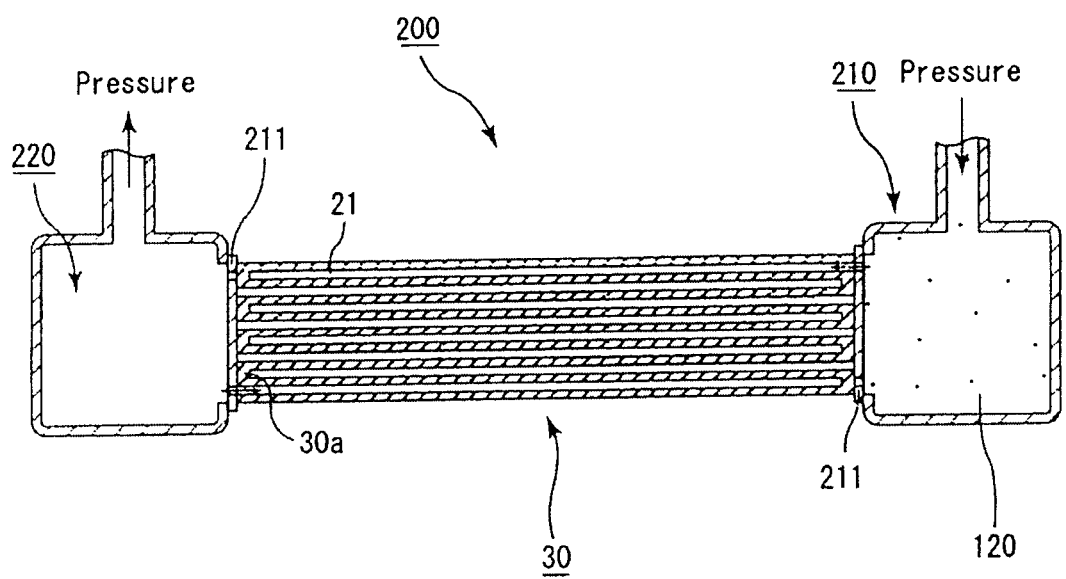
FIG. 6 is a cross-sectional view that schematically shows another example of the coating material filling device to be used in the coating material filling process.

FIG. 4(a) is a perspective view in which a border line (indicated by a dot line) formed by an end face of a ceramic block to be manufactured is superposed on an end face of a ceramic laminated body, and FIG. 4(b) is a perspective view that schematically shows a state where a coating material is filled into through holes of the porous ceramic member that are located so as to cross the border line (indicated by a dot line) drawn by an end face of a ceramic block to be manufactured. FIG. 5(a) is a cross-sectional view that schematically shows one example of a coating material filling device to be used in the coating material filling process, and FIG. 5(b) is a front view that shows one example of a mask to be placed in the coating material filling device. FIG. 6 is a cross-sectional view that schematically shows another example of the coating material filling device to be used in the coating material filling process.

Figure 4:
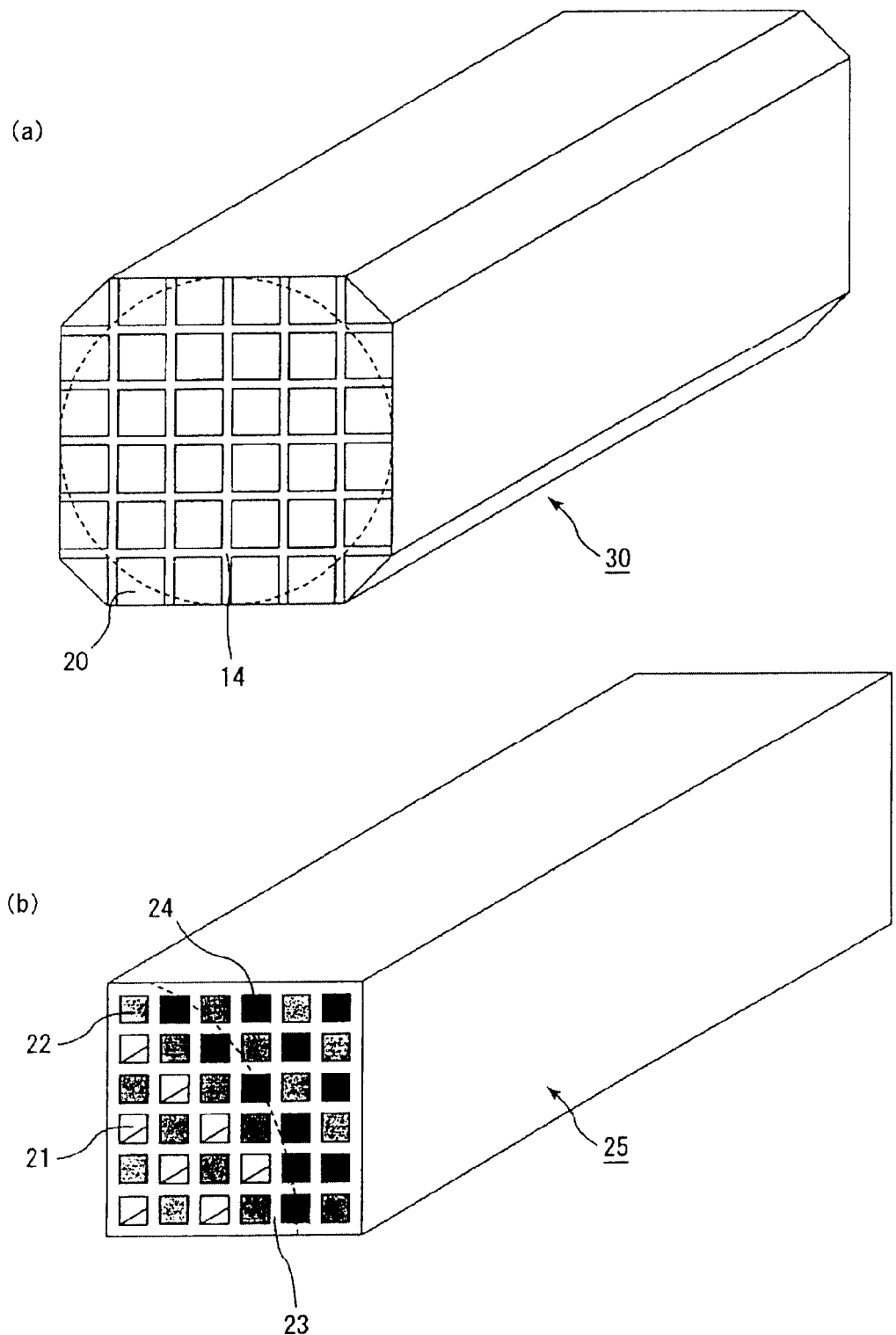
FIG. 4(a) is a perspective view in which the border line (indicated by a dot line) formed by the end face of a ceramic block to be manufactured is indicated in an overlapped manner with the end face of the ceramic laminated body.
FIG. 4(b) is a perspective view that schematically shows a state where through holes of a porous ceramic member, that cross the border line (indicated by a dot line) formed by the end face of a ceramic block to be manufactured, are filled with a coating material.

As shown in FIG. 4, the above-mentioned coating material filling process is carried out so that, prior to manufacturing processes of the ceramic block 15 carried out by machining the ceramic laminated body 30, those through holes 21 to be exposed after the machining processes are preliminarily filled with the coating material. Here, in the case where it is difficult to fill the coating material into only the through holes that are to be exposed after the machining processes in the operation, the coating material may be filled into those through holes to be machined in ceramic block manufacturing processes to be described later and those through holes in the vicinity of the through holes to be exposed after the machining process.

With respect to the coating material, not particularly limited, for example, the coating material of the present invention and the like may be used.

With respect to the method for filling the coating material into predetermined through holes 21 in the ceramic laminated body 30, not particularly limited, examples thereof include: a method in which a fixed pressure is applied to the coating material; a method in which the coating material is subjected to a suction process; or a method in which the coating material is subjected to a suction process with a fixed pressure being applied to the coating material, and the like. More specifically, examples thereof include: a method in which a coating material filling device 100 shown in FIG. 5 is used; or a method in which a coating material filling device 200 shown in FIG. 6 is used and the like. In the method using the coating material filling device 100 shown in FIG. 5, a coating material 120 is discharged from a coating material discharging tank 110 by decompressing a decompression container 130, and a fixed pressure is also applied to the inside of the coating material discharging tank 110 so that the filling of the coating material 120 is more positively carried out quickly. Moreover, in the method using the coating material filling device 200 shown in FIG. 6, the inside of the ceramic laminated body 30 with the peripheral portion being made in a tightly-closed state is subjected to a suction process by using a decompressing suction device 220 so that the coating material 120 is discharged from the coating material discharging tank 210, and a fixed pressure is also applied to the coating material discharging tank 210 so that the filling of the coating material 120 is carried out more positively and quickly.

Here, in the method in which a fixed pressure is applied to the coating material also, it is possible to fill the coating material into a deep portion of the through hole 21 without being intervened by gas located inside the through hole 21. This is because, since the ceramic laminated body 30 is made from a porous material, the gas inside the through hole 21 is pushed out by the coating material that is filled into the through hole 21, without the necessity of the suction process.

As shown in FIG. 5, the coating material filling device 100 has a structure in that a pair of closed-type coating material discharging tanks 110 having masks 111 are installed in the decompression container 130, and the pair of closed-type coating material discharging tanks 110 are placed with faces having the masks 111 being aligned face to face with each other. Here, the closed-type coating material discharging tanks 110 are maintained in the tightly-closed state until the start of the filling process of the coating material, and at the time of the filling of the coating material, the faces having the masks 111 are released. Moreover, a ring-shaped opening section 111a, which is to be placed along the end face of the ceramic block to be prepared, is formed in the mask 111 so that the ring-shaped opening section 111a is divided into a plurality of sections by cross-linked sections 111b each of which is thinner than the width of the adhesive layer 14, at a position corresponding to the adhesive layer 14 on the end face 30a of the ceramic laminated body 30 that is to be made in contact with the mask. This structure is prepared so as to integrally form the mask 111 between the inside and the outside of the ring-shaped opening section 111a.

In an filling process of the coating material to predetermined through holes 21 in the ceramic laminated body 30 by the use of such a coating material filling device 100, first, the ceramic laminated body 30 is secured between the coating material discharging tanks 110 in such a manner that the end faces 30a of the ceramic laminated body 30 are made in contact with the masks 111 attached to the coating material discharging tanks 110. By placing the coating material discharging tanks 110 on both of the sides of the ceramic laminated body 30 in this manner, the coating material can be filled even into a through hole 21 with its one end sealed with a plug 22. At this time, the opening section 111a of the mask 111 and the predetermined through hole 21 to be filled with the coating material in the ceramic laminated body 30 are just aligned face to face with each other.

Successively, in a decompressed state in the decompression container 130, the face of the coating material discharging tank 110 having the mask 111 is released, and a predetermined pressure is applied to the coating material discharging tank 110 by using, for example, a pump such as a mono-pump and the like so that the coating material 120 is discharged from the opening section 111a of the mask 111, and filled into predetermined through holes 21 of the ceramic laminated body 30.

As shown in FIG. 6, the coating material filling device 200 has a structure in that a tightly closed-type coating material discharging tank 210 having the mask 211 and the decompressing suction device 220 having the mask 221 are arranged with the faces having the masks being aligned face to face with each other. Here, a mask which is the same as the mask 111 is used as the mask 211, and a mask, which has the same structure as the mask 111 with a ring-shaped opening section having a size slightly larger than the mask 111, is used as the mask 221.

In the case where the coating material is filled into predetermined through holes 21 in the ceramic laminated body 30 by using the coating material filling device 200 of this type, first, the side face having no through holes 21 of the ceramic laminated body 30 is made to be a tightly-sealed state by using a sealing sheet made from a material having no gas permeability. Successively, the mask 211 attached to the coating material discharging tank 210 is made in contact with one of the end faces 30a of the ceramic laminated body 30, and the mask 221 attached to the decompressing suction device 220 is made in contact with the other end face 30b of the ceramic laminated body 30; thus, the ceramic laminated body 30 is secured between the coating material discharging tank 210 and the decompressing suction device 220.

In this case, the opening section of the mask 211, attached to the coating material discharging tank 210, is aligned face to face with the predetermined through holes 21 to be filled with the coating material of the ceramic laminated body 30 and the opening section of the mask 221 attached to the decompressing suction device 220.

Next, while the inside of the ceramic laminated body 30 being subjected to a suction process by the decompressing suction device 220, the coating material 120 is discharged from the opening section of the mask 211 by applying a fixed pressure to the coating material discharging tank 210 by the use of a pump such as a mono-pump and the like so that the coating material is filled into the predetermined through holes 21 of the ceramic laminated body 30. Here, after the coating material has been injected from one of the end faces of the ceramic laminated body 30, the coating material is further injected to the other end face of the ceramic laminated body 30.

Here, with respect to the coating material filling device, not limited to the above-mentioned coating material filling devices 100 and 200, for example, another device, which has a system in which an open-type filler discharging tank with a stirring member being placed so that the coating material, filled in the filler discharging tank, is allowed to flow and being filled by shifting the stirring member in longitudinal directions, may be used.

After the coating material filling process, the ceramic laminated body 30, filled with the coating material, is heated to 50 to 150° C. for about an hour so that the coating material is cured.

Successively, in the manufacturing method for the honeycomb filter for purifying exhaust gases of the present invention, a ceramic block manufacturing process in which the ceramic laminated body 30, filled with the coating material in the coating material filling process, is subjected to cutting processes to form a ceramic block is carried out.

With respect to the method for the above-mentioned cutting processes, not particularly limited, for example, a cutting method using a diamond cutter or the like is proposed.

FIG. 7(a) is a perspective view that schematically shows a ceramic block manufactured by subjecting the ceramic laminated body filled with the coating material in the coating material filling process to machining processes, and FIG. 7(b) is a perspective view that schematically shows a porous ceramic member that forms a circumferential portion of the ceramic block manufactured by subjecting the ceramic laminated body filled with the coating material in the coating material filling process to machining processes.

Figure 7:
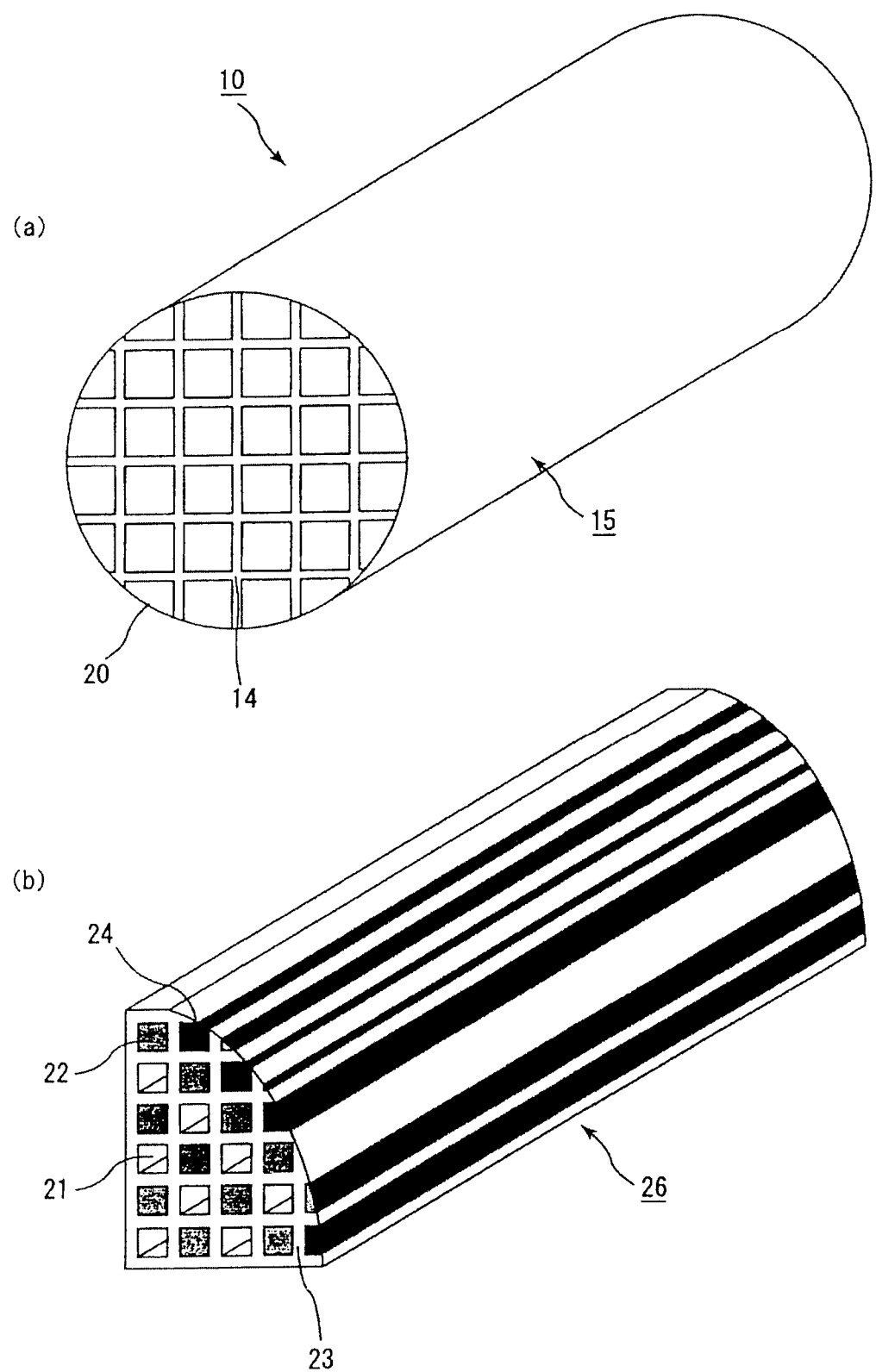
FIG. 7(a) is a perspective view that schematically shows a ceramic block manufactured by subjecting the ceramic laminated body filled with the coating material in the coating material filling process to machining processes.
FIG. 7(b) is a perspective view that schematically shows a porous ceramic member forming a circumferential portion of the ceramic block manufactured by subjecting the ceramic laminated body filled with the coating material in the coating material filling process to machining processes.

Here, in a conventional manufacturing method for a honeycomb filter for purifying exhaust gases, after the ceramic laminated body 30 has been machined and cut in a manner so as not to expose the through holes 21 to the circumference after the manufacturing of a ceramic block 15, a coating material layer is formed on the circumference of the ceramic block'15; in contrast, in the manufacturing method for the honeycomb filter for purifying exhaust gases of the present invention, a filled layer 24 is formed on the circumferential portion of the ceramic block as shown in FIG. 7 so that it is not necessary to form the coating material layer. However, in an attempt to further improve the strength, durability and heat-insulating property of the ceramic block, the coating material layer may be formed.

Moreover, in the manufacturing method for the honeycomb filter for purifying exhaust gases of the present invention, with respect to the materials for the respective members such as the porous ceramic member 20 and the adhesive layer 14 that constitute the honeycomb filter for purifying exhaust gases, the same materials as those used in the conventional honeycomb filter for purifying exhaust gases as well as the same materials as those used in the honeycomb filter for purifying exhaust gases of the first aspect of the present invention may be used; therefore, the description thereof is omitted.

In the manufacturing method for the honeycomb filter for purifying exhaust gases of the present invention, prior to machining and cutting processes of the ceramic laminated body to form a ceramic block, the through holes to be exposed after the machining and cutting processes are preliminarily filled with the coating material; therefore, it becomes possible to prevent occurrence of defects such as chipping when the ceramic laminated body is subjected to machining and cutting processes at the time of manufacturing the ceramic block, and consequently to omit processes for forming the coating material layer. Therefore, this method is desirably applied to a manufacturing process for a honeycomb filter for purifying exhaust gases, especially with a low thermal capacity and a high porosity.

Moreover, since the processes for applying the coating material to the ceramic block after the machining and cutting processes to form the coating material layer can be omitted, it is possible to make the honeycomb filter for purifying exhaust gases less susceptible to degradation in the outside dimensional precision due to deviations in thickness of the coating material layer, which tends to occur in the conventional honeycomb filter.

Moreover, the manufacturing method for the honeycomb filter for purifying exhaust gases of the present invention may be used for manufacturing the honeycomb filter for purifying exhaust gases relating to the first, second, third, fourth, fifth, sixth, seventh, eighth or ninth aspect of the present invention.

BEST MODE FOR CARRYING OUT THE INVENTION

The following description will explain the present invention in detail by means of examples; however, the present invention is not intended to be limited by these examples.

Example 1

(1) Powder of α-type silicon carbide having an average particle size of 5 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a kneaded matter. Next, after a slight amount of a plasticizer and a lubricant had been added to the kneaded matter and this had been further kneaded, the resulting kneaded matter was extrusion-formed so that a raw formed product was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 33 mm×33 mm×300 mm, the number of through holes of 31 pcs/cm$^2$ and a thickness of the partition wall of 0.3 mm.

(2) A heat-resistant adhesive paste, which was prepared by adding 20 parts by weight of water to 100 parts by weight of a mixture composed of 17.6% by weight of alumina fibers having a fiber length of 0.2 mm, 61.0% by weight of silicon carbide particles having an average particle size of 0.6 μm, 9.1% by weight of silica sol, 2.3% by weight of carboxymethyl cellulose and 10% by weight of ammonium hydrogencarbonate serving as a foaming agent, was used so that, by carrying out the processes as explained by reference to FIG. 3, a number of the porous ceramic members were combined with one another, and then cut by using a diamond cutter; thus, a cylinder-shaped ceramic block having a diameter of 165 mm, as shown in FIG. 1, was obtained.

Next, ceramic fibers made from alumina silicate (shot content: 3%, fiber length: 0.1 to 100 mm) (23.3% by weight), which served as inorganic fibers, silicon carbide powder having an average particle size of 0.3 μm (30.2% by weight), which served as inorganic particles, silica sol (SiO$_2$ content in the sol: 30% by weight) (7% by weight), which served as an inorganic binder, carboxymethyl cellulose (0.5% by weight), which served as an organic binder, and water (39% by weight) were mixed and kneaded to prepare a coating material paste.

Next, a coating material paste layer having a thickness of 1.0 mm was formed on the circumferential portion of the ceramic block by using the above-mentioned coating material paste. Further, this coating material paste layer was dried at 120° C. so that a cylinder-shaped honeycomb filter as shown in FIG. 1 was manufactured.

Example 2

(1) The same processes as (1) of Example 1 were carried out to obtain a porous ceramic member.

(2) The same processes as Example 1 were carried out except that a heat-resistant adhesive paste, prepared by adding 25 parts by weight of water to 100 parts by weight of a mixture composed of 15.7% by weight of alumina fibers having a fiber length of 0.2 mm, 54.2% by weight of silicon carbide particles having an average particle size of 0.6 μm, 8.1% by weight of silica sol, 2.0% by weight of carboxymethyl cellulose and 20% by weight of ammonium hydrogencarbonate serving as a foaming agent, was used to manufacture a honeycomb filter.

Example 3

(1) The same processes as (1) of Example 1 were carried out to obtain a porous ceramic member.

(2) The same processes as Example 1 were carried out except that a heat-resistant adhesive paste, prepared by adding 35 parts by weight of water to 100 parts by weight of a mixture composed of 13.7% by weight of alumina fibers having a fiber length of 0.2 mm, 47.4% by weight of silicon carbide particles having an average particle size of 0.6 μm, 7.1% by weight of silica sol, 1.8% by weight of carboxymethyl cellulose and 30% by weight of ammonium hydrogencarbonate serving as a foaming agent, was used to manufacture a honeycomb filter.

Example 4

(1) The same processes as (1) of Example 1 were carried out to obtain a porous ceramic member.

(2) The same processes as Example 1 were carried out except that a heat-resistant adhesive paste, prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxymethyl cellulose and 40.2% by weight of fly ash balloons, was used to manufacture a honeycomb filter.

Example 5

(1) The same processes as (1) of Example 1 were carried out to obtain a porous ceramic member.

(2) The same processes as Example 1 were carried out except that a heat-resistant adhesive paste, prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxymethyl cellulose and 40.2% by weight of alumina balloons, was used to manufacture a honeycomb filter.

Example 6

(1) The same processes as (1) of Example 1 were carried out to obtain a porous ceramic member.

(2) The same processes as Example 1 were carried out except that a heat-resistant adhesive paste, prepared by adding 35 parts by weight of water to 100 parts by weight of a mixture composed of 13.7% by weight of alumina fibers having a fiber length of 0.2 μm, 47.4% by weight of silicon carbide particles having an average particle size of 0.6 μm, 7.1% by weight of silica sol, 1.8% by weight of carboxymethyl cellulose and 30% by weight of spherical acrylic resin (average particle size: 10 μm), was used to manufacture a honeycomb filter.

Example 7

(1) The same processes as (1) of Example 1 were carried out to obtain a porous ceramic member.

(2) The same processes as Example 1 were carried out except that a heat-resistant adhesive paste, prepared by adding 35 parts by weight of water to 100 parts by weight of a mixture composed of 13.7% by weight of alumina fibers having a fiber length of 0.2 mm, 47.4% by weight of silicon carbide particles having an average particle size of 0.6 μm, 7.1% by weight of silica sol, 1.8% by weight of carboxymethyl cellulose and 30% by weight of organic balloons comprising acryl (average particle size: 10 μm), was used to manufacture a honeycomb filter.

Example 8

(1) The same processes as (1) of Example 1 were carried out to obtain a porous ceramic member.

(2) The same processes as Example 1 were carried out except that a heat-resistant adhesive paste, prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxymethyl cellulose, 10% by weight of ammonium hydrogencarbonate and 30.2% by weight of alumina balloons, was used to manufacture a honeycomb filter.

Example 9

(1) The same processes as (1) of Example 1 were carried out to obtain a porous ceramic member.

(2) The same processes as Example 1 were carried out except that a heat-resistant adhesive paste, prepared by adding 40 parts by weight of water to 100 parts by weight of a mixture composed of 6.7% by weight of alumina fibers having a fiber length of 0.2 mm, 30.8% by weight of silicon carbide particles having an average particle size of 0.6 μm, 20.6% by weight of silica sol, 1.7% by weight of carboxymethyl cellulose, 20% by weight of ammonium hydrogencarbonate and 20.2% by weight of alumina balloons, was used to manufacture a honeycomb filter.

Comparative Example 1

(1) The same processes as (1) of Example 1 were carried out to obtain a porous ceramic member.

(2) The same processes as Example 1 were carried out except that an adhesive paste, prepared by adding 43 parts by weight of water to 100 parts by weight of a mixture composed of 37% by weight of alumina fibers having a fiber length of 0.2 mm, 49.7% by weight of silicon carbide particles having an average particle size of 0.6 μm, 12.3% by weight of silica sol and 1.0% by weight of carboxymethyl cellulose, was used to manufacture a honeycomb filter.

Comparative Example 2

(1) The same processes as (1) of Example 1 were carried out to obtain a porous ceramic member.

(2) The same processes as Example 1 were carried out except that an adhesive paste, prepared by mixing 34 parts by weight of water to 100 parts by weight of a mixture composed of 15.1% by weight of alumina fibers having a fiber length of 0.2 mm, 17.5% by weight of silicon carbide particles having an average particle size of 0.6 μm, 61.5% by weight of silica sol and 5.9% by weight of carboxymethyl cellulose, was used to manufacture a honeycomb filter.

Reference Example 1

(1) The same processes as (1) of Example 1 were carried out to obtain a porous ceramic member.

(2) The same processes as Example 1 were carried out except that a heat-resistant adhesive paste, prepared by mixing 35 parts by weight of water to 100 parts by weight of a mixture composed of 13.7% by weight of alumina fibers having a fiber length of 0.2 mm, 27.4% by weight of silicon carbide particles having an average particle size of 0.6 μm, 7.1% by weight of silica sol, 1.8% by weight of carboxymethyl cellulose and 50% by weight of ammonium hydrogencarbonate, was used to manufacture a honeycomb filter.

Reference Example 2

(1) The same processes as (1) of Example 1 were carried out to obtain a porous ceramic member.

(2) The same processes as Example 1 were carried out except that an adhesive paste, prepared by adding 50 parts by weight of water in 100 parts by weight of a mixture composed of 27% by weight of alumina fibers having a fiber length of 0.2 mm, 39.7% by weight of silicon carbide particles having an average particle size of 0.6 μm, 12.3% by weight of silica sol, 1.0% by weight of carboxymethyl cellulose and 20% by weight of ammonium hydrogencarbonate, was used to manufacture a honeycomb filter.

The thermal expansion coefficient $\alpha_F$ of each of the porous ceramic members thus manufactured and the thermal expansion coefficient $\alpha_L$ of the adhesive layer of each of the honeycomb filters relating to Examples 1 to 9, Comparative Examples 1 and 2, and Reference Examples 1 and 2 were measured at respective temperatures of 300° C., 400° C., 600° C., 750° C. and 900° C. (Table 1) and based upon these values, the value of $|\alpha_L - \alpha_F|/\alpha_F$ was calculated (Table 2).

Moreover, each of the honeycomb filters relating to Examples 1 to 9, Comparative Examples 1 and 2, and Reference Examples 1 and 2 was placed on a base having a hollow round-shape, and the honeycomb filter was supported by the porous ceramic members located on the circumferential portion so that, in this state, a force is applied onto one of the porous ceramic members near the center downward in a manner so as to push it out; thus, a push-out test for measuring a force to break the honeycomb filter was measured.

Furthermore, each of the honeycomb filters relating to Examples 1 to 9, Comparative Examples 1 and 2, and Reference Examples 1 and 2 was placed in an exhaust passage of an engine, and this was subjected to repeated particulate collecting tests of 100 times, and then subjected to the same push-out test; thus, the degree of a reduction in the push-out strength after the particulate collecting tests was calculated.

The results are shown in Table 3.

TABLE 1

| | Thermal expansion coefficient (×10⁻⁶)1/K | | | | |
|---|---|---|---|---|---|
| | 300° C. | 400° C. | 600° C. | 750° C. | 900° C. |
| Porous ceramic member ($\alpha_F$) | 5.7 | 5.3 | 3.5 | 3.4 | 3.9 |
| Example 1 ($\alpha_L$) | 6.3 | 6.2 | 5.2 | 4.8 | 2.7 |
| Example 2 ($\alpha_L$) | 6.3 | 6.7 | 5.3 | 5.9 | 6.4 |
| Example 3 ($\alpha_L$) | 7.5 | 7.4 | 6.3 | 5.9 | 6.4 |
| Example 4 ($\alpha_L$) | 6.4 | 6.7 | 5.3 | 5.0 | 4.3 |
| Example 5 ($\alpha_L$) | 7.5 | 7.4 | 6.3 | 4.1 | 2.7 |
| Example 6 ($\alpha_L$) | 4.6 | 4.8 | 3.6 | 3.7 | 7.3 |
| Example 7 ($\alpha_L$) | 5.8 | 5.4 | 3.6 | 3.5 | 4.0 |
| Example 8 ($\alpha_L$) | 10.3 | 9.7 | 6.3 | 5.7 | 6.9 |
| Example 9 ($\alpha_L$) | 11.2 | 10.0 | 7.2 | 6.8 | 7.7 |
| Comparative Example 1 ($\alpha_L$) | 12.3 | 10.6 | 7.34 | 7.2 | 7.83 |
| Comparative Example 2 ($\alpha_L$) | 5.69 | 5.28 | 3.47 | 3.39 | 3.92 |
| Reference Example 1 ($\alpha_L$) | 11.4 | 10.6 | 7.1 | 6.9 | 7.8 |
| Reference Example 2 ($\alpha_L$) | 12.4 | 11.3 | 7.5 | 7.4 | 8.64 |

TABLE 2

| | $|\alpha_L - \alpha_F|/\alpha_F$ | | | | | |
|---|---|---|---|---|---|---|
| | 300° C. | 400° C. | 600° C. | 750° C. | 900° C. | Average |
| Example 1 | 0.11 | 0.17 | 0.49 | 0.41 | 0.31 | 0.30 |
| Example 2 | 0.11 | 0.26 | 0.51 | 0.74 | 0.64 | 0.45 |
| Example 3 | 0.32 | 0.40 | 0.80 | 0.74 | 0.64 | 0.58 |
| Example 4 | 0.12 | 0.26 | 0.51 | 0.47 | 0.10 | 0.29 |
| Example 5 | 0.32 | 0.40 | 0.80 | 0.21 | 0.31 | 0.41 |
| Example 6 | 0.19 | 0.09 | 0.03 | 0.09 | 0.87 | 0.26 |
| Example 7 | 0.02 | 0.02 | 0.03 | 0.03 | 0.03 | 0.024 |
| Example 8 | 0.81 | 0.83 | 0.80 | 0.68 | 0.77 | 0.78 |
| Example 9 | 0.96 | 0.89 | 1.06 | 1.00 | 0.97 | 0.98 |
| Comparative Example 1 | 1.16 | 1.00 | 1.10 | 1.12 | 1.01 | 1.08 |
| Comparative Example 2 | 0.002 | 0.004 | 0.009 | 0.003 | 0.005 | 0.004 |
| Reference Example 1 | 1.00 | 1.00 | 1.03 | 1.03 | 1.00 | 1.01 |
| Reference Example 2 | 1.18 | 1.13 | 1.14 | 1.18 | 1.22 | 1.17 |

TABLE 3

| | Push-out test (N) | | |
|---|---|---|---|
| | Before collection test | After collection test | Relative strength (%) |
| Example 1 | 17150 | 13230 | 77 |
| Example 2 | 26861 | 20011 | 74 |
| Example 3 | 22128 | 14886 | 67 |
| Example 4 | 19129 | 15885 | 83 |
| Example 5 | 16199 | 14031 | 87 |
| Example 6 | 25303 | 17870 | 71 |
| Example 7 | 15982 | 9800 | 61 |
| Example 8 | 22341 | 14294 | 64 |
| Example 9 | 20341 | 12700 | 62 |
| Comparative Example 1 | 17640 | 8918 | 51 |
| Comparative Example 2 | 19411 | 8948 | 46 |
| Reference Example 1 | 18341 | 9265 | 51 |
| Reference Example 2 | 17345 | 5364 | 31 |

As shown in Table 2, all the values $|\alpha_L - \alpha_F|/\alpha_F$ of the honeycomb filters relating to Examples 1 to 9 are set within a range from 0.01 to 1.0; however, all the values $|\alpha_L - \alpha_F|/\alpha_F$ of the honeycomb filters relating to Comparative Examples 1 and Reference Examples 1 and 2 are greater than 1.0 as a whole, and the values $|\alpha_L - \alpha_F|/\alpha_F$ of the honeycomb filter relating to Comparative Example 2 are smaller than 0.01 as a whole.

Here, the values $|\alpha_L - \alpha_F|/\alpha_F$ of the honeycomb filter relating to Example 9 obtained at 600° C. and 750° C. are 1.0 or more; however, the average value is 0.98, which is less than 1.0.

Moreover, as shown in Table 3, the results of the push-out tests indicate that each of the push-out strengths before the collection test of particulates in accordance with the honeycomb filters of Examples 1 to 9 exceeds 14700 N (1500 kgf) and that each of the push-out strengths after the collection test of particulates exceeds 9800 N (1000 kgf).

In contrast, each of the push-out strengths before the collection test of particulates in accordance with the honeycomb filters of Comparative Examples 1 and 2, as well as Reference Examples 1 and 2, is set in a range from 17345 N (1770 kgf) to 19411 N (1981 kgf), and each of the push-out strengths after the collection test of particulates is set in a range from 5364 N (547 kgf) to 9265 N (945 kgf); and in any of the cases, before the collection test of particulates, the push-out strengths have the same level as those of the honeycomb filters relating to Examples 1 to 9; however, after the collection test of particulates, the push-out strengths are inferior to those of the honeycomb filters relating to Examples 1 to 9.

Figure 8:
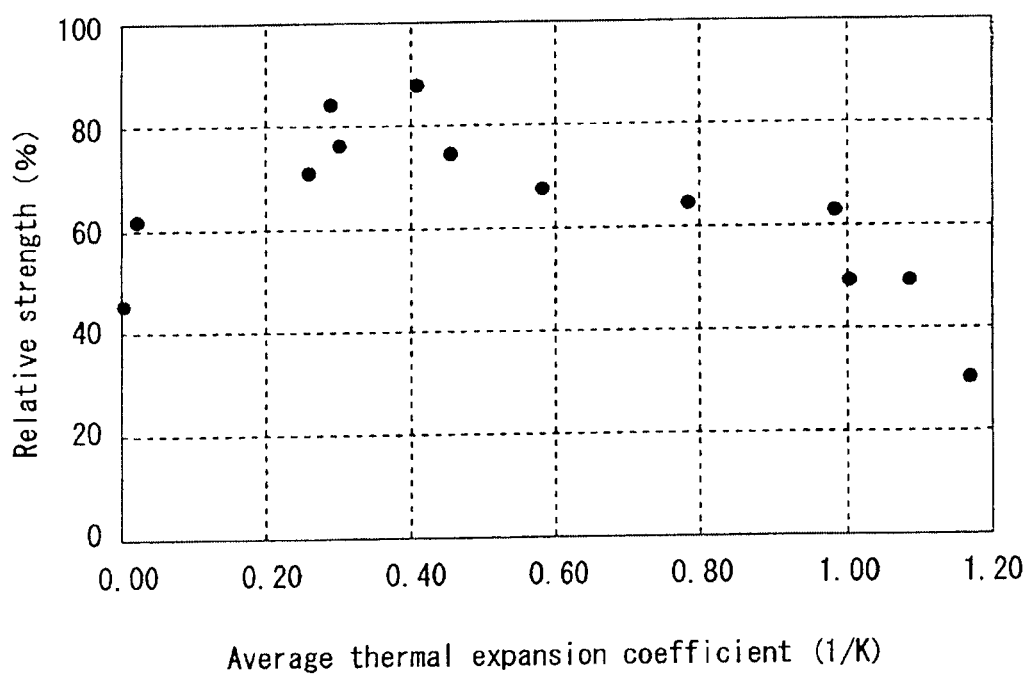
FIG. 8 is a graph that shows the relationship between a push-out strength ratio and a thermal expansion coefficient before and after a particulate collecting test of respective honeycomb filters relating to Examples 1 to 9 and Comparative Examples 1 to 4.

In other words, as shown in Table 3 and FIG. 8, each of the relative strengths (strength after collection test/strength before collection test×100) after the collection test of particulates of the honeycomb filters relating to Examples 1 to 9 is 60% or more thus a reduction in the strength is not so great; however, each of the relative strengths (strength after collection test/strength before collection test×100) after the collection test of particulates of the honeycomb filters relating to Comparative Examples 1 and 2, as well as Reference Examples 1 and 2, is less than 60%, resulting in a great reduction in the strength.

Example 10

(1) Powder of α-type silicon carbide having an average particle size of 10 μm (70% by weight) and powder of β-type silicon carbide having an average particle size of 0.5 μm (30% by weight) were wet-mixed, and to 100 parts by weight of the resulting mixture were added and kneaded 15 parts by weight of an organic binder (methyl cellulose), 10 parts by weight of water and 5 parts by weight of acrylic resin to obtain a kneaded matter. Next, after a slight amount of a plasticizer and a lubricant had been added to the kneaded matter and this had been further kneaded, the resulting kneaded matter was extrusion-formed so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 33 mm×33 mm×300 mm, the number of through holes of 31 pcs/cm², a thickness of the partition wall of 0.3 mm, a porosity of 50% by volume and an average pore diameter of 20 µm.

(2) A heat-resistant adhesive paste (the blending ratio of which is shown in Table 4), which was prepared by adding 40 parts by weight of water to 100 parts by weight of a mixture composed of ceramic fibers made from alumina silicate (shot content: 3%, fiber length: 0.1 to 100 mm) (6.78% by weight), which served as inorganic fibers, silicon carbide powder having an average particle size of 0.3 µm (30.6% by weight), which served as inorganic particles, silica sol ($SiO_2$ content in the sol: 30% by weight) (20.88% by weight), which served as an inorganic binder, carboxymethyl cellulose (1.74% by weight), which served as an organic binder and alumina balloons (40% by weight), which served as balloons, so as to be kneaded, was used so that, by carrying out the processes as explained by reference to FIG. 3, a number of the porous ceramic members were combined with one another, and then the resultant is cut by using a diamond cutter; thus, a cylinder-shaped ceramic block having a diameter of 165 mm, as shown in FIG. 1, was obtained.

Next, ceramic fibers made from alumina silicate (shot content: 3%, fiber length: 0.1 to 100 mm) (23.3% by weight), which served as inorganic fibers, silicon carbide powder having an average particle size of 0.3 µm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a coating material paste.

Next, a coating material paste layer having a thickness of 1.0 mm was formed on the circumferential portion of the ceramic block by using the above-mentioned coating material paste. Further, this coating material paste layer was dried at 120° C. so that a cylinder-shaped honeycomb filter as shown in FIG. 1 was manufactured.

Example 11

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 35 parts by weight of water to 100 parts by weight of a mixture composed of ceramic fibers made from alumina silicate (shot content: 3%, fiber length: 0.1 to 100 mm) (13.7% by weight), which served as inorganic fibers, silicon carbide powder having an average particle size of 0.3 µm (47.4% by weight), which served as inorganic particles, silica sol ($SiO_2$ content in the sol: 30% by weight) (7.1% by weight), which served as an inorganic binder, carboxymethyl cellulose (1.8% by weight), which served as an organic binder and acrylic resin (30% by weight), which served as resin, so as to be kneaded, was used; thus, a honeycomb filter was manufactured.

Example 12

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 25 parts by weight of water to 100 parts by weight of a mixture composed of ceramic fibers made from alumina silicate (shot content: 3%, fiber length: 0.1 to 100 mm) (15.7% by weight), which served as inorganic fibers, silicon carbide powder having an average particle size of 0.3 µm (54.2% by weight), which served as inorganic particles, silica sol ($SiO_2$ content in the sol: 30% by weight) (8.1% by weight), which served as an inorganic binder, carboxymethyl cellulose (2% by weight), which served as an organic binder and ammonium hydrogencarbonate (20% by weight), which served as a foaming agent, so as to be kneaded, was used; thus, a honeycomb filter was manufactured.

Example 13

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 30 parts by weight of water to 100 parts by weight of a mixture composed of ceramic fibers made from alumina silicate (shot content: 3%, fiber length: 0.1 to 100 mm) (28.98% by weight), which served as inorganic fibers, silica sol ($SiO_2$ content in the sol: 30% by weight) (41.02% by weight), which served as an inorganic binder, and alumina balloons (30% by weight), which served as balloons, so as to be kneaded, was used; thus, a honeycomb filter was manufactured.

Example 14

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 35 parts by weight of water to 100 parts by weight of a mixture composed of ceramic fibers made from alumina silicate (shot content: 3%, fiber length: 0.1 to 100 mm) (21% by weight), which served as inorganic fibers, silica sol ($SiO_2$ content in the sol: 30% by weight) (29.8% by weight), which served as an inorganic binder, and an acrylic resin (49.2% by weight), which served as resin, so as to be kneaded, was used; thus, a honeycomb filter was manufactured.

Example 15

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 50 parts by weight of water to 100 parts by weight of a mixture composed of ceramic fibers made from alumina silicate (shot content: 3%, fiber length: 0.1 to 100 mm) (25% by weight), which served as inorganic fibers, silica sol ($SiO_2$ content in the sol: 30% by weight) (35% by weight), which served as an inorganic binder and ammonium hydrogencarbonate (40% by weight), which served as a foaming agent, so as to be kneaded, was used; thus, a honeycomb filter was manufactured.

Example 16

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 20 parts by weight of water to 100 parts by weight of a mixture composed of silica sol (SiO$_2$ content in the sol: 30% by weight) (59.2% by weight), which served as an inorganic binder, silicon carbide powder having an average particle size of 0.3 μm (20.8% by weight), which served as inorganic particles, and alumina balloons (20% by weight), which served as balloons, so as to be kneaded, was used; thus, a honeycomb filter was manufactured.

Example 17

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 20 parts by weight of water to 100 parts by weight of a mixture composed of silica sol (SiO$_2$ content in the sol: 30% by weight) (59.2% by weight), which served as an inorganic binder, silicon carbide powder having an average particle size of 0.3 μm (20.8% by weight), which served as inorganic particles, and an acrylic resin (20% by weight), which served as resin, so as to be kneaded, was used; thus, a honeycomb filter was manufactured.

Example 18

(1) The same processes as those of (1) of Example 10 were carried out so that a porous ceramic member was produced.

(2) The same processes as those of Example 10 were carried out except that a heat-resistant adhesive paste (the blending ratio of which is shown in Table 4), which was prepared by adding 35 parts by weight of water to 100 parts by weight of a mixture composed of silica sol (SiO$_2$ content in the sol: 30% by weight) (51.8% by weight), which served as an inorganic binder, silicon carbide powder having an average particle size of 0.3 μm (18.2% by weight), which served as inorganic particles, and ammonium hydrogencarbonate (30% by weight), which served as a foaming agent, so as to be kneaded, was used; thus, a honeycomb filter was manufactured.

Comparative Example 3

(1) Powder of α-type silicon carbide having an average particle size of 10 μm (70% by weight) and powder of β-type silicon carbide having an average particle size of 0.5 μm (30% by weight) were wet-mixed, and to 100 parts by weight of the resulting mixture were added and kneaded 15 parts by weight of an organic binder (methyl cellulose), 20 parts by weight of water and 30 parts by weight of acrylic resin to obtain a kneaded matter. Next, after a slight amount of a plasticizer and a lubricant had been added to the kneaded matter and this had been further kneaded, the resulting kneaded matter was extrusion-formed so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 33 mm×33 mm×300 mm, the number of through holes of 31 pcs/cm$^2$, a thickness of the partition wall of 0.3 mm, a porosity of 60% and an average pore diameter of 20 μm.

(2) The same processes as those of Example 1 were carried out except that a heat-resistant adhesive paste (the blending ratio of which is shown in Table 4), which was prepared by adding 20 parts by weight of water to 100 parts by weight of a mixture composed of ceramic fibers made from alumina silicate (shot content: 3%, fiber length: 0.1 to 100 mm) (11.3% by weight), which served as inorganic fibers, silicon carbide powder having an average particle size of 0.3 μm (51% by weight), which served as inorganic particles, silica sol (SiO$_2$ content in the sol: 30% by weight) (34.8% by weight), which served as an inorganic binder, and carboxymethyl cellulose (2.9% by weight), which served as an organic binder, so as to be kneaded, was used, and that the porous ceramic member manufactured in the above-mentioned (1) was used; thus, a honeycomb filter was manufactured.

Comparative Example 4

(1) The same processes as those of (1) of Comparative Example 3 were carried out so that a porous ceramic member was produced.

(2) The same processes as those of Example 1 were carried out except that a heat-resistant adhesive paste (the blending ratio of which is shown in Table 4), which was prepared by adding 20 parts by weight of water to 100 parts by weight of a mixture composed of ceramic fibers made from alumina silicate (shot content: 3%, fiber length: 0.1 to 100 mm) (41.4% by weight), which served as inorganic fibers, and silica sol (SiO$_2$ content in the sol: 30% by weight) (58.6% by weight), which served as an inorganic binder, so as to be kneaded, was used, and that the porous ceramic member manufactured in the above-mentioned (1) was used; thus, a honeycomb filter was manufactured.

Comparative Example 5

(1) The same processes as those of (1) of Comparative Example 3 were carried out so that a porous ceramic member was produced.

(2) The same processes as those of Example 1 were carried out except that a heat-resistant adhesive paste (the blending ratio of which is shown in Table 4), which was prepared by adding 20 parts by weight of water to 100 parts by weight of a mixture composed of silicon carbide powder having an average particle size of 0.3 μm (26% by weight), which served as inorganic particles, and silica sol (SiO$_2$ content in the sol: 30% by weight) (74% by weight), which served as an inorganic binder, so as to be kneaded, was used, and that the porous ceramic member manufactured in the above-mentioned (1) was used; thus, a honeycomb filter was manufactured.

Reference Example 3

(1) The same processes as those of (1) of Example 10 were carried out so that a porous ceramic member was produced.

(2) The same processes as those of Example 1 were carried out except that a heat-resistant adhesive paste (the blending ratio of which is shown in Table 4), which was prepared by adding 20 parts by weight of water to 100 parts by weight of a mixture composed of ceramic fibers made from alumina silicate (shot content: 3%, fiber length: 0.1 to 100 mm) (11.3% by weight), silicon carbide powder having an average particle size of 0.3 μm (51% by weight), which served as inorganic particles, silica sol (SiO$_2$ content in the sol: 30% by weight) (34.8% by weight), which served as an inorganic binder, and carboxymethyl cellulose (2.9% by weight), which served as an organic binder, so as to be kneaded, was used, and that the porous ceramic member manufactured in the above-mentioned (1) was used; thus, a honeycomb filter was manufactured.

Reference Example 4

(1) The same processes as those of (1) of Example 10 were carried out so that a porous ceramic member was produced.

(2) The same processes as those of Example 1 were carried out except that a heat-resistant adhesive paste (the blending ratio of which is shown in Table 4), which was prepared by adding 20 parts by weight of water to 100 parts by weight of a mixture composed of ceramic fibers made from alumina silicate (shot content: 3%, fiber length: 0.1 to 100 mm) (41.4% by weight), which served as inorganic fibers, and silica sol ($SiO_2$ content in the sol: 30% by weight) (58.6% by weight), which served as an inorganic binder, so as to be kneaded, was used, and that the porous ceramic member manufactured in the above-mentioned (1) was used; thus, a honeycomb filter was manufactured.

Reference Example 5

(1) The same processes as those of (1) of Example 10 were carried out so that a porous ceramic member was produced.

(2) The same processes as those of Example 1 were carried out except that a heat-resistant adhesive paste (the blending ratio of which is shown in Table 4), which was prepared by adding 20 parts by weight of water to 100 parts by weight of a mixture composed of silicon carbide powder having an average particle size of 0.3 μm (26% by weight), which served as inorganic particles, silica sol ($SiO_2$ content in the sol: 30% by weight) (74% by weight), which served as an inorganic binder, so as to be kneaded, was used, and that the porous ceramic member manufactured in the above-mentioned (1) was used; thus, a honeycomb filter was manufactured.

With respect to the honeycomb filters relating to Examples 10 to 18, Comparative Examples 3 to 5 and Reference Examples 3 to 5, the thermal capacity ($C_F$) per unit volume of the porous ceramic member and the thermal capacity ($C_L$) per unit volume of the adhesive layer were measured at respective temperatures of 300° C., 400° C., 600° C., 750° C. and 900° C. (Table 5) and based upon these values, the ratio of the thermal capacity per unit volume of the adhesive layer to the thermal capacity per unit volume of the porous ceramic member ($C_L/C_F$)×100 was calculated (Table 6).

Moreover, each of the honeycomb filters relating to Examples 10 to 18, Comparative Examples 3 to 5 and Reference Examples 3 to 5 was placed in an exhaust gas passage of a diesel engine and thermocouples were inserted in nine portions with an interval of 30 mm in the length direction of the filter at each of the center portion (0 mm) and the peripheral portion (peripheral portion at 60 mm from the center) so that the temperature can be measured. Then, the diesel engine was operated for regeneration in a post-injection system, and after a lapse of 4 minutes, the average temperature of the nine portions in the center and the average temperature of the nine portions in the circumferential portion in the radial direction of the filter were measured thus the value of a temperature rise in the honeycomb filter was found. The results are shown in Table 6.

Here, the post-injection system refers to a method in which, before the cylinder is switched to a compression stroke after the start of a cylinder expansion stroke by a main injection of fuel, a slight amount of fuel is injected. In the diesel engine using this system, it is possible to raise the temperature of the exhaust gas to 450° C. or more.

Further, with respect to the diesel engine in which each of the honeycomb filters relating to Examples 10 to 18, Comparative Examples 3 to 5 and Reference Examples 3 to 5 was placed, after the engine had been continuously driven 10 cycles in the above-mentioned post-injection system, the generation of cracks was visually confirmed. Moreover, in the same manner, after the engine had been continuously driven 100 cycles, the generation of cracks was visually confirmed.

The results are shown in Table 6.

TABLE 4

| | Adhesive | | | | | | |
|---|---|---|---|---|---|---|---|
| | Ceramic fiber | Silica sol | Silicon carbide powder | Carboxymethyl cellulose | Material that is capable of forming independent pores | | Water (Parts by |
| | (Weight %) | (Weight %) | (Weight %) | (Weight %) | Kinds | (Weight %) | weight) |
| Example 10 | 6.78 | 20.88 | 30.6 | 1.74 | Alumina balloon | 40 | 40 |
| Example 11 | 13.7 | 7.1 | 47.4 | 1.8 | Acrylic resin | 30 | 35 |
| Example 12 | 15.7 | 8.1 | 54.2 | 2 | Ammonium hydrogencarbonate | 20 | 25 |
| Example 13 | 28.98 | 41.02 | — | — | Alumina balloon | 30 | 30 |
| Example 14 | 21 | 29.8 | — | — | Acrylic resin | 49.2 | 35 |
| Example 15 | 25 | 35 | — | — | Ammonium hydrogencarbonate | 40 | 50 |
| Example 16 | — | 59.2 | 20.8 | — | Alumina balloon | 20 | 20 |
| Example 17 | — | 59.2 | 20.8 | — | Acrylic resin | 20 | 20 |
| Example 18 | — | 51.8 | 18.2 | — | Ammonium hydrogencarbonate | 30 | 35 |
| Comparative Example 3 | 11.3 | 34.8 | 51 | 2.9 | — | — | 20 |
| Comparative Example 4 | 41.4 | 58.6 | — | — | — | — | 20 |
| Comparative Example 5 | — | 74 | 26 | — | — | — | 20 |
| Reference Example 3 | 11.3 | 34.8 | 51 | 2.9 | — | — | 20 |

TABLE 4-continued

| | Adhesive | | | | | | Water (Parts by weight) |
|---|---|---|---|---|---|---|---|
| | Ceramic fiber (Weight %) | Silica sol (Weight %) | Silicon carbide powder (Weight %) | Carboxymethyl cellulose (Weight %) | Material that is capable of forming independent pores | | |
| | | | | | Kinds | (Weight %) | |
| Reference Example 4 | 41.4 | 58.6 | — | — | — | — | 20 |
| Reference Example 5 | — | 74 | 26 | — | — | — | 20 |

TABLE 5

| | Thermal capacity $C_F$ (kj/(K·m³)) per unit volume of porous ceramic member | | | | | Thermal capacity $C_F$ (kj/(K·m³)) per unit volume of adhesive layer | | | | |
|---|---|---|---|---|---|---|---|---|---|---|
| | 300° C. | 400° C. | 600° C. | 750° C. | 900° C. | 300° C. | 400° C. | 600° C. | 750° C. | 900° C. |
| Example 10 | 821 | 1333 | 1412 | 1487 | 1511 | 320 | 570 | 600 | 620 | 652 |
| Example 11 | 821 | 1333 | 1412 | 1487 | 1511 | 529 | 719 | 754 | 813 | 861 |
| Example 12 | 821 | 1333 | 1412 | 1487 | 1511 | 535 | 749 | 765 | 820 | 870 |
| Example 13 | 821 | 1333 | 1412 | 1487 | 1511 | 310 | 565 | 580 | 600 | 642 |
| Example 14 | 821 | 1333 | 1412 | 1487 | 1511 | 550 | 779 | 795 | 845 | 910 |
| Example 15 | 821 | 1333 | 1412 | 1487 | 1511 | 620 | 1000 | 754 | 813 | 861 |
| Example 16 | 821 | 1333 | 1412 | 1487 | 1511 | 630 | 1104 | 1250 | 1240 | 1200 |
| Example 17 | 821 | 1333 | 1412 | 1487 | 1511 | 680 | 1130 | 1230 | 1320 | 1340 |
| Example 18 | 821 | 1333 | 1412 | 1487 | 1511 | 540 | 750 | 785 | 835 | 900 |
| Comparative Example 3 | 731 | 1160 | 1290 | 1320 | 1400 | 753 | 1230 | 1334 | 1380 | 1415 |
| Comparative Example 4 | 731 | 1160 | 1290 | 1320 | 1400 | 740 | 1200 | 1300 | 1340 | 1400 |
| Comparative Example 5 | 731 | 1160 | 1290 | 1320 | 1400 | 760 | 1260 | 1380 | 1400 | 1420 |
| Reference Example 3 | 821 | 1333 | 1412 | 1487 | 1511 | 753 | 1230 | 1334 | 1380 | 1415 |
| Reference Example 4 | 821 | 1333 | 1412 | 1487 | 1511 | 740 | 1200 | 1300 | 1340 | 1400 |
| Reference Example 5 | 821 | 1333 | 1412 | 1487 | 1511 | 760 | 1260 | 1380 | 1400 | 1420 |

TABLE 6

| | $(C_I)/C_F) \times 100$ (%) | | | | | | Temperature rise value (° C.) | Generation of cracks after continuous driving operation | |
|---|---|---|---|---|---|---|---|---|---|
| | 300° C. | 400° C. | 600° C. | 750° C. | 900° C. | Average | | 10 cycles | 100 cycles |
| Example 10 | 39.98 | 42.76 | 42.49 | 41.69 | 43.15 | 41.82 | 463 | No | No |
| Example 11 | 64.43 | 53.94 | 53.40 | 54.67 | 56.98 | 56.69 | 440 | No | No |
| Example 12 | 65.16 | 56.19 | 54.18 | 55.14 | 57.58 | 57.65 | 430 | No | No |
| Example 13 | 37.76 | 42.39 | 41.08 | 40.35 | 42.49 | 40.81 | 460 | No | No |
| Example 14 | 66.99 | 58.44 | 56.30 | 46.83 | 60.23 | 59.76 | 443 | No | No |
| Example 15 | 75.52 | 75.02 | 53.40 | 54.67 | 56.98 | 63.12 | 442 | No | No |
| Example 16 | 76.74 | 82.82 | 88.53 | 83.39 | 79.42 | 82.18 | 432 | No | No |
| Example 17 | 82.83 | 84.77 | 87.11 | 88.77 | 88.68 | 86.43 | 422 | No | No |
| Example 18 | 65.77 | 56.26 | 55.59 | 56.15 | 59.56 | 58.67 | 442 | No | No |
| Comparative Example 3 | 103 | 106 | 103 | 104 | 101 | 103 | 400 | Yes | — |
| Comparative Example 4 | 101 | 103 | 100 | 101 | 100 | 101 | 405 | Yes | — |
| Comparative Example 5 | 103 | 108 | 106 | 106 | 101 | 105 | 400 | Yes | — |
| Reference Example 3 | 91.72 | 92.27 | 94.48 | 92.80 | 93.65 | 92.98 | 395 | No | Yes |
| Reference Example 4 | 90.13 | 90.02 | 92.07 | 90.11 | 92.65 | 91.00 | 400 | No | Yes |
| Reference Example 5 | 92.57 | 94.52 | 97.73 | 94.15 | 93.98 | 94.59 | 390 | No | Yes |

As shown in Table 6, the value of $(C_L/C_F) \times 100$ of each of honeycomb filters relating to Examples 10 to 18 is less than 100% (less than 90%), and the thermal capacity per unit volume of the adhesive layer is lower than the thermal capacity per unit volume of the porous ceramic member. In contrast, the value of $(C_L/C_F) \times 100$ of each of honeycomb filters relating to Comparative Examples 3 to 5 exceeds 100% (less than 90%), and the value of $(C_L/C_F) \times 100$ of each of honeycomb filters relating to Reference Examples 3 to 5 is in a range from 90% to 100%; thus, the thermal capacity per unit volume of the adhesive layer has a value close to the thermal capacity per unit volume of the porous ceramic member.

Moreover, the value of raised temperature of each of honeycomb filters relating to Examples 10 to 18 exceeded 420° C., and even after driving the diesel engine continuously 100 cycles, no generation of cracks was confirmed.

In contrast, the value of raised temperature of each of honeycomb filters related to Comparative Examples 3 to 5 was in a range from 400 to 405° C., and this was lower than that of each of honeycomb filters relating to Examples 10 to 18. Here, in each of honeycomb filters relating to Comparative Examples 3 to 5, after driving the diesel engine continuously 100 cycles, generation of cracks was confirmed in the porous ceramic member.

Moreover, the value of raised temperature of each of honeycomb filters relating to Reference Examples 3 to 5 was in a range from 390 to 400° C., and this was lower than that of each of honeycomb filters relating to Examples 10 to 18. Here, in each of honeycomb filters relating to Reference Examples 3 to 5, after driving the diesel engine continuously 10 cycles, no generation of cracks was confirmed; however, after driving the diesel engine continuously 100 cycles, generation of cracks was confirmed in the adhesive layer.

Example 19

(1) Powder of α-type silicon carbide having an average particle size of 10 μm (70% by weight) and powder of β-type silicon carbide having an average particle size of 0.5 μm (30% by weight) were wet-mixed, and to 100 parts by weight of the resulting mixture were added and kneaded 15 parts by weight of an organic binder (methyl cellulose), 10 parts by weight of water and 5 parts by weight of acrylic resin to obtain a kneaded matter. Next, after a slight amount of a plasticizer and a lubricant had been added to the kneaded matter and this had been further kneaded, the resulting kneaded matter was extrusion-formed so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 35 mm×35 mm×300 mm, the number of through holes of 31 pcs/cm², a thickness of the partition wall of 0.3 mm, a porosity of 50% and an average pore-diameter of 20 μm.

Next, a heat-resistant adhesive paste, which was prepared by adding 43 parts by weight of water to 100 parts by weight of a mixture composed of 37% by weight of alumina fibers having a fiber length of 0.2 mm, 49.7% by weight of silicon carbide particles having an average particle size of 0.6 μm, 12.3% by weight of silica sol and 1.0% by weight of carboxymethyl cellulose, was used so that, by carrying out the processes as explained by reference to FIG. 3, sixteen of the porous ceramic members were combined with one another to form a rectangular-column-shaped ceramic laminated body as shown in FIG. 4(a).

(2) To 100 parts by weight of a mixture prepared by mixing ceramic fibers made from alumina silicate (shot content: 3%, fiber length: 0.1 to 100 mm) (6.78% by weight), which served as inorganic fibers, silicon carbide powder having an average particle size of 0.3 μm (30.6% by weight), which served as inorganic particles, silica sol ($SiO_2$ content in the sol: 30% by weight) (20.88% by weight), which served as an inorganic binder, carboxymethyl cellulose, (1.74% by weight), which served as an organic binder, and alumina balloons (40% by weight), which served as balloons, was added 40 parts by weight of water, and this was mixed and kneaded to prepare a coating material.

Next, a cylinder-shaped ceramic block having a diameter of 130 mm was formed by cutting the rectangular-column-shaped ceramic laminated body by the use of a diamond cutter. Further, after a coating material layer having a thickness of 1.0 mm had been formed on the circumferential portion of the ceramic block by using the above-mentioned coating material, this was dried at 120° C. so that a cylinder-shaped honeycomb filter for purifying exhaust gases as shown in FIG. 1 was manufactured.

Example 20

(1) The same processes as (1) of Example 19 were carried out so that a rectangular-column-shaped ceramic laminated body was formed.

(2) The same processes as those of Example 19 were carried out except that a coating material, prepared by adding 35 parts by weight of water to 100 parts by weight of a mixture composed of ceramic fibers made from alumina silicate (shot content: 3%, fiber length: 0.1 to 100 mm) (13.7% by weight), which served as inorganic fibers, silicon carbide powder having an average particle size of 0.3 μm (47.4% by weight), which served as inorganic particles, silica sol ($SiO_2$ content in the sol: 30% by weight) (7.1% by weight), which served as an inorganic binder, carboxymethyl cellulose (1.8% by weight), which served as an organic binder, and acrylic resin (30% by weight), which served as resin, so as to be kneaded, was used; thus, a honeycomb filter for purifying exhaust gases was manufactured.

Example 21

(1) The same processes as (1) of Example 19 were carried out so that a rectangular-column-shaped ceramic laminated body was formed.

(2) The same processes as those of Example 19 were carried out except that a coating material, prepared by adding 25 parts by weight of water to 100 parts by weight of a mixture composed of ceramic fibers made from alumina silicate (shot content: 3%, fiber length: 0.1 to 100 mm) (15.7% by weight), which served as inorganic fibers, silicon carbide powder having an average particle size of 0.3 μm (54.2% by weight), which served as inorganic particles, silica sol ($SiO_2$ content in the sol: 30% by weight) (8.1% by weight), which served as an inorganic binder, carboxymethyl cellulose (2% by weight), which served as an organic binder, and ammonium hydrogencarbonate (20% by weight), which served as a foaming agent, so as to be kneaded, was used; thus, a honeycomb filter for purifying exhaust gases was manufactured.

Example 22

(1) The same processes as (1) of Example 19 were carried out so that a rectangular-column-shaped ceramic laminated body was formed.

(2) The same processes as those of Example 19 were carried out except that a coating material, prepared by adding 30 parts by weight of water to 100 parts by weight of a mixture composed of ceramic fibers made from alumina silicate (shot content: 3%, fiber length: 0.1 to 100 mm) (28.98% by weight), which served as inorganic fibers, silica sol ($SiO_2$ content in the sol: 30% by weight) (41.02% by weight), which served as an inorganic binder, and alumina balloons (30% by weight), which served as balloons, and ammonium hydrogencarbonate (20% by weight), which served as a foaming agent, so as to be kneaded, was used; thus, a honeycomb filter for purifying exhaust gases was manufactured.

Example 23

(1) The same processes as (1) of Example 19 were carried out so that a rectangular-column-shaped ceramic laminated body was formed.

(2) The same processes as those of Example 19 were carried out except that a coating material, prepared by adding 35 parts by weight of water to 100 parts by weight of a mixture composed of ceramic fibers made from alumina silicate (shot content: 3%, fiber length: 0.1 to 100 mm) (21% by weight), which served as inorganic fibers, silica sol ($SiO_2$ content in the sol: 30% by weight) (29.8% by weight), which served as an inorganic binder, and acrylic resin (49.2% by weight), which served as resin, so as to be kneaded, was used; thus, a honeycomb filter for purifying exhaust gases was manufactured.

Example 24

(1) The same processes as (1) of Example 19 were carried out so that a rectangular-column-shaped ceramic laminated body was formed.

(2) The same processes as those of Example 19 were carried out except that a coating material, prepared by adding 50 parts by weight of water to 100 parts by weight of a mixture composed of ceramic fibers made from alumina silicate (shot content: 3%, fiber length: 0.1 to 100 mm) (25% by weight), which served as inorganic fibers, silica sol ($SiO_2$ content in the sol: 30% by weight) (35% by weight), which served as an inorganic binder, and ammonium hydrogencarbonate (40% by weight), which served as a foaming agent, so as to be kneaded, was used; thus, a honeycomb filter for purifying exhaust gases was manufactured.

Example 25

(1) The same processes as (1) of Example 19 were carried out so that a rectangular-column-shaped ceramic laminated body was formed.

(2) The same processes as those of Example 19 were carried out except that a coating material, prepared by adding 20 parts by weight of water to 100 parts by weight of a mixture composed of silica sol ($SiO_2$ content in the sol: 30% by weight) (59.2% by weight), which served as an inorganic binder, silicon carbide powder having an average particle size of 0.3 μm (20.8% by weight), which served as inorganic particles, and alumina balloons (20% by weight), which served as balloons, so as to be kneaded, was used; thus, a honeycomb filter for purifying exhaust gases was manufactured.

Example 26

(1) The same processes as (1) of Example 19 were carried out so that a rectangular-column-shaped ceramic laminated body was formed.

(2) The same processes as those of Example 19 were carried out except that a coating material, prepared by adding 20 parts by weight of water to 100 parts by weight of a mixture composed of silica sol ($SiO_2$ content in the sol: 30% by weight) (59.2% by weight), which served as an inorganic binder, silicon carbide powder having an average particle size of 0.3 μm (20.8% by weight), which served as inorganic particles, and acrylic resin (20% by weight), which served as resin, so as to be kneaded, was used; thus, a honeycomb filter for purifying exhaust gases was manufactured.

Example 27

(1) The same processes as (1) of Example 19 were carried out so that a rectangular-column-shaped ceramic laminated body was formed.

(2) The same processes as those of Example 19 were carried out except that a coating material, prepared by adding 35 parts by weight of water to 100 parts by weight of a mixture composed of silica sol ($SiO_2$ content in the sol: 30% by weight) (51.8% by weight), which served as an inorganic binder, silicon carbide powder having an average particle size of 0.3 μm (18.2% by weight), which served as inorganic particles, and ammonium hydrogencarbonate (30% by weight), which served as a foaming agent, so as to be kneaded, was used; thus, a honeycomb filter for purifying exhaust gases was manufactured.

Example 28

(1) The same processes as (1) of Example 19 were carried out so that a rectangular-column-shaped ceramic laminated body was formed.

(2) To 100 parts by weight of a mixture prepared by mixing ceramic fibers made from alumina silicate (shot content: 3%, fiber length: 0.1 to 100 mm) (6.78% by weight), which served as inorganic fibers, silicon carbide powder having an average particle size of 0.3 μm (30.6% by weight), which served as inorganic particles, silica sol ($SiO_2$ content in the sol: 30% by weight) (20.88% by weight), which served as an inorganic binder, carboxymethyl cellulose (1.74% by weight), which served as an organic binder, and alumina balloons (40% by weight), which served as balloons, was added 40 parts by weight of water, and this was mixed and kneaded to prepare a coating material.

Next, the above-mentioned coating material is filled into the ceramic laminated body by using a coating-material filling device as shown in FIG. 5, and this ceramic laminated body was dried at 120° C. By cutting this by the use of a diamond cutter, a cylinder-shaped honeycomb filter for purifying exhaust gases having a diameter of 132 mm as shown in FIG. 5 was manufactured.

Example 29

(1) The same processes as (1) of Example 19 were carried out so that a rectangular-column-shaped ceramic laminated body was formed.

(2) The same processes as those of Example 28 were carried out except that a coating material, prepared by adding 39 parts by weight of water to 100 parts by weight of a mixture composed of ceramic fibers made from alumina silicate (shot content: 3%, fiber length: 0.1 to 100 mm) (23.3% by weight), which served as inorganic fibers, silicon carbide powder having an average particle size of 0.3 μm (30.2% by weight), which served as inorganic particles, silica sol ($SiO_2$ content in the sol: 30% by weight) (7.0% by weight), which served as an inorganic binder, carboxymethyl cellulose (0.5% by weight), and which served as an organic binder, so as to be kneaded, was used; thus, a honeycomb filter for purifying exhaust gases was manufactured.

Comparative Example 6

(1) Powder of α-type silicon carbide having an average particle size of 10 μm (70% by weight) and powder of β-type silicon carbide having an average particle size of 0.5 μm (30% by weight) were wet-mixed, and to 100 parts by weight of the resulting mixture were added and kneaded 15 parts by weight of an organic binder (methyl cellulose), 20 parts by weight of water and 30 parts by weight of acrylic resin to obtain a kneaded matter. Next, after a slight amount of a plasticizer and a lubricant had been added to the kneaded matter and this had been further kneaded, the resulting kneaded matter was extrusion-formed so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 2200° C. in a normal-pressure argon atmosphere for 3 hours to manufacture a porous ceramic member as shown in FIG. 2, which was made of a silicon carbide sintered body, and had a size of 33 mm×33 mm×300 μm, the number of through holes of 31 pcs/cm$^2$, a thickness of the partition wall of 0.3 mm, a porosity of 60% and an average pore diameter of 20 μm.

(2) The same processes as those of Example 1 were carried out except that a coating material, prepared by adding 20 parts by weight of water to 100 parts by weight of a mixture composed of ceramic fibers made from alumina silicate (shot content: 3%, fiber length: 0.1 to 100 mm) (11.3% by weight), which served as inorganic fibers, silicon carbide powder having an average particle size of 0.3 μm (51% by weight), which served as inorganic particles, silica sol (SiO$_2$ content in the sol: 30% by weight) (34.8% by weight), which served as an inorganic binder, and carboxymethyl cellulose (2.9% by weight), which served as an organic binder, so as to be kneaded, was used together with the porous ceramic member manufactured in the above-mentioned (1); thus, a honeycomb filter was manufactured.

Comparative Example 7

(1) The same processes as (1) of Comparative Example 6 were carried out so that a porous ceramic member was manufactured.

(2) The same processes as those of Example 1 were carried out except that a coating material, prepared by adding 20 parts by weight of water to 100 parts by weight of a mixture composed of ceramic fibers made from alumina silicate (shot content: 3%, fiber length: 0.1 to 100 mm) (41.4% by weight), which served as inorganic fibers, and silica sol (SiO$_2$ content in the sol: 30% by weight) (58.6% by weight), which served as an inorganic binder, so as to be kneaded, was used together with the porous ceramic member manufactured in the above-mentioned (1); thus, a honeycomb filter was manufactured.

Comparative Example 8

(1) The same processes as (1) of Comparative Example 6 were carried out so that a porous ceramic member was manufactured.

(2) The same processes as those of Example 1 were carried out except that a coating material, prepared by adding 20 parts by weight of water to 100 parts by weight of a mixture composed of silicon carbide powder having an average particle size of 0.3 μm (26% by weight), which served as inorganic particles, and silica sol (SiO$_2$ content in the sol: 30% by weight) (74% by weight), which served as an inorganic binder, so as to be kneaded, was used together with the porous ceramic member manufactured in the above-mentioned (1); thus, a honeycomb filter was manufactured.

Reference Example 6

(1) The same processes as (1) of Example 19 were carried out so that a rectangular-column-shaped ceramic laminated body was manufactured.

(2) The same processes as those of Example 19 were carried out except that a coating material, prepared by adding 20 parts by weight of water to 100 parts by weight of a mixture composed of ceramic fibers made from alumina silicate (shot content: 3%, fiber length: 0.1 to 100 mm) (11.3% by weight), which served as inorganic fibers, silicon carbide powder having an average particle size of 0.3 μm (51% by weight), which served as inorganic particles, silica sol (SiO$_2$ content in the sol: 30% by weight) (34.8% by weight), which served as an inorganic binder, and carboxymethyl cellulose (2.9% by weight), which served as an organic binder, so as to be kneaded, was used; thus, a honeycomb filter for purifying exhaust gases was manufactured.

Reference Example 7

(1) The same processes as (1) of Example 19 were carried out so that a rectangular-column-shaped ceramic laminated body was manufactured.

(2) The same processes as those of Example 19 were carried out except that a coating material, prepared by adding 20 parts by weight of water to 100 parts by weight of a mixture composed of ceramic fibers made from alumina silicate (shot content: 3%, fiber length: 0.1 to 100 mm) (41.4% by weight), which served as inorganic fibers, and silica sol (SiO$_2$ content in the sol: 30% by weight) (58.6% by weight), which served as an inorganic binder, so as to be kneaded, was used; thus, a honeycomb filter for purifying exhaust gases was manufactured.

Reference Example 8

(1) The same processes as (1) of Example 19 were carried out so that a rectangular-column-shaped ceramic laminated body was manufactured.

(2) The same processes as those of Example 19 were carried out except that a coating material, prepared by adding 20 parts by weight of water to 100 parts by weight of a mixture composed of silicon carbide powder having an average particle size of 0.3 μm (26% by weight), which served as inorganic particles, and silica sol (SiO$_2$ content in the sol: 30% by weight) (74% by weight), which served as an inorganic binder, so as to be kneaded, was used; thus, a honeycomb filter for purifying exhaust gases was manufactured.

With respect to the honeycomb filters relating to Examples 19 to 28, Comparative Examples 6 to 8 and Reference Examples 6 to 8, the thermal capacity ($C_F$) per unit volume of the porous ceramic member and the thermal capacity ($C_M$) per unit volume of the coating material or filled layer were measured at respective temperatures of 300° C., 400° C., 600° C., 750° C. and 900° C. (Table 8) and based upon these values, the ratio of the thermal capacity per unit volume of the coating material layer or filled layer to the thermal capacity per unit volume of the porous ceramic member $(C_M/C_F) \times 100$ was calculated (Table 9).

Moreover, each of the honeycomb filters relating to Examples 19 to 28, Comparative Examples 6 to 8 and Reference Examples 6 to 8 was placed in an exhaust-gas passage of a diesel engine, and thermocouples were inserted in nine portions with an interval of 30 mm in the length direction of the filter at each of the center portion (0 mm) and the peripheral portion (peripheral portion at 60 mm from the center) so that the temperature can be measured. Then, the diesel engine was operated for regeneration in a post-injection system, and after a lapse of 4 minutes, the average temperature of the nine portions in the center and the average temperature of the nine portions in the circumferential portion in the radial direction of the filter were measured so that the value of a temperature rise in the honeycomb filter was found. The results are shown in Table 9.

Further, with respect to the diesel engine in which each of the honeycomb filters relating to Examples' 19 to 28, Comparative Examples 6 to 8 and Reference Examples 6 to 8 was placed, after the engine had been continuously driven 10 cycles in the above-mentioned post-injection system, the generation of cracks was visually confirmed. Moreover, after the engine had been continuously driven 100 cycles, the generation of cracks was visually confirmed. The results are shown in Table 9.

TABLE 7

| | Coating material | | | | | | |
|---|---|---|---|---|---|---|---|
| | Ceramic fiber | Silica sol | Silicon carbide powder | Carboxymethyl cellulose | Material that is capable of forming independent pores | | Water (Parts by |
| | (Weight %) | (Weight %) | (Weight %) | (Weight %) | Kinds | (Weight %) | weight) |
| Example 19 | 6.78 | 20.88 | 30.6 | 1.74 | Alumina balloon | 40 | 40 |
| Example 20 | 13.7 | 7.1 | 47.4 | 1.8 | Acrylic resin | 30 | 35 |
| Example 21 | 15.7 | 8.1 | 54.2 | 2 | Ammonium hydrogencarbonate | 20 | 25 |
| Example 22 | 28.98 | 41.02 | — | — | Alumina balloon | 30 | 30 |
| Example 23 | 21 | 29.8 | — | — | Acrylic resin | 49.2 | 35 |
| Example 24 | 25 | 35 | — | — | Ammonium hydrogencarbonate | 40 | 50 |
| Example 25 | — | 59.2 | 20.8 | — | Alumina balloon | 20 | 20 |
| Example 26 | — | 59.2 | 20.8 | — | Acrylic resin | 20 | 20 |
| Example 27 | — | 51.8 | 18.2 | — | Ammonium hydrogencarbonate | 30 | 35 |
| Example 28 | 6.78 | 20.88 | 30.6 | 1.74 | Alumina balloon | 40 | 40 |
| Comparative Example 6 | 11.3 | 34.8 | 51 | 2.9 | — | — | 20 |
| Comparative Example 7 | 41.4 | 58.6 | — | — | — | — | 20 |
| Comparative Example 8 | — | 74 | 26 | — | — | — | 20 |
| Reference Example 4 | 11.3 | 34.8 | 51 | 2.9 | — | — | 20 |
| Reference Example 5 | 41.4 | 58.6 | — | — | — | — | 20 |
| Reference Example 6 | — | 74 | 26 | — | — | — | 20 |

TABLE 8

| | Thermal capacity $C_F$ (kj/(K·m³)) per unit volume of porous ceramic member | | | | | Thermal capacity $C_F$ (kj/(K·m³)) per unit volume of coating material layer or filled layer | | | | |
|---|---|---|---|---|---|---|---|---|---|---|
| | 300° C. | 400° C. | 600° C. | 750° C. | 900° C. | 300° C. | 400° C. | 600° C. | 750° C. | 900° C. |
| Example 19 | 821 | 1333 | 1412 | 1487 | 1511 | 320 | 570 | 600 | 620 | 652 |
| Example 20 | 821 | 1333 | 1412 | 1487 | 1511 | 529 | 719 | 754 | 813 | 861 |
| Example 21 | 821 | 1333 | 1412 | 1487 | 1511 | 535 | 749 | 765 | 820 | 870 |
| Example 22 | 821 | 1333 | 1412 | 1487 | 1511 | 310 | 565 | 580 | 600 | 642 |
| Example 23 | 821 | 1333 | 1412 | 1487 | 1511 | 550 | 779 | 795 | 845 | 910 |
| Example 24 | 821 | 1333 | 1412 | 1487 | 1511 | 620 | 1000 | 754 | 813 | 861 |
| Example 25 | 821 | 1333 | 1412 | 1487 | 1511 | 630 | 1104 | 1250 | 1240 | 1200 |
| Example 26 | 821 | 1333 | 1412 | 1487 | 1511 | 680 | 1130 | 1230 | 1320 | 1340 |
| Example 27 | 821 | 1333 | 1412 | 1487 | 1511 | 540 | 750 | 785 | 835 | 900 |
| Example 28 | 821 | 1333 | 1412 | 1487 | 1511 | 320 | 570 | 600 | 620 | 652 |
| Comparative Example 6 | 731 | 1160 | 1290 | 1320 | 1400 | 753 | 1230 | 1334 | 1380 | 1415 |
| Comparative Example 7 | 731 | 1160 | 1290 | 1320 | 1400 | 740 | 1200 | 1300 | 1340 | 1400 |
| Comparative Example 8 | 731 | 1160 | 1290 | 1320 | 1400 | 760 | 1260 | 1380 | 1400 | 1420 |

TABLE 8-continued

| | Thermal capacity $C_F$ (kj/(K·m³)) per unit volume of porous ceramic member | | | | | Thermal capacity $C_F$ (kj/(K·m³)) per unit volume of coating material layer or filled layer | | | | |
|---|---|---|---|---|---|---|---|---|---|---|
| | 300° C. | 400° C. | 600° C. | 750° C. | 900° C. | 300° C. | 400° C. | 600° C. | 750° C. | 900° C. |
| Reference Example 4 | 821 | 1333 | 1412 | 1487 | 1511 | 753 | 1230 | 1334 | 1380 | 1415 |
| Reference Example 5 | 821 | 1333 | 1412 | 1487 | 1511 | 740 | 1200 | 1300 | 1340 | 1400 |
| Reference Example 6 | 821 | 1333 | 1412 | 1487 | 1511 | 760 | 1260 | 1380 | 1400 | 1420 |

TABLE 9

| | $(C_I)/(C_F) \times 100$ (%) | | | | | | Temperature rise value (° C.) | Generation of cracks after continuous driving operation | |
|---|---|---|---|---|---|---|---|---|---|
| | 300° C. | 400° C. | 600° C. | 750° C. | 900° C. | Average | | 10 cycles | 100 cycles |
| Example 19 | 39.98 | 42.76 | 42.49 | 41.69 | 43.15 | 41.82 | 470 | No | No |
| Example 20 | 64.43 | 53.94 | 53.40 | 54.67 | 56.98 | 56.69 | 450 | No | No |
| Example 21 | 65.16 | 56.19 | 54.18 | 55.14 | 57.58 | 57.65 | 440 | No | No |
| Example 22 | 37.76 | 42.39 | 41.08 | 40.35 | 42.49 | 40.81 | 470 | No | No |
| Example 23 | 66.99 | 58.44 | 56.30 | 46.83 | 60.23 | 59.76 | 455 | No | No |
| Example 24 | 75.52 | 75.02 | 53.40 | 54.67 | 56.98 | 63.12 | 450 | No | No |
| Example 25 | 76.74 | 82.82 | 88.53 | 83.39 | 79.42 | 82.18 | 440 | No | No |
| Example 26 | 82.83 | 84.77 | 87.11 | 88.77 | 88.68 | 86.43 | 430 | No | No |
| Example 27 | 65.77 | 56.26 | 55.59 | 56.15 | 59.56 | 58.67 | 450 | No | No |
| Example 28 | 39.98 | 42.76 | 42.49 | 41.69 | 43.15 | 41.82 | 470 | No | No |
| Comparative Example 6 | 103 | 106 | 103 | 104 | 101 | 103 | 400 | Yes | — |
| Comparative Example 7 | 101 | 103 | 100 | 101 | 100 | 101 | 405 | Yes | — |
| Comparative Example 8 | 103 | 108 | 106 | 106 | 101 | 105 | 400 | Yes | — |
| Reference Example 6 | 91.72 | 92.27 | 94.48 | 92.80 | 93.65 | 92.98 | 395 | No | Yes |
| Reference Example 7 | 90.13 | 90.02 | 92.07 | 90.11 | 92.65 | 91.00 | 400 | No | Yes |
| Reference Example 8 | 92.57 | 94.52 | 97.73 | 94.15 | 93.98 | 94.59 | 390 | No | Yes |

As shown in Table 9, the value of $(C_M/C_F) \times 100$ of each of honeycomb filters relating to Examples 19 to 28 is less than 100% (less than 90%), and the thermal capacity per unit volume of the coating material layer or filled layer is lower than the thermal capacity per unit volume of the porous ceramic member. In contrast, the value of $(C_M/C_F) \times 100$ of each of honeycomb filters related to Comparative Examples 6 to 8 exceeds 100%, and the value of $(C_M/C_F) \times 100$ of each of honeycomb filters related to Reference Examples 6 to 8 is in a range from 90% to 100%; thus, the thermal capacity per unit volume of the coating material layer has a value close to the thermal capacity per unit volume of the porous ceramic member.

Moreover, as shown in Table 9, with respect to the honeycomb filters for purifying exhaust gases relating to Examples 19 to 28, the value of raised temperature of each of the honeycomb filters after driving the diesel engine in the post-injection system for four minutes exceeded 430° C., which indicated superior temperature-raising characteristics. Furthermore, even after driving the diesel engine continuously 100 cycles in the post-injection system, no generation of cracks was confirmed.

In contrast, after driving the diesel engine in the post-injection system for 4 minutes, the value of raised temperature of each of honeycomb filters related to Comparative Examples 6 to 8 was in a range from 400 to 405° C., and this was lower than that of each of honeycomb filters relating to Examples 19 to 28. Here, in each of honeycomb filters related to Comparative Examples 6 to 8, after driving the diesel engine continuously 10 cycles in the post-injection system, generation of cracks was confirmed in the porous ceramic member in each of the honeycomb filters for purifying exhaust gases related to Comparative Examples 6 to 8.

Moreover, after driving the diesel engine in the post-injection system for 4 minutes, the value of raised temperature of each of honeycomb filters related to Reference Examples 6 to 8 was in a range from 390 to 400° C., and this value was lower than that of each of honeycomb filters relating to Examples 19 to 28. Here, in each of honeycomb filters related to Reference Examples 6 to 8, after driving the diesel engine continuously 10 cycles in the post-injection system, no generation of cracks was confirmed; however, after driving the diesel engine continuously 100 cycles, generation of cracks was confirmed in the coating material layer.

With respect to the honeycomb filters for purifying exhaust gases relating to Examples 28 and 29, although these had no coating material layer, these were allowed to effectively function as honeycomb filters for purifying exhaust gases without causing any leak of exhaust gas from the circumferential face, when placed in the exhaust-gas passage of an internal combustion engine.

Moreover, with respect to the honeycomb filters for purifying exhaust gases relating to Examples 28 and 29, no defects such as chipping occurred upon cutting the rectangular-column-shaped ceramic laminated body into a cylinder-shaped member by using a diamond cutter. The external dimension was also set with high precision without deviations from the cylinder shape. In contrast, with respect to the honeycomb filter for purifying exhaust gases related to Comparative Example 6, some of them had chipping upon forming into the cylinder shape. Moreover, there were irregularities in the thickness of the coating material layer.

Example 30

The same processes as those of Example 19 were carried out except that the heat-resistant adhesive paste prepared in the same manner as (2) of Example 10 was used; thus, a honeycomb filter for purifying exhaust gases was manufactured.

Example 31

The same processes as those of Example 20 were carried out except that the heat-resistant adhesive paste prepared in the same manner as (2) of Example 11 was used; thus, a honeycomb filter for purifying exhaust gases was manufactured.

Example 32

The same processes as those of Example 21 were carried out except that the heat-resistant adhesive paste prepared in the same manner as (2) of Example 12 was used; thus, a honeycomb filter for purifying exhaust gases was manufactured.

Example 33

The same processes as those of Example 22 were carried out except that the heat-resistant adhesive paste prepared in the same manner as (2) of Example 13 was used; thus, a honeycomb filter for purifying exhaust gases was manufactured.

Example 34

The same processes as those of Example 23 were carried out except that the heat-resistant adhesive paste prepared in the same manner as (2) of Example 14 was used; thus, a honeycomb filter for purifying exhaust gases was manufactured.

Example 35

The same processes as those of Example 24 were carried out except that the heat-resistant adhesive paste prepared in the same manner as (2) of Example 15 was used; thus, a honeycomb filter for purifying exhaust gases was manufactured.

Example 36

The same processes as those of Example 25 were carried out except that the heat-resistant adhesive paste prepared in the same manner as (2) of Example 16 was used; thus, a honeycomb filter for purifying exhaust gases was manufactured.

Example 37

The same processes as those of Example 26 were carried out except that the heat-resistant adhesive paste prepared in the same manner as (2) of Example 17 was used; thus, a honeycomb filter for purifying exhaust gases was manufactured.

Example 38

The same processes as those of Example 27 were carried out except that the heat-resistant adhesive paste prepared in the same manner as (2) of Example 18 was used; thus, a honeycomb filter for purifying exhaust gases was manufactured.

Example 39

The same processes as those of Example 28 were carried out except that the heat-resistant adhesive paste prepared in the same manner as (2) of Example 10 was used; thus, a honeycomb filter for purifying exhaust gases was manufactured.

Moreover, each of the honeycomb filters relating to Examples 30 to 39 was placed in an exhaust-gas passage of a diesel engine, and thermocouples were inserted in nine portions with an interval of 30 mm in the length direction of the filter at each of the center portion (0 mm) and the peripheral portion (peripheral portion at 60 mm from the center) thus the temperature can be measured. Then, the diesel engine was operated for regeneration in a post-injection system, and after a lapse of 4 minutes, the average temperature of the nine portions in the center and the average temperature of the nine portions in the circumferential portion in the radial direction of the filter were measured thus the value of a temperature rise in the honeycomb filter was found. The results are shown in Table 10.

Further, with respect to the diesel engine in which each of the honeycomb filters relating to Examples 30 to 39 was placed, after the engine had been continuously driven 100 cycles in the above-mentioned post-injection system, the generation of cracks was visually confirmed. The results are shown in Table 10.

TABLE 10

|  | Temperature rise value (° C.) | Generation of cracks after continuous driving operations | |
|---|---|---|---|
|  |  | 10 cycles | 100 cycles |
| Example 30 | 483 | No | No |
| Example 31 | 462 | No | No |
| Example 32 | 453 | No | No |
| Example 33 | 485 | No | No |
| Example 34 | 462 | No | No |
| Example 35 | 460 | No | No |
| Example 36 | 452 | No | No |
| Example 37 | 443 | No | No |
| Example 38 | 465 | No | No |
| Example 39 | 483 | No | No |

As shown in Table 10, with respect to the honeycomb filters for purifying exhaust gases relating to Examples 30 to 39, after the driving operations of the diesel engine for four minutes in the post-injection system, each of the temperature-rise values exceeds 440° C., which indicates a superior temperature rising property. Moreover, even after driving the diesel engine continuously 100 cycles in the post-injection system, no generation of cracks was confirmed.

Here, in the honeycomb filters relating to Examples 30 to 39, the thermal capacity ($C_F$) per unit volume of the porous ceramic member has the same value as the values (Table 8) of Examples 19 to 28 that have the same composition in the porous ceramic member; the thermal capacity ($C_L$) per unit volume of the adhesive layer has the same value as the values (Table 5) of Examples 10 to 18 that have the same composition in the adhesive layer; and the thermal capacity ($C_M$) per unit volume of the coating-material or the filled layer has the same value as the values (Table 8) of Examples 19 to 28 that have the same composition in the coating material or the filled layer. Therefore, each of the value of $(C_L/C_F) \times 100$ and the value of $(C_M/C_F) \times 100$ of each of honeycomb filters relating to Reference Examples 30 to 39 is less than 100% (less than 90%); thus, the thermal capacity per unit volume of the adhesive layer and the thermal capacity per unit volume of the coating material layer or the filled layer are lower than the thermal capacity per unit volume of the porous ceramic member.

With respect to the honeycomb filter for purifying exhaust gases relating to Example 39, although this had no coating material layer, this was allowed to effectively function as a honeycomb filter for purifying exhaust gases without causing any leak of exhaust gas from the circumferential portion, when placed in the exhaust gas passage of an internal combustion engine.

Moreover, with respect to the honeycomb filter for purifying exhaust gases relating to Example 39, no defects such as chipping occurred upon cutting the rectangular-column-shaped ceramic laminated body into a cylinder-shaped member by using a diamond cutter. The outside dimension was also set with high precision without deviations from the cylinder shape.

Example 40

(1) Powder of α-type silicon carbide having an average particle size of 20 μm (60% by weight) and silicon powder having an average particle size of 1.0 μm (40% by weight) were wet-mixed, and to 100 parts by weight of the resulting mixture were added and kneaded 5 parts by weight of an organic binder (methyl cellulose) and 10 parts by weight of water to obtain a kneaded matter. Next, after a slight amount of a plasticizer and a lubricant had been added to the kneaded matter and this had been further kneaded, the resulting kneaded matter was extrusion-formed so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 1600° C. in a normal-pressure argon atmosphere for 2 hours to manufacture a porous ceramic member as shown in FIG. 2, which was made of a silicon carbide-silicon sintered body, and had a size of 33 mm×33 mm×300 mm, the number of through holes of 31/cm² and a thickness of the partition wall of 0.3 mm.

(2) A heat-resistant adhesive paste, which was prepared by adding 20 parts by weight of water to 100 parts by weight of a mixture composed of alumina fibers having a fiber length of 0.2 mm (17.6% by weight), silicon carbide particles having an average particle size of 0.6 μm (61.0% by weight), silica sol (9.1% by weight), carboxymethyl cellulose (2.3% by weight) and ammonium hydrogencarbonate (10% by weight) which served as a foaming agent, was used so that a number of the above-mentioned porous ceramic members were combined with one another through the method explained by reference to FIG. 3, and then cut by using a diamond cutter; thus, a cylinder-shaped ceramic block having a diameter of 165 mm, as shown in FIG. 1, was obtained.

Next, by applying the above-mentioned adhesive paste onto the circumferential portion of the ceramic block, a coating material paste layer having a thickness of 1.0 mm was formed. Further, this coating material paste layer was dried at 120° C. so that a cylinder-shaped honeycomb filter for purifying exhaust gases as shown in FIG. 1 was manufactured.

Example 41

(1) The same processes as those of Example 40 were carried out except that, upon combining the porous ceramic members with one another, as well as forming the coating material paste layer on the circumferential portion of the ceramic block, the adhesive paste formed in Example 2 was used; thus, a honeycomb filter for purifying exhaust gases was produced.

Example 42

(1) The same processes as those of Example 40 were carried out except that, upon combining the porous ceramic members with one another, as well as forming the coating material paste layer on the circumferential portion of the ceramic block, the adhesive paste formed in Example 3 was used; thus, a honeycomb filter for purifying exhaust gases was produced.

Example 43

(1) The same processes as those of Example 40 were carried out except that, upon combining the porous ceramic members with one another, as well as forming the coating material paste layer on the circumferential portion of the ceramic block, the adhesive paste formed in Example 4 was used; thus, a honeycomb filter for purifying exhaust gases was produced.

Example 44

(1) The same processes as those of Example 40 were carried out except that, upon combining the porous ceramic members with one another, as well as forming the coating material paste layer on the circumferential portion of the ceramic block, the adhesive paste formed in Example 5 was used; thus, a honeycomb filter for purifying exhaust gases was produced.

Example 45

(1) The same processes as those of Example 40 were carried out except that, upon combining the porous ceramic members with one another, as well as forming the coating material paste layer on the circumferential portion of the ceramic block, the adhesive paste formed in Example 6 was used; thus, a honeycomb filter for purifying exhaust gases was produced.

Example 46

(1) The same processes as those of Example 40 were carried out except that, upon combining the porous ceramic members with one another, as well as forming the coating material paste layer on the circumferential portion of the ceramic block, the adhesive paste formed in Example 7 was used; thus, a honeycomb filter for purifying exhaust gases was produced.

Example 47

(1) The same processes as those of Example 40 were carried out except that, upon combining the porous ceramic members with one another, as well as forming the coating material paste layer on the circumferential face of the ceramic block, the adhesive paste formed in Example 8 was used; thus, a honeycomb filter for purifying exhaust gases was produced.

Example 48

(1) The same processes as those of Example 40 were carried out except that, upon combining the porous ceramic members with one another, as well as forming the coating material paste layer on the circumferential portion of the ceramic block, the adhesive paste formed in Example 9 was used; thus, a honeycomb filter for purifying exhaust gases was produced.

Comparative Example 9

(1) The same processes as those of Example 40 were carried out except that, upon combining the porous ceramic members with one another, as well as forming the coating material paste layer on the circumference portion of the ceramic block, the adhesive paste formed in Comparative Example 1 was used; thus, a honeycomb filter for purifying exhaust gases was produced.

Comparative Example 10

(1) The same processes as those of Example 40 were carried out except that, upon combining the porous ceramic members with one another, as well as forming the coating material paste layer on the circumferential portion of the ceramic block, the adhesive paste formed in Comparative Example 2 was used; thus, a honeycomb filter for purifying exhaust gases was produced.

Reference Example 9

(1) The same processes as those of Example 40 were carried out except that, upon combining the porous ceramic members with one another, as well as forming the coating material paste layer on the circumferential portion of the ceramic block, the adhesive paste formed in Reference Example reference 1 was used; thus, a honeycomb filter for purifying exhaust gases was produced.

The thermal expansion coefficient $\alpha_F$ of each of the porous ceramic members made of silicon carbide-silicon sintered body thus manufactured and the thermal expansion coefficient $\alpha_L$ of the adhesive layer of each of the honeycomb filters relating to Examples 40 to 48, Comparative Examples 9 and 10 and Reference Example 9 were measured at respective temperatures of 300° C., 400° C., 600° C., 750° C. and 900° C. (Table 11) and based upon these values, the value of $|\alpha_L - \alpha_F|/\alpha_F$ was calculated (Table 12).

Moreover, each of the honeycomb filters relating to Examples 40 to 48, Comparative Examples 9 and 10 and Reference Example 9 was placed on a base having a hollow round-shape, and the honeycomb filter was supported by the porous ceramic members located on the circumferential portion so that, in this state, a force is applied onto one of the porous ceramic members near the center downward in a manner so as to push it out; thus, a push-out test for measuring a force to break the honeycomb filter was measured.

Furthermore, each of the honeycomb filters relating to Examples 40 to 48, Comparative Examples 9 and 10, and Reference Example 9 was placed in an exhaust passage of an engine, and this was subjected to repeated particulate collecting tests, and after the tests of 100 times, the resulting honeycomb filters were then subjected to the same push-out test; thus, the degree of a reduction in the push-out strength before and after the particulate collecting tests was calculated.

The results are shown in Table 13.

TABLE 11

| | Thermal expansion coefficient (×10⁻⁶)1/K | | | | |
|---|---|---|---|---|---|
| | 300° C. | 400° C. | 600° C. | 750° C. | 900° C. |
| Porous ceramic member ($\alpha_P$) | 5.7 | 5.3 | 3.5 | 3.3 | 3.9 |
| Example 40 ($\alpha_L$) ($\alpha_M$) | 6.3 | 6.2 | 5.2 | 4.8 | 2.7 |
| Example 41 ($\alpha_L$) ($\alpha_M$) | 6.3 | 6.7 | 5.3 | 5.9 | 6.4 |
| Example 42 ($\alpha_L$) ($\alpha_M$) | 7.5 | 7.4 | 6.3 | 5.9 | 6.4 |
| Example 43 ($\alpha_L$) ($\alpha_M$) | 6.4 | 6.7 | 5.3 | 5.0 | 4.3 |
| Example 44 ($\alpha_L$) ($\alpha_M$) | 7.5 | 7.4 | 6.3 | 4.1 | 2.7 |
| Example 45 ($\alpha_L$) ($\alpha_M$) | 4.6 | 4.8 | 3.6 | 3.7 | 7.3 |
| Example 46 ($\alpha_L$) ($\alpha_M$) | 5.8 | 5.4 | 3.6 | 3.5 | 4.0 |
| Example 47 ($\alpha_L$) ($\alpha_M$) | 10.3 | 9.7 | 6.3 | 5.7 | 6.9 |
| Example 48 ($\alpha_L$) ($\alpha_M$) | 11.2 | 10.0 | 7.2 | 6.8 | 7.7 |
| Comparative Example 9 ($\alpha_L$) ($\alpha_M$) | 12.3 | 10.6 | 7.34 | 7.2 | 7.83 |
| Comparative Example 10 ($\alpha_L$) ($\alpha_M$) | 5.69 | 5.28 | 3.47 | 3.39 | 3.92 |
| Reference Example 9 ($\alpha_L$) ($\alpha_M$) | 12.4 | 11.3 | 7.5 | 7.4 | 8.64 |

TABLE 12

| | $|\alpha_L - \alpha_F|/\alpha_F$ and $|\alpha_M - \alpha_F|/\alpha_F$ | | | | | |
|---|---|---|---|---|---|---|
| | 300° C. | 400° C. | 600° C. | 750° C. | 900° C. | Average |
| Example 40 | 0.11 | 0.17 | 0.49 | 0.45 | 0.31 | 0.30 |
| Example 41 | 0.11 | 0.26 | 0.51 | 0.79 | 0.64 | 0.46 |
| Example 42 | 0.32 | 0.40 | 0.80 | 0.79 | 0.64 | 0.59 |
| Example 43 | 0.12 | 0.26 | 0.51 | 0.52 | 0.10 | 0.30 |
| Example 44 | 0.32 | 0.40 | 0.80 | 0.24 | 0.31 | 0.41 |
| Example 45 | 0.19 | 0.09 | 0.03 | 0.12 | 0.87 | 0.26 |
| Example 46 | 0.02 | 0.02 | 0.03 | 0.06 | 0.03 | 0.030 |
| Example 47 | 0.81 | 0.83 | 0.80 | 0.73 | 0.77 | 0.79 |
| Example 48 | 0.96 | 0.89 | 1.06 | 1.06 | 0.97 | 0.99 |
| Comparative Example 9 | 1.16 | 1.00 | 1.10 | 1.18 | 1.01 | 1.09 |
| Comparative Example 10 | 0.002 | 0.004 | 0.009 | 0.027 | 0.005 | 0.009 |
| Reference Example 9 | 1.18 | 1.13 | 1.14 | 1.24 | 1.22 | 1.18 |

TABLE 13

| | Push-out test (N) | | |
|---|---|---|---|
| | Before collection test | After collection test | Relative strength (%) |
| Example 40 | 16293 | 11907 | 73 |
| Example 41 | 25518 | 18010 | 71 |
| Example 42 | 21022 | 13397 | 64 |
| Example 43 | 18173 | 14300 | 79 |
| Example 44 | 15390 | 12628 | 82 |

TABLE 13-continued

| | Push-out test (N) | | |
|---|---|---|---|
| | Before collection test | After collection test | Relative strength (%) |
| Example 45 | 24038 | 16083 | 67 |
| Example 46 | 15183 | 8820 | 58 |
| Example 47 | 21224 | 12864 | 61 |
| Example 48 | 19324 | 11430 | 59 |
| Comparative Example 9 | 16758 | 7756 | 46 |
| Comparative Example 10 | 18440 | 8053 | 44 |
| Reference Example 9 | 16477 | 4828 | 29 |

As shown in Table 12, all the values $|\alpha_L-\alpha_F|/\alpha_F$ of the honeycomb filters relating to Examples 40 to 48 are set within a range from 0.01 to 1.0; however, the values $|\alpha_L-\alpha_F|/\alpha_F$ of the honeycomb filters relating to Comparative Example 9 and Reference Example 9 are greater than 1.0 as a whole, and the values $|\alpha_L-\alpha_F|/\alpha_F$ of the honeycomb filters relating to Comparative Example 10 are smaller than 0.01 as a whole.

Here, the values $|\alpha_L-\alpha_F|/\alpha_F$ of the honeycomb filters relating to Example 48 at 650° C. are 1.0 or more; however, the average value is 0.97, which was less than 1.0.

Moreover, as shown in Table 13, the results of the push-out tests indicate that each of the push-out strengths before the particulate collecting tests of the honeycomb filters relating to Examples 40 to 48 exceeds 15000 N, and each of the push-out strengths after the particulate collecting tests exceeds 8800 N.

In contrast, each of the push-out strengths before the particulate collecting tests of the honeycomb filters relating to Comparative Examples 9 and 10 and Reference Example 9 is in a range from 16477 to 18440 N, and each of the push-out strengths after the particulate collecting tests is in a range from 4828 to 8053 N. Here, in any of the cases, before the particulate collecting tests, the same push-out strength as that of the honeycomb filters relating to Examples 40 to 48 is exerted; however, after the particulate collecting tests, the push-out strength is inferior to that of the honeycomb filters relating to Examples 40 to 48.

In other words, as shown in Table 13, each of the relative strengths (strength after collecting test/strength before collecting test×100) after the particulate collecting tests of the honeycomb filters relating to Examples 40 to 48 is 59% or more so that a reduction in the strength is not so great; however, each of the relative strengths (strength after collecting test/strength before collecting test×100) after the particulate collecting tests of the honeycomb filters relating to Comparative Examples 9 and 10 and Reference Example 9 is less than 46% so that a reduction in the strength is great.

Moreover, cracks are generated in the coating material layer of honeycomb filters relating to Comparative Examples 9 and 10 and Reference Example 9; however, no cracks are generated in the honeycomb filters relating to Examples 40 to 48.

Example 49

(1) Powder of α-type silicon carbide having an average particle size of 20 μm (60% by weight) and silicon powder having an average particle size of 1.0 μm (40% by weight) were wet-mixed, and to 100 parts by weight of the resulting mixture were added and kneaded 5 parts by weight of an organic binder (methyl cellulose) and 10 parts by weight of water to obtain a kneaded matter. Next, after a slight amount of a plasticizer and a lubricant had been added to the kneaded matter and this had been further kneaded, the resulting kneaded matter was extrusion-formed so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 1600° C. in a normal-pressure argon atmosphere for 2 hours to manufacture a porous ceramic member as shown in FIG. 2, which was made of a silicon carbide-silicon sintered body, and had a size of 35 mm×35 mm×300 mm, the number of through holes of 31/cm², a thickness of the partition wall of 0.3 mm, a porosity of 55% by volume and an average pore diameter of 20 μm.

(2) The same processes as those of Example 30 were carried out except that the porous ceramic member manufactured in (1) was used to manufacture a honeycomb filter for purifying exhaust gases.

Example 50

The same processes as those of Example 31 were carried out except that the porous ceramic member manufactured in (1) of Example 49 was used to manufacture a honeycomb filter for purifying exhaust gases.

Example 51

The same processes as those of Example 32 were carried out except that the porous ceramic member manufactured in (1) of Example 49 was used to manufacture a honeycomb filter for purifying exhaust gases.

Example 52

The same processes as those of Example 33 were carried out except that the porous ceramic member manufactured in (1) of Example 49 was used to manufacture a honeycomb filter for purifying exhaust gases.

Example 53

The same processes as those of Example 34 were carried out except that the porous ceramic member manufactured in (1) of Example 49 was used to manufacture a honeycomb filter for purifying exhaust gases.

Example 54

The same processes as those of Example 35 were carried out except that the porous ceramic member manufactured in (1) of Example 49 was used to manufacture a honeycomb filter for purifying exhaust gases.

Example 55

The same processes as those of Example 36 were carried out except that the porous ceramic member manufactured in (1) of Example 49 was used to manufacture a honeycomb filter for purifying exhaust gases.

Example 56

The same processes as those of Example 37 were carried out except that the porous ceramic member manufactured in (1) of Example 49 was used to manufacture a honeycomb filter for purifying exhaust gases.

Example 57

The same processes as those of Example 38 were carried out except that the porous ceramic member manufactured in (1) of Example 49 was used to manufacture a honeycomb filter for purifying exhaust gases.

Example 58

The same processes as those of Example 39 were carried out except that the porous ceramic member manufactured in (1) of Example 49 was used to manufacture a honeycomb filter for purifying exhaust gases.

Comparative Example 11

The same processes as those of Comparative Example 6 were carried out except that the porous ceramic member manufactured in (1) of Example 49 was used to manufacture a honeycomb filter for purifying exhaust gases.

Comparative Example 12

The same processes as those of Comparative Example 7 were carried out except that the porous ceramic member manufactured in (1) of Example 49 was used to manufacture a honeycomb filter for purifying exhaust gases.

Comparative Example 13

The same processes as those of Comparative Example 8 were carried out except that the porous ceramic member manufactured in (1) of Example 49 was used to manufacture a honeycomb filter for purifying exhaust gases.

With respect to the honeycomb filters relating to Examples 49 to 58 and Comparative Examples 11 to 13, the thermal capacity ($C_F$) per unit volume of the porous ceramic member was measured at each of temperatures of 300° C., 400° C., 600° C., 750° C. and 900° C. (Table 14). Moreover, by applying the values of Examples 10 to 18 (Table 5) having the same composition in the adhesive layer to the thermal capacity ($C_L$) per unit volume of the adhesive layer, the rate of the thermal capacity ($C_L/C_F$)×100 per unit volume of the adhesive layer to the thermal capacity per unit volume of the porous ceramic member was calculated (Table 15). In the same manner, by applying the values of Examples 19 to 28 (Table 8) having the same composition in the coating-agent layer to the thermal capacity ($C_M$) per unit volume of the coating-agent layer or the filled layer, the rate of the thermal capacity ($C_M/C_F$)×100 per unit volume of the coating-agent layer or the filled layer to the thermal capacity per unit volume of the porous ceramic member was calculated (Table 15).

Moreover, each of the honeycomb filters relating to Examples 49 to 58 and Comparative Examples 11 to 13 was placed in an exhaust gas passage of a diesel engine, and thermocouples were inserted in nine portions with an interval of 30 mm in the length direction of the filter at each of the center portion (0 mm) and the peripheral portion (peripheral portion at 60 mm from the center) so that the temperature can be measured. Then, the diesel engine was operated for regeneration in a post-injection system, and after a lapse of 4 minutes, the average temperature of the nine portions in the center and the average temperature of the nine portions in the circumferential portion in the radial direction of the filter were measured so that the value of a temperature rise in the honeycomb filter was found. The results are shown in Table 15.

Further, with respect to the diesel engine in which each of the honeycomb filters relating to Examples 49 to 58 and Comparative Examples 11 to 13 was placed, after the engine had been continuously driven 100 cycles in the above-mentioned post-injection system, the generation of cracks was visually confirmed. The results are shown in Table 15.

TABLE 14

| | Thermal capacity $C_F$ (kJ/(K·m³)) per unit volume of porous ceramic member | | | | |
|---|---|---|---|---|---|
| | 300° C. | 400° C. | 600° C. | 750° C. | 900° C. |
| Example 49 | 782 | 1135 | 1252 | 1330 | 1350 |
| Example 50 | 782 | 1135 | 1252 | 1330 | 1350 |
| Example 51 | 782 | 1135 | 1252 | 1330 | 1350 |
| Example 52 | 782 | 1135 | 1252 | 1330 | 1350 |
| Example 53 | 782 | 1135 | 1252 | 1330 | 1350 |
| Example 54 | 782 | 1135 | 1252 | 1330 | 1350 |
| Example 55 | 782 | 1135 | 1252 | 1330 | 1350 |
| Example 56 | 782 | 1135 | 1252 | 1330 | 1350 |
| Example 57 | 782 | 1135 | 1252 | 1330 | 1350 |
| Example 58 | 782 | 1135 | 1252 | 1330 | 1350 |
| Comparative Example 11 | 782 | 1135 | 1252 | 1330 | 1350 |
| Comparative Example 12 | 782 | 1135 | 1252 | 1330 | 1350 |
| Comparative Example 13 | 782 | 1135 | 1252 | 1330 | 1350 |

TABLE 9

| | ($C_L/C_F$) × 100 (%) and ($C_M/C_F$) × 100 (%) | | | | | | Temperature rise value | Generation of cracks after continuous driving operation of |
|---|---|---|---|---|---|---|---|---|
| | 300° C. | 400° C. | 600° C. | 750° C. | 900° C. | Average | (° C.) | 100 cycles |
| Example 49 | 40.92 | 50.22 | 47.92 | 46.62 | 48.30 | 46.80 | 475 | No |
| Example 50 | 67.65 | 63.35 | 60.22 | 61.13 | 63.78 | 63.22 | 452 | No |
| Example 51 | 68.41 | 65.99 | 61.10 | 61.65 | 64.44 | 64.32 | 445 | No |
| Example 52 | 39.64 | 49.78 | 46.33 | 45.11 | 47.56 | 45.68 | 475 | No |
| Example 53 | 70.33 | 68.63 | 63.50 | 63.53 | 66.41 | 66.69 | 458 | No |
| Example 54 | 79.28 | 88.11 | 60.22 | 61.13 | 63.78 | 70.50 | 458 | No |
| Example 55 | 80.56 | 97.27 | 99.84 | 93.23 | 89.89 | 91.96 | 445 | No |
| Example 56 | 86.96 | 99.56 | 98.24 | 99.25 | 99.26 | 96.65 | 435 | No |
| Example 57 | 69.05 | 60.08 | 62.70 | 62.78 | 66.67 | 65.46 | 455 | No |
| Example 58 | 40.92 | 50.22 | 47.92 | 46.62 | 48.30 | 46.80 | 475 | No |
| Comparative Example 11 | 96.29 | 108.37 | 106.55 | 103.76 | 104.81 | 103.96 | 395 | Yes |

TABLE 9-continued

| | $(C_L/C_F) \times 100$ (%) and $(C_M/C_F) \times 100$ (%) | | | | | | Temperature rise value | Generation of cracks after continuous driving operation of |
|---|---|---|---|---|---|---|---|---|
| | 300° C. | 400° C. | 600° C. | 750° C. | 900° C. | Average | (° C.) | 100 cycles |
| Comparative Example 12 | 94.63 | 105.73 | 103.83 | 100.76 | 103.70 | 101.7 | 400 | Yes |
| Comparative Example 13 | 97.19 | 111.01 | 110.22 | 105.26 | 105.19 | 105.3 | 390 | Yes |

As shown in Table 15, both of the value of $(C_L/C_F) \times 100$ and the value of $(C_M/C_F) \times 100$ of each of honeycomb filters relating to Examples 49 to 58 are less than 100% (less than 90%) thus the thermal capacity per unit volume of the adhesive layer and the thermal capacity per unit volume of the coating material layer or the filled layer are maintained lower than the thermal capacity per unit volume of the porous ceramic member. In contrast, both of the value of $(C_L/C_F) \times 100$ and the value of $(C_M/C_F) \times 100$ of each of honeycomb filters related to Comparative Examples 11 to 13 exceed 100% so that the thermal capacity per unit volume of the adhesive layer and the thermal capacity per unit volume of the coating material layer or the filled layer have values close to the thermal capacity per unit volume of the porous ceramic member.

Moreover, as shown in Table 15, with respect to the honeycomb filters for purifying exhaust gases relating to Examples 49 to 58, the value of raised temperature of each of the honeycomb filters after driving the diesel engine in the post-injection system for four minutes exceeded 435° C., which indicated superior temperature-raising characteristics. Furthermore, even after driving the diesel engine continuously 100 cycles in the post-injection system, no generation of cracks was confirmed.

In contrast, after driving the diesel engine in the post-injection system for 4 minutes, the value of raised temperature of each of honeycomb filters relating to Comparative Examples 11 to 13 was in a range from 390 to 400° C., and this was lower than that of each of honeycomb filters relating to Examples 49 to 58. Here, in each of honeycomb filters relating to Comparative Examples 11 to 13, after driving the diesel engine continuously 100 cycles in the post-injection system, generation of cracks was confirmed in the adhesive layer and the coating material layer or the filled layer.

With respect to the honeycomb filters for purifying exhaust gases relating to Example 58, although these had no coating material layer, these were allowed to effectively function as honeycomb filters for purifying exhaust gases without causing any leak of exhaust gas from the circumferential portion, when placed in the exhaust gas passage of an internal combustion engine.

Moreover, with respect to the honeycomb filters for purifying exhaust gases relating to Examples 58, no defects such as chipping occurred upon cutting the rectangular-column-shaped ceramic laminated body into a cylinder-shaped member by using a diamond cutter. The outside dimension was also set with high precision without deviations from the cylinder shape. In contrast, with respect to the honeycomb filter for purifying exhaust gases relating to Comparative Example 11, some of them had chipping upon forming into the cylinder shape. Moreover, there were irregularities in the thickness of the coating material layer.

INDUSTRIAL APPLICABILITY

The honeycomb filter for purifying exhaust gases according to the first aspect of the present invention has the above-mentioned arrangement; therefore, even in the case where a local temperature change occurs in the honeycomb filter due to local burning and the like, the filter can alleviate the resulting thermal stress, and is less likely to generate cracks and superior in strength and durability.

The honeycomb filter for purifying exhaust gases according to the second aspect of the present invention has an arrangement in which the thermal expansion coefficient $\alpha_M$ of the coating material layer and the thermal expansion coefficient $\alpha_F$ of the porous ceramic member satisfies the following relationship: $0.01 < |\alpha_M - \alpha_F|/\alpha_F < 1.0$; therefore, even in the case where a local temperature change occurs in the honeycomb filter due to local burning and the like, the filter can alleviate the resulting thermal stress, and is less likely to generate cracks and superior in strength and durability.

The honeycomb filter for purifying exhaust gases according to the third aspect of the present invention has an arrangement in which the thermal expansion coefficient $\alpha_L$ of the adhesive layer and the thermal expansion coefficient $\alpha_F$ of the porous ceramic member satisfies the following relationship: $0.01 < |\alpha_L - \alpha_F|/\alpha_F < 1.0$, and the thermal expansion coefficient $\alpha_M$ of the coating material layer and the thermal expansion coefficient $\alpha_F$ of the porous ceramic member satisfies the following relationship: $0.01 < |\alpha_M - \alpha_F|/\alpha_F < 1.0$; therefore, even in the case where a local temperature change occurs in the honeycomb filter due to local burning and the like, the filter can alleviate the resulting thermal stress, and is less likely to generate cracks and superior in strength and durability.

Moreover, the honeycomb filter for purifying exhaust gases according to the fourth aspect of the present invention has an arrangement in which the adhesive layer has a low thermal capacity, and consequently has a superior temperature-raising characteristic; therefore, when a catalyst is supported on the honeycomb filter, the catalyst is allowed to quickly reach a temperature capable of purifying CO, HC, NOx and the like in exhaust gases. Thus, the honeycomb filter according to the fourth aspect of the present invention is desirably used as a catalyst supporting member.

Furthermore, since the adhesive of the present invention is designed as described above, it is possible to control the porosity and the like of pores to be formed in the adhesive layer by using the adhesive of the present invention, and consequently to control the thermal expansion coefficient of the adhesive layer; thus, it becomes possible to control the thermal expansion coefficient in the adhesive layer, and also to reduce the thermal capacity per unit volume.

Therefore, when a honeycomb filter for purifying exhaust gases which has a structure in which: a plurality of a columnar porous ceramic member are combined with one another through adhesive layer of the present invention, each of the above-mentioned columnar porous ceramic member comprising a number of through holes that are placed in parallel with one another in the length direction with partition wall interposed therebetween is manufactured, it becomes possible to alleviate a thermal stress that occurs between the porous ceramic member and the adhesive layer and an external force imposed on the adhesive layer, and consequently to prevent generation of cracks between the porous ceramic member and the adhesive layer; thus, the filter is allowed to have superior strength and durability. Moreover, the pores formed in the above-mentioned adhesive layer makes it possible to reduce the density of the adhesive layer, and consequently to reduce the thermal capacity per unit volume; thus, the honeycomb filter for purifying exhaust gases is allowed to have a superior temperature rising property.

Moreover, the honeycomb filter for purifying exhaust gases according to the sixth aspect of the present invention has an arrangement in which the coating material layer has a low thermal capacity, and consequently has a superior temperature rising property; therefore, upon placing a catalyst on the honeycomb filter, the catalyst is allowed to quickly reach a temperature capable of purifying CO, HC, NOx and the like in exhaust gases. Thus, the honeycomb filter according to the sixth aspect of the present invention is desirably used as a catalyst supporting member.

Since the coating material of the present invention is as mentioned above, it is possible to control the porosity and the like of the pores to be formed in the coating material layer made from the coating material of the present invention, and the coating material layer made from the coating material of the present invention makes it possible to reduce the thermal capacity per unit volume, to improve the heat-insulating property and also to provide superior elasticity; thus, it becomes possible to alleviate stresses.

The honeycomb filter for purifying exhaust gases according to the seventh aspect of the present invention, which uses the coating material of the present invention, is superior in the temperature rising property, strength and durability. By increasing the porosity, the temperature rising property of the honeycomb filter for purifying exhaust gases of the seventh aspect of the present invention is further improved so that a large amount of catalyst can be placed thereon without increasing the back pressure; thus, the filter is also allowed to function as a catalyst supporting member.

Moreover, the honeycomb filter for purifying exhaust gases according to the eighth aspect of the present invention has an arrangement in which the adhesive layer and the coating material layer have a low thermal capacity, and consequently have a superior temperature rising property; therefore, upon placing a catalyst on the honeycomb filter, the catalyst is allowed to quickly reach a temperature capable of purifying CO, HC, NOx and the like in exhaust gases. Thus, the honeycomb filter according to the eighth aspect of the present invention is desirably used as a catalyst supporting member.

The honeycomb filter for purifying exhaust gases according to the ninth aspect of the present invention, which uses the adhesive and coating material of the present invention, is superior in the temperature rising property, strength and durability. By increasing the porosity, the temperature rising property of the honeycomb filter for purifying exhaust gases of the ninth aspect of the present invention is further improved so that a large amount of catalyst can be placed thereon without increasing the back pressure; thus, the filter is also allowed to function as a catalyst supporting member.

The manufacturing method for the honeycomb filter for purifying exhaust gases of the present invention, which is prepared as described above, makes it possible to prevent occurrence of defects such as chipping upon machining and cutting the ceramic laminated body at the time of forming a ceramic block, and to manufacture a filter that is superior in dimensional precision, with the process for forming the coating material layer being omitted. For this reason, in particular, the method of the present invention is desirably applied upon forming a honeycomb filter for purifying exhaust gases with a low thermal capacity and high porosity.

What is claimed is:

1. An adhesive composition for binding columnar porous ceramic members, comprising:
    an inorganic binder;
    an inorganic fiber;
    inorganic particles; and
    an inorganic balloon comprising at least one of an alumina balloon, a fly ash balloon, and a mullite balloon.

2. The adhesive composition of claim 1, wherein the inorganic binder comprises at least one of silica sol and alumina sol.

3. The adhesive composition of claim 1, wherein the inorganic fiber comprises at least one of silica-alumina, mullite, alumina and silica.

4. The adhesive composition of claim 1, wherein the inorganic particles comprise at least one of silicon carbide, silicon nitride and boron nitride.

5. The adhesive composition of claim 1, wherein the inorganic balloon comprises at least one of an alumina balloon and a fly ash balloon.

6. The adhesive composition of claim 1, wherein the inorganic fiber has a fiber length of from 1 μm to 100 mm.

7. The adhesive composition of claim 1, wherein the inorganic particles have a particle size of 0.01 μm to 100 μm.

8. The adhesive composition of claim 1, wherein the inorganic balloon has an average particle size of 30 μm to 300 μm.

9. The adhesive composition of claim 1, wherein the inorganic binder is included in an amount of 1 wt. % to 30 wt. % on a solid basis, the inorganic fiber is included in an amount of 10 wt. % to 70 wt. % on a solid basis, the inorganic particles are included in an amount of 3 wt. % to 80 wt. % on a solid basis, and the inorganic balloon is included in an amount of 0.01 wt. % to 80 wt. %.

10. The adhesive composition of claim 1, wherein the inorganic binder is silica sol, the inorganic fiber is alumina, the inorganic particles are silicon carbide, and the inorganic balloon is an alumina balloon.

11. The adhesive composition of claim 1, further comprising an organic binder.

12. A honeycomb filter, comprising:
    a ceramic laminated body comprising a plurality of columnar porous ceramic members and an adhesive layer combining the columnar porous ceramic members with one another,
    wherein the columnar porous ceramic members each have a partition wall and a plurality of through holes, the through holes extend in parallel with one another in a length direction of the columnar porous ceramic members, the partition wall separates the through holes and is configured to filter particulates in an exhaust gas, the adhesive layer comprises an inorganic binder, an inorganic fiber, inorganic particles and an inorganic balloon, and the inorganic balloon comprises at least one of an alumina balloon, a fly ash balloon, and a mullite balloon.

13. The honeycomb filter of claim 12, wherein the inorganic binder comprises at least one of silica sol and alumina sol.

14. The honeycomb filter of claim 12, wherein the inorganic fiber comprises at least one of silica-alumina, mullite, alumina and silica.

15. The honeycomb filter of claim 12, wherein the inorganic particles comprise at least one of silicon carbide, silicon nitride and boron nitride.

16. The honeycomb filter of claim 12, wherein the inorganic balloon comprises at least one of an alumina balloon and a fly ash balloon.

17. The honeycomb filter of claim 12, wherein the inorganic fiber has a fiber length of from 1 μm to 100 mm.

18. The honeycomb filter of claim 12, wherein the inorganic particles have a particle size of 0.01 μm to 100 μm.

19. The honeycomb filter of claim 12, wherein the inorganic balloon has an average particle size of 30 μm to 300 μm.

20. The honeycomb filter of claim 12, wherein the adhesive layer comprises the inorganic binder in an amount of 1 wt. % to 30 wt. % on a solid basis, the inorganic fiber in an amount of 10 wt. % to 70 wt. % on a solid basis, the inorganic particles in an amount of 3 wt. % to 80 wt. % on a solid basis, and the inorganic balloon in an amount of 0.01 wt. % to 80 wt. %.

21. The honeycomb filter of claim 12, wherein the inorganic binder is silica sol, the inorganic fiber is alumina, the inorganic particles are silicon carbide, and the inorganic balloon is an alumina balloon.

22. The honeycomb filter of claim 12, further comprising an organic binder.

23. A method of manufacturing a honeycomb filter, comprising:
assembling a plurality of columnar porous ceramic members by applying an adhesive material to a circumferential portion of the columnar porous ceramic members such that a ceramic laminated body comprising the columnar porous ceramic members is formed; and
heating the ceramic laminated body such that the adhesive material is solidified,
wherein the columnar porous ceramic members each have a partition wall and a plurality of through holes, the through holes extend in parallel with one another in a length direction of the columnar porous ceramic members, the adhesive material comprises an inorganic binder, an inorganic fiber, inorganic particles and an inorganic balloon, and the inorganic balloon comprises at least one of an alumina balloon, a fly ash balloon, and a mullite balloon.

24. The method of claim 23, wherein the inorganic binder comprises at least one of silica sol and alumina sol.

25. The method of claim 23, wherein the inorganic fiber comprises at least one of silica-alumina, mullite, alumina, and silica.

26. The method of claim 23, wherein the inorganic particles comprise at least one of silicon carbide, silicon nitride, and boron nitride.

27. The method of claim 23, wherein the inorganic balloon comprises at least one of an alumina balloon and a fly ash balloon.

28. The method of claim 23, wherein the inorganic fiber has a fiber length of from 1 μm to 100 mm.

29. The method of claim 23, wherein the inorganic particles have a particle size of 0.01 μm to 100 μm.

30. The method of claim 23, wherein the inorganic balloon has an average particle size of 30 μm to 300 μm.

31. The method of claim 23, wherein the adhesive material comprises the inorganic binder in an amount of 1 wt. % to 30 wt. % on a solid basis, the inorganic fiber in an amount of 10 wt. % to 70 wt. % on a solid basis, the inorganic particles in an amount of 3 wt. % to 80 wt. % on a solid basis, and the inorganic balloon in an amount of 0.01 wt. % to 80 wt. %.

32. The method of claim 23, wherein the inorganic binder is silica sol, the inorganic fiber is alumina, the inorganic particles are silicon carbide, and the inorganic balloon is an alumina balloon.

33. The method of claim 23, wherein the adhesive material further comprises an organic binder.

* * * * *